(12) United States Patent
Tran

(10) Patent No.: US 12,614,236 B1
(45) Date of Patent: Apr. 28, 2026

(54) AGENTIC ARTIFICIAL INTELLIGENCE SYSTEM

(71) Applicant: Bao Q Tran, Saratoga, CA (US)

(72) Inventor: Bao Q Tran, Saratoga, CA (US)

( * ) Notice: Subject to any disclaimer, the term of this patent is extended or adjusted under 35 U.S.C. 154(b) by 80 days.

(21) Appl. No.: 19/221,937

(22) Filed: May 29, 2025

Related U.S. Application Data

(62) Division of application No. 19/066,896, filed on Feb. 28, 2025, now Pat. No. 12,373,897.

(51) Int. Cl.
| | |
|---|---|
| *G06Q 40/08* | (2012.01) |
| *G06F 40/103* | (2020.01) |
| *G06F 40/205* | (2020.01) |
| *G06F 40/295* | (2020.01) |
| *G06F 40/30* | (2020.01) |
| *G06F 40/40* | (2020.01) |
| *G06V 20/50* | (2022.01) |
| *G06Q 30/018* | (2023.01) |

(52) U.S. Cl.
CPC ........... *G06Q 40/09* (2025.08); *G06F 40/103* (2020.01); *G06F 40/205* (2020.01); *G06F 40/295* (2020.01); *G06F 40/30* (2020.01); *G06F 40/40* (2020.01); *G06Q 40/08* (2013.01); *G06Q 40/082* (2025.08); *G06Q 40/0821* (2025.08); *G06V 20/50* (2022.01); *G06Q 30/0185* (2013.01)

(58) Field of Classification Search
CPC .. G06Q 40/08; G06Q 40/082; G06Q 40/0821; G06Q 40/09; G06F 40/103; G06F 40/40; G06F 40/205; G06F 40/295; G06F 40/30; G06V 20/50
See application file for complete search history.

(56) References Cited

U.S. PATENT DOCUMENTS

| | | | | |
|---|---|---|---|---|
| 11,978,273 | B1 * | 5/2024 | Ramaswamy | ......... G06V 10/82 |
| 12,056,722 | B1 * | 8/2024 | Sanchez | ............. G06Q 30/0204 |
| 2023/0162871 | A1 * | 5/2023 | Ali | ......................... G16H 10/60 |
| | | | | 705/3 |

* cited by examiner

*Primary Examiner* — Scott C Anderson
(74) *Attorney, Agent, or Firm* — PatentPC

(57) ABSTRACT

An agentic artificial intelligence system processes insurance claims, medical claims, financial transactions, and sales leads by receiving and preprocessing claimant, patient, transaction, and prospect data to standardize formats, remove sensitive identifiers, and enrich records. It uses machine learning, deep learning, natural language processing, and computer vision to analyze both structured and unstructured data, identify errors, inconsistencies, or fraudulent patterns, verify eligibility and compliance, and assign relevant codes based on historical and contextual information. The system calculates expected payouts or reimbursements, assesses transaction feasibility, and generates risk scores while adapting its predictions to market conditions, contractual factors, or clinical guidelines. A multi-agent framework coordinates specialized agents for eligibility verification, coding, pricing, fraud detection, and sales outreach, supporting multi-channel communication, lead prioritization, and natural language generation of outreach messages and decision-making explanations. Continuous learning is achieved via retraining, feedback loops, federated learning, and blockchain-based recordkeeping, ensuring secure, transparent, and compliant operations across multiple domains.

11 Claims, 41 Drawing Sheets

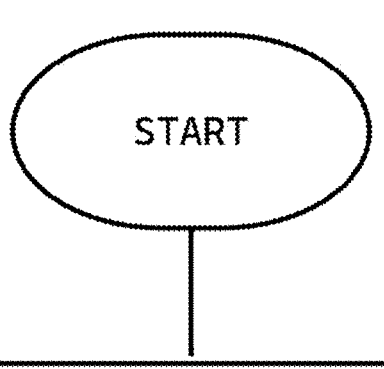
START
Implementing a multi-agent system where
specialized AI agents handle different
aspects of the claim process (S500)
Coordinating the actions of these agents
using a master orchestrator agent (S502)
Aggregating the outputs from each agent
to make a final claim decision (S504)
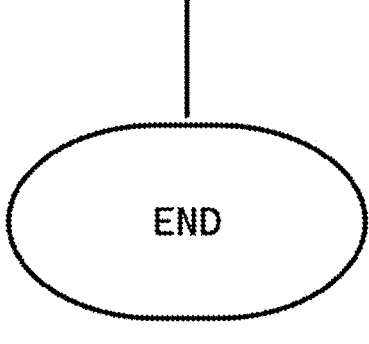
END
FIGURE 5

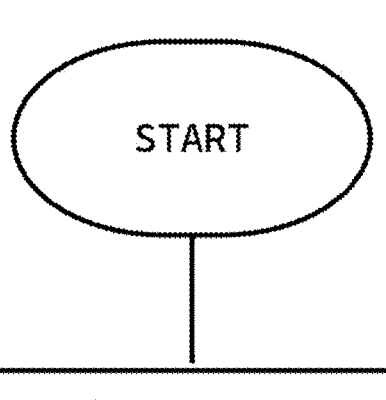
START
Utilizing a machine learning model trained
on historical claim data to predict
the likely settlement amount (S600)
Adjusting the prediction based on current
market conditions and regional factors (S602)
Comparing the calculated amount with
similar past claims for consistency (S604)
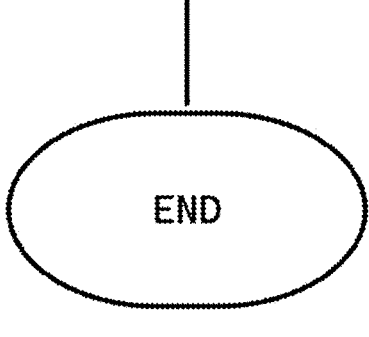
END
FIGURE 6

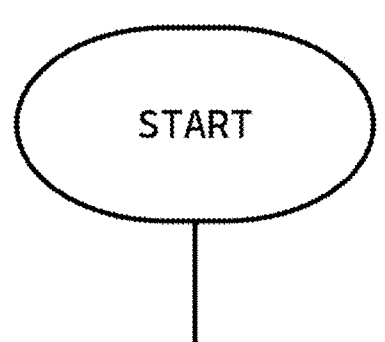
Generating a natural language explanation
of the claim decision, including key
factors that influenced the outcome (S700)
Presenting this explanation to both the
claimant and the claims adjuster (S702)
Providing an option for human review in cases
where the AI's decision is challenged (S704)
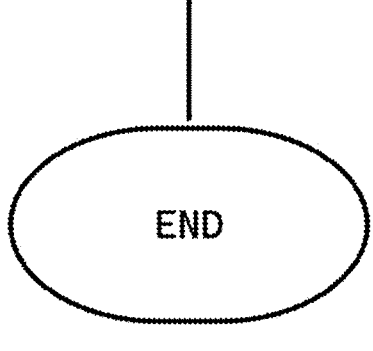
FIGURE 7

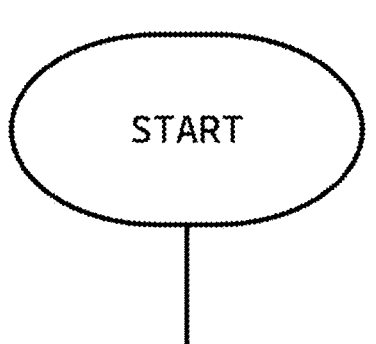
START
Periodically retraining the machine
learning models using anonymized
data from recent claims (S800)
Implementing a feedback loop
where human adjusters can correct
or approve AI decisions (S802)
Updating the system's decision-making
algorithms based on this feedback (S804)
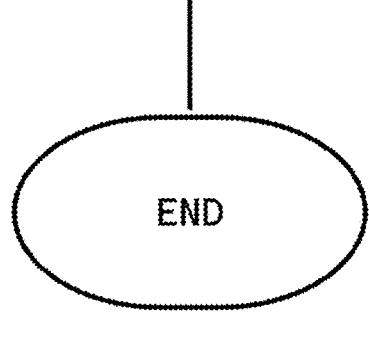
END
FIGURE 8

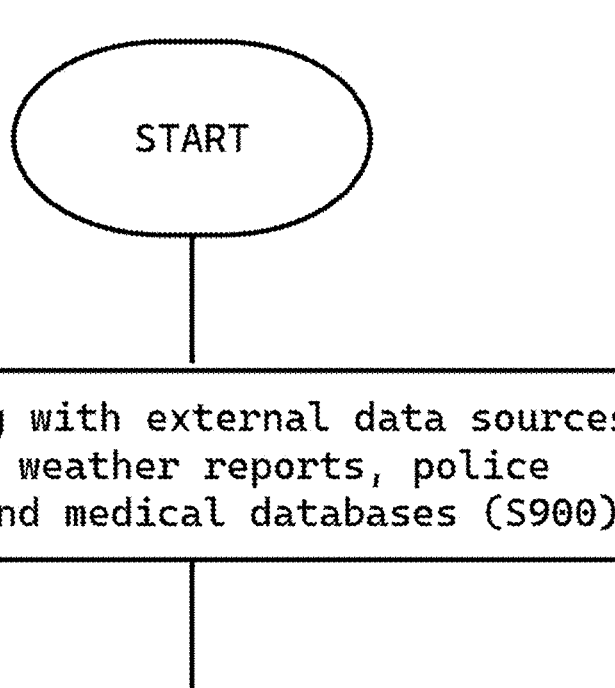
START
Integrating with external data sources
such as weather reports, police
records, and medical databases (S900)
Corroborating claim details with information
from these external sources (S902)
Identifying any inconsistencies that
may indicate potential fraud (S904)
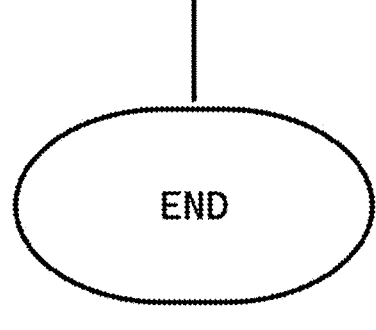
END
FIGURE 9

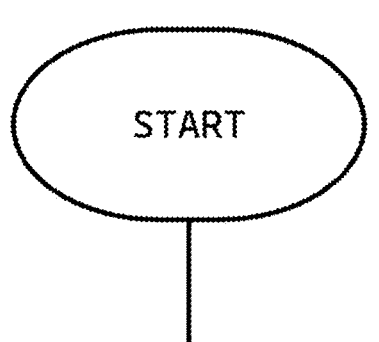
START
Implementing a privacy-preserving
federated learning system to
improve the AI models (S1000)
Sharing model updates rather than raw data
between different insurance entities (S1002)
Ensuring compliance with data protection
regulations while benefiting from
a larger collective dataset (S1004)
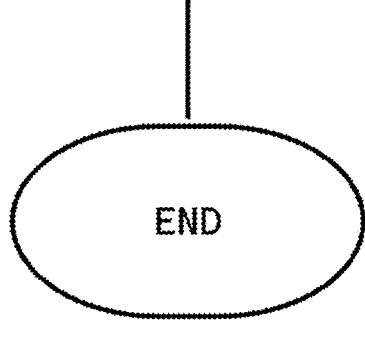
END
FIGURE 10

START

Implementing a natural language
processing module to extract
relevant clinical information from
unstructured medical notes (S1200)

Mapping the extracted information to
standardized medical terminologies (S1202)

Using this mapped information to
support accurate code assignment
and claim validation (S1204)

END

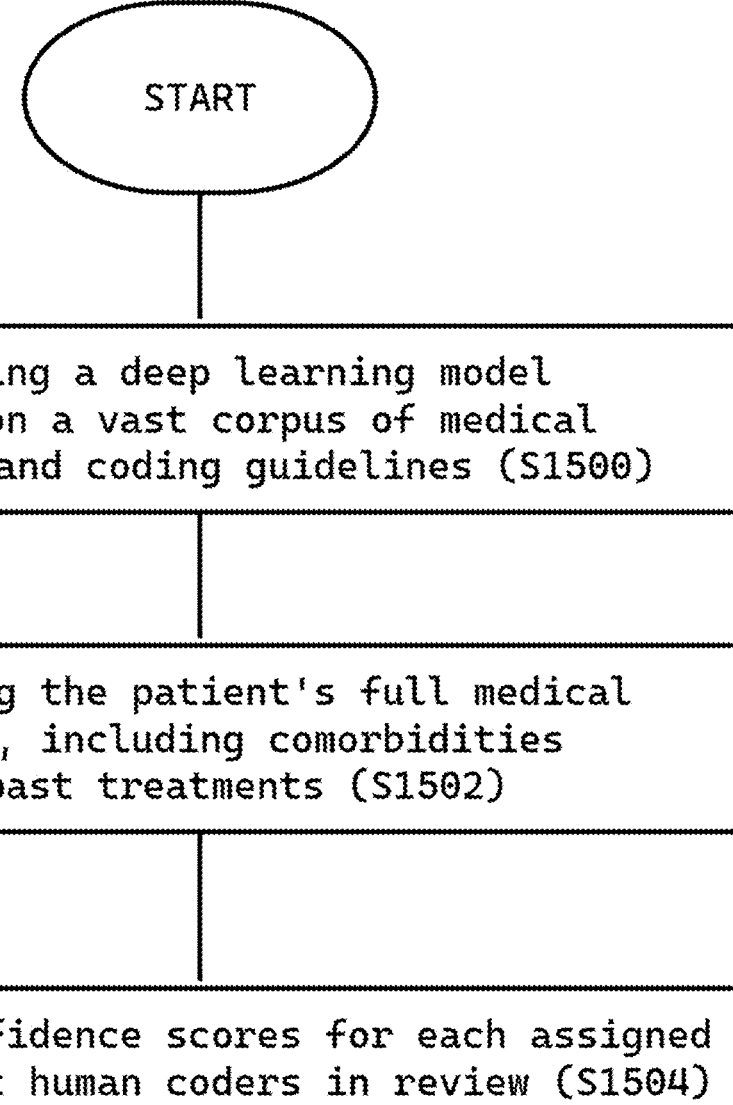
START
Utilizing a deep learning model
trained on a vast corpus of medical
literature and coding guidelines (S1500)
Considering the patient's full medical
context, including comorbidities
and past treatments (S1502)
Providing confidence scores for each assigned
code to assist human coders in review (S1504)
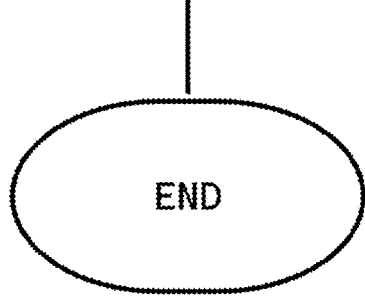
END
FIGURE 15

START

Implementing a multi-agent system where specialized AI agents handle different aspects of the claim process (S1600)

Using a coordination agent to manage interactions between specialized agents for eligibility verification, coding, pricing, and fraud detection (S1602)

Aggregating outputs from each agent to make a final claim decision (S1604)

END

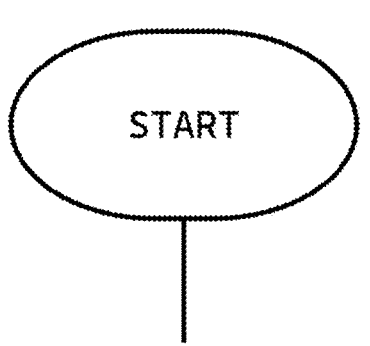
START
Generating a detailed explanation of benefits (EOB) in natural language, clearly explaining any denials or partial payments (S1800)
Customizing the language and detail level of the EOB based on the recipient (patient, provider, or payer) (S1802)
Providing links to relevant policy documents or clinical guidelines to support the claim decision (S1804)
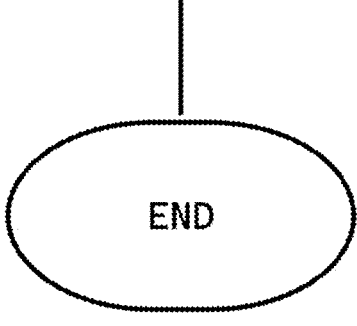
END
FIGURE 18

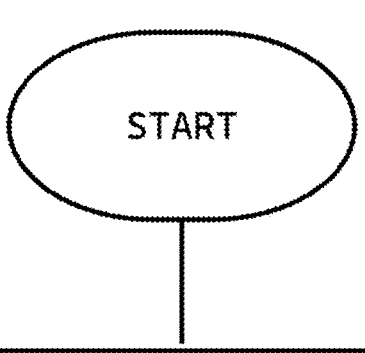
START
Implementing a federated learning system
to improve AI models across multiple
healthcare organizations (S1900)
Updating the system's decision-making
algorithms based on appeal outcomes
and human expert feedback (S1902)
Adapting to new medical procedures,
coding updates, and policy
changes in real-time (S1904)
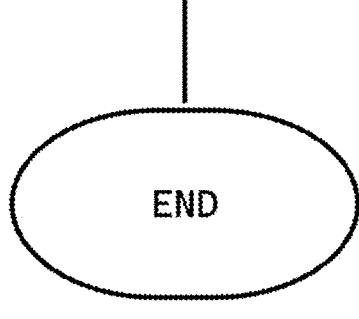
END
FIGURE 19

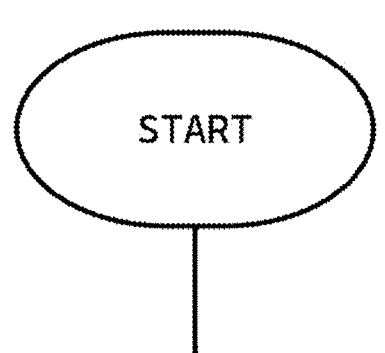
START
Employing natural language processing
to extract relevant information from
transaction descriptions (S2200)
Categorizing transactions based on merchant
information and spending patterns (S2202)
Identifying anomalies that deviate from the
user's typical financial behavior (S2204)
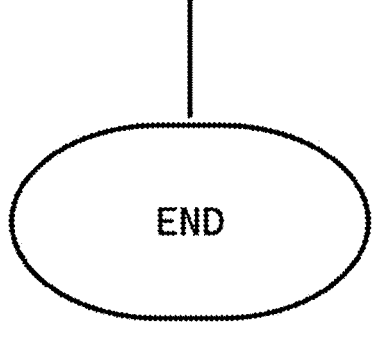
END
FIGURE 22

START

Utilizing a deep learning model that considers multiple factors including transaction amount, frequency, location, and counterparty information (S2400)

Generating a holistic risk score that combines credit risk, market risk, and operational risk (S2402)

Providing explainable AI outputs to justify risk assessments to regulators and stakeholders (S2404)

END

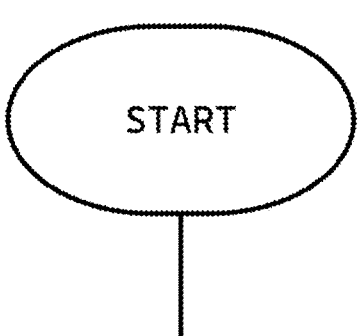
START
Implementing a blockchain-based
system for secure, transparent
recording of transactions (S2500)
Using smart contracts to automate
complex financial agreements and
ensure regulatory compliance (S2502)
Maintaining an immutable audit trail for
all transactions to facilitate regulatory
reporting and dispute resolution (S2504)
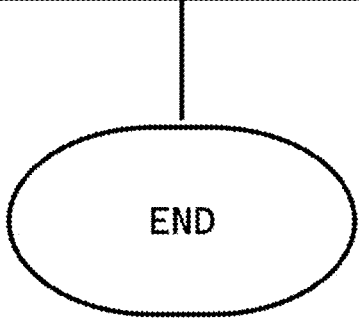
END
FIGURE 25

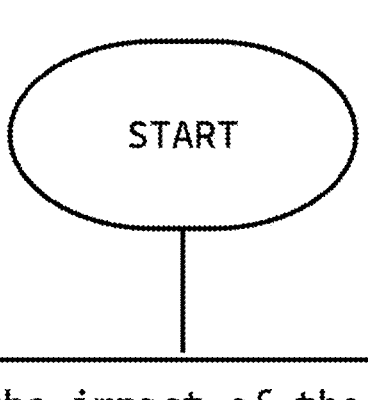
START
Simulating the impact of the transaction
on the user's financial position
using predictive analytics (S2600)
Considering factors such as upcoming
scheduled payments, expected income, and
historical cash flow patterns (S2602)
Providing personalized
recommendations for optimizing the
user's financial decisions (S2604)
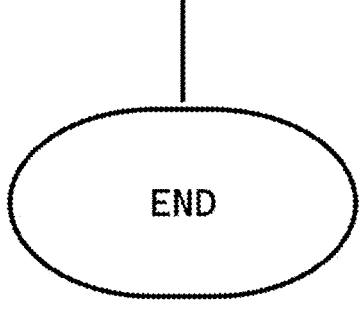
END
FIGURE 26

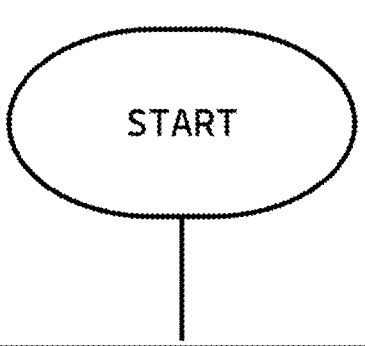
START
Implementing a federated learning
system to improve AI models across
multiple financial institutions (S2800)
Adapting to evolving fraud
tactics and financial market
conditions in real-time (S2802)
Periodically retraining models
using anonymized data to ensure
fairness and reduce bias (S2804)
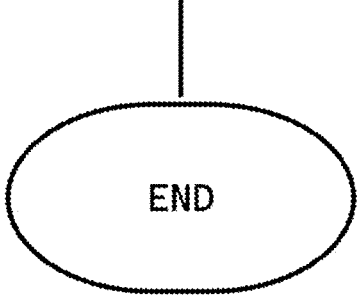
END
FIGURE 28

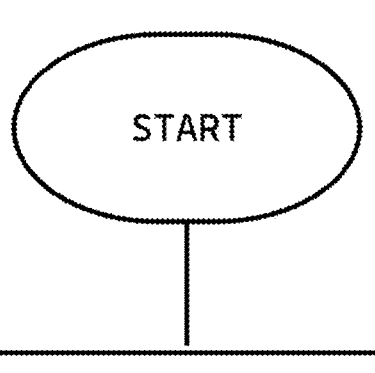
START
Implementing a multi-agent system where
specialized AI agents handle different
aspects of financial services (S2900)
Coordinating agents for tasks
such as portfolio management, risk
assessment, and customer service (S2902)
Using a master orchestrator agent
to optimize the overall financial
strategy for each user (S2904)
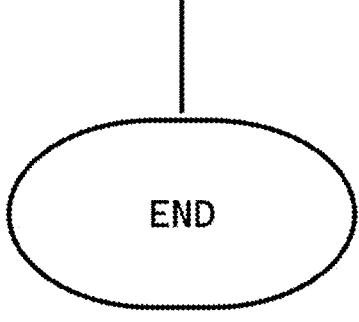
END
FIGURE 29

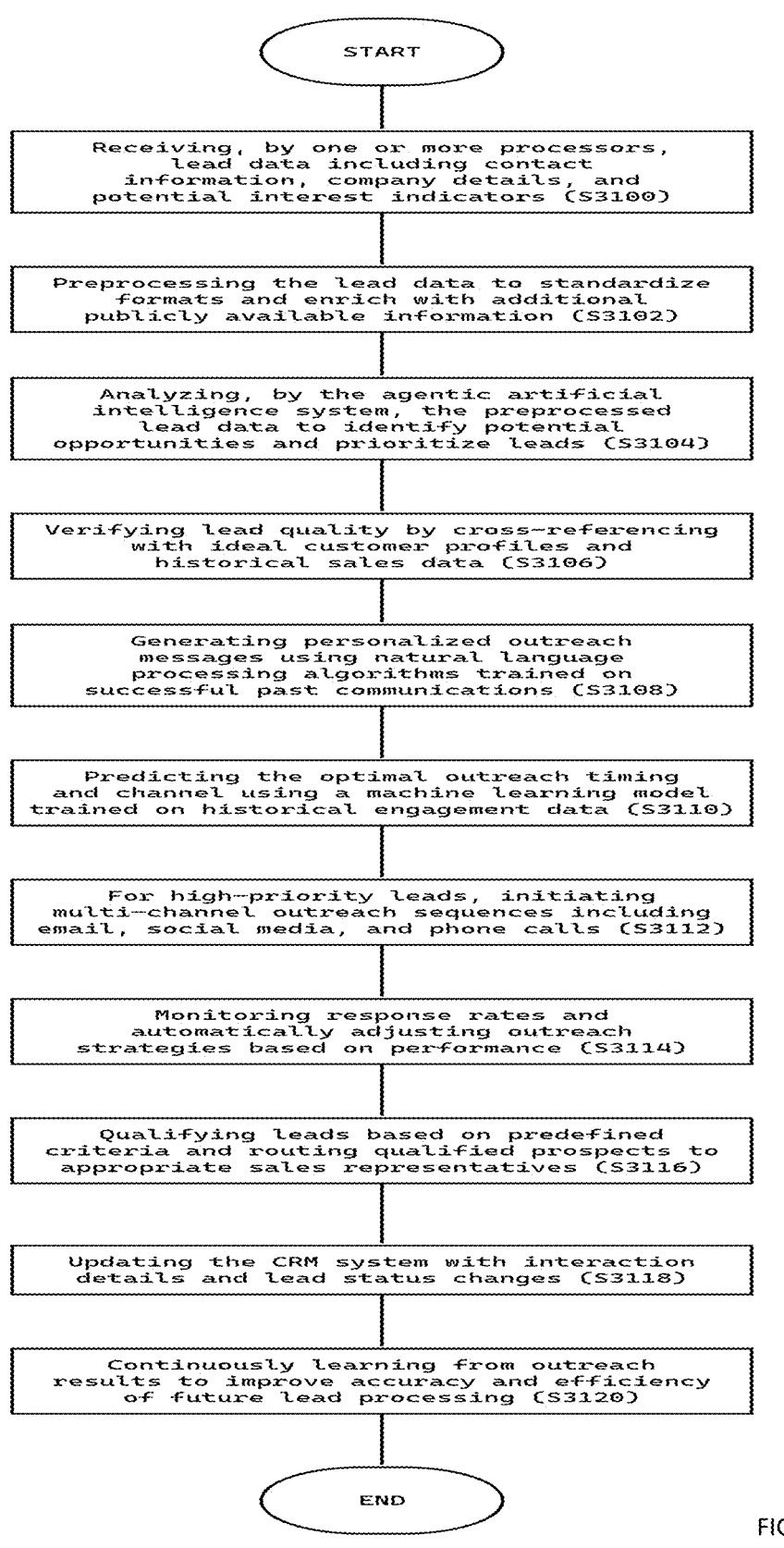

START

Receiving, by one or more processors, lead data including contact information, company details, and potential interest indicators (S3100)

Preprocessing the lead data to standardize formats and enrich with additional publicly available information (S3102)

Analyzing, by the agentic artificial intelligence system, the preprocessed lead data to identify potential opportunities and prioritize leads (S3104)

Verifying lead quality by cross-referencing with ideal customer profiles and historical sales data (S3106)

Generating personalized outreach messages using natural language processing algorithms trained on successful past communications (S3108)

Predicting the optimal outreach timing and channel using a machine learning model trained on historical engagement data (S3110)

For high-priority leads, initiating multi-channel outreach sequences including email, social media, and phone calls (S3112)

Monitoring response rates and automatically adjusting outreach strategies based on performance (S3114)

Qualifying leads based on predefined criteria and routing qualified prospects to appropriate sales representatives (S3116)

Updating the CRM system with interaction details and lead status changes (S3118)

Continuously learning from outreach results to improve accuracy and efficiency of future lead processing (S3120)

END

FIGURE 31

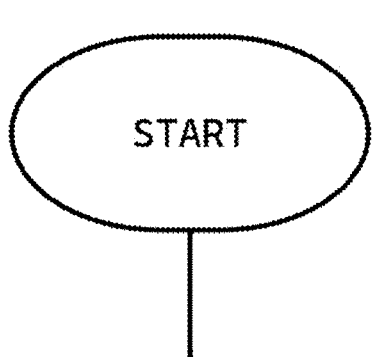
START
Implementing a sentiment analysis module to
gauge prospect interest levels from email
responses and call transcripts (S3200)
Adjusting follow-up strategies
based on detected sentiment (S3202)
Flagging highly positive or negative
responses for immediate human review (S3204)
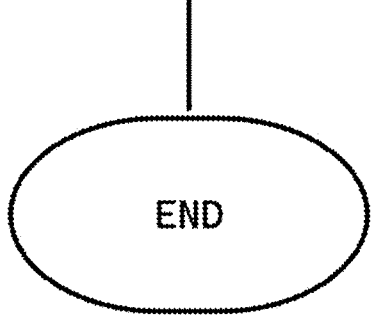
END
FIGURE 32

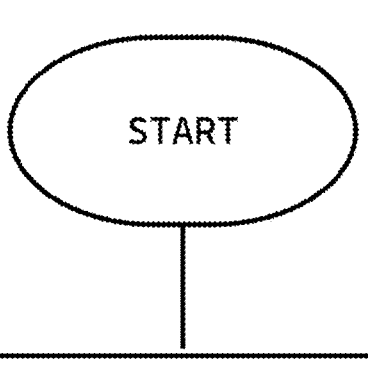
START
Employing natural language processing to extract relevant information from company websites and social media profiles (S3300)
Identifying key decision-makers and their roles within the prospect's organization (S3302)
Mapping the prospect's tech stack and potential pain points to tailor the sales approach (S3304)
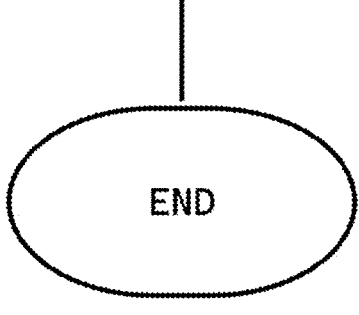
END
FIGURE 33

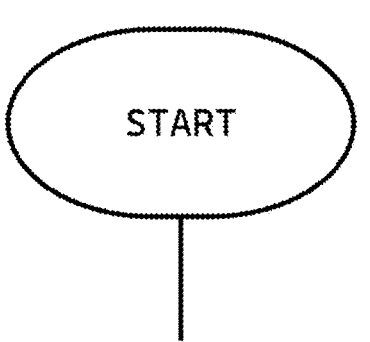
START
Utilizing a deep learning model
trained on a large corpus of
successful sales communications (S3500)
Considering factors such as prospect
industry, role, company size,
and detected pain points (S3502)
A/B testing different message
variations to continuously
optimize engagement rates (S3504)
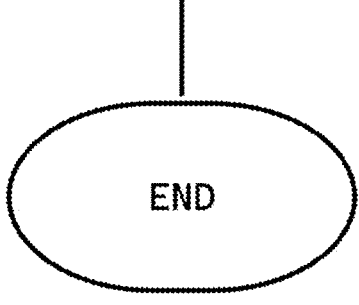
END
FIGURE 35

START

Analyzing historical engagement
data to identify patterns in
prospect responsiveness (S3700)

Considering factors such as time zone,
industry-specific work patterns, and
individual prospect behavior (S3702)

Dynamically adjusting outreach schedules
based on real-time response data (S3704)

END

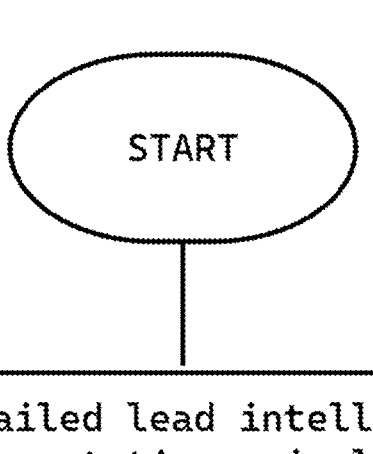
START
Generating detailed lead intelligence reports
for sales representatives, including prospect
research and interaction history (S3800)
Providing actionable insights and
talking points to guide human-led
sales conversations (S3802)
Offering real-time suggestions
during sales calls based on speech
analysis and sales playbooks (S3804)
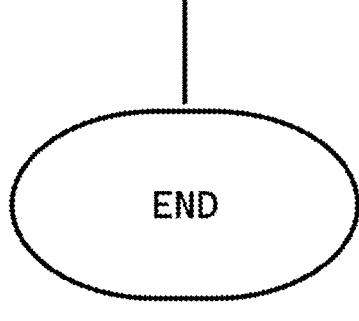
END
FIGURE 38

AGENTIC ARTIFICIAL INTELLIGENCE SYSTEM

BACKGROUND OF THE INVENTION

In many industries, including insurance, medical claims, financial transactions, and sales leads management, traditional processing techniques have often struggled to keep pace with surging data volumes and the complexity of decision-making requirements. Historically, systems in these domains have relied on manual interventions or semi-automated processes, leading to inefficiencies, increased processing times, and inconsistencies in outcomes. As these sectors continue to experience rapid growth and diversification in operational data, there is an ongoing need for more scalable, robust methodologies that can enhance the speed and accuracy of data processing and analysis, thereby reducing human error and optimizing workflow efficiency. This evolving landscape has intensified the interest in technologies that can integrate multiple data inputs and streamline complex decision-making processes across various application areas.

SUMMARY OF THE INVENTION

In one aspect, a method for agentic search using an AI-powered browser is disclosed. In one aspect, the method provides a browser with integrated AI functionalities and receives a natural language command from the user. In one aspect, the natural language command is parsed using a neural network to determine user intent. In one aspect, the browser autonomously performs a complex task based on the determined intent, wherein the task comprises multiple steps. In one aspect, the method processes real-time information with source citations to inform its operations. In one aspect, the method generates a response based on the processed information and the result of the complex task. In one aspect, the generated response is displayed to the user, and the knowledge base is updated based on the user interaction and task performance.

In another aspect, the method receives an insurance claim containing claimant data, incident information, and policy details. In one aspect, the method preprocesses the claim data to standardize formats and remove personally identifiable information. In one aspect, the method analyzes the preprocessed claim data with an agentic artificial intelligence system to identify potential errors, inconsistencies, or missing information. In one aspect, the method verifies claim eligibility by querying external databases and cross-referencing with policy information. In one aspect, the method assigns appropriate claim codes using machine learning algorithms trained on historical coding data. In one aspect, the method calculates the expected payout amount based on the assigned codes, policy terms, and historical claim data. In one aspect, the method predicts the likelihood of claim fraud using a machine learning model trained on historical claims data. In one aspect, the method initiates additional verification steps and gathers supporting documentation for claims with a high probability of fraud. In one aspect, the method submits the processed claim to the appropriate internal system for further review or approval, and updates the claim status while initiating appropriate follow-up actions. In one aspect, the method continuously learns from processed claims to improve the accuracy and efficiency of future claim processing.

In yet another aspect, a method is provided for processing medical insurance claims using an agentic artificial intelligence system. The method comprises receiving a medical insurance claim that includes patient data, treatment information, and provider details. It involves preprocessing the claim data to standardize formats and remove personally identifiable information. The preprocessed data is analyzed by the agentic artificial intelligence system to identify potential errors, inconsistencies, or missing information. Patient eligibility is verified by querying external databases and cross-referencing policy information. Appropriate medical codes are then assigned using machine learning algorithms trained on historical coding data. The system calculates the expected reimbursement amount based on these codes, contract terms, and payer policies. A machine learning model trained on historical claims data predicts the likelihood of claim denial. For claims with a high probability of denial, additional verification steps are initiated and supporting documentation is gathered. The processed claim is electronically submitted to the appropriate payer system, followed by monitoring of the claim status and automatic follow-up on pending or delayed claims. The system continuously learns from processed claims to improve the accuracy and efficiency of future claim processing.

In a further aspect, the method receives a financial transaction request containing user data, transaction details, and account information. In a further aspect, the method preprocesses the transaction data to standardize formats and encrypt sensitive information. In a further aspect, the agentic artificial intelligence system analyzes the preprocessed data to identify potential errors, inconsistencies, or suspicious patterns. In a further aspect, user identity and account status are verified by querying secure databases and cross-referencing historical data. In a further aspect, transaction risk is assessed using machine learning algorithms trained on historical transaction data. In a further aspect, the feasibility of the transaction is calculated based on account balances, credit limits, and regulatory requirements. In a further aspect, the likelihood of fraud is predicted using a machine learning model trained on historical fraud data. In a further aspect, transactions with high fraud probability trigger additional verification steps and enhanced security measures. In a further aspect, the processed transaction is routed to the appropriate financial networks or internal systems. In a further aspect, the transaction status is monitored and any issues or discrepancies are automatically handled. In a further aspect, the system continuously learns from processed transactions to improve the accuracy and efficiency of future transaction processing.

In one aspect, a method for processing sales leads using an agentic artificial intelligence system functioning as a Sales Development Representative begins by receiving lead data that includes contact details, company information, and potential interest indicators. In one aspect, the method involves preprocessing the received lead data to standardize formats and supplement it with additional publicly available information. In one aspect, the agentic artificial intelligence system analyzes the preprocessed data to identify potential opportunities and prioritize the leads. In one aspect, the system verifies lead quality by cross-referencing the information with ideal customer profiles and historical sales data. In one aspect, the system generates personalized outreach messages using natural language processing algorithms that have been trained on successful past communications. In one aspect, the method predicts the optimal outreach timing and channel by utilizing a machine learning model that is trained on historical engagement data. In one aspect, for high-priority leads, the system initiates multi-channel outreach sequences that include email, social media, and phone calls. In one aspect, the method monitors response rates and automatically adjusts outreach strategies based on performance feedback. In one aspect, the system qualifies leads based on predefined criteria and routes qualified prospects to appropriate sales representatives. In one aspect, the method updates the CRM system with interaction details and lead status changes, while continuously learning from outreach results to improve the accuracy and efficiency of future lead processing.

In another aspect, a method for processing medical insurance claims includes receiving, by one or more processors, a medical insurance claim including patient data, treatment information, and provider details; preprocessing the claim data to standardize formats and remove personally identifiable information; analyzing, by the agentic artificial intelligence system, the preprocessed claim data to identify potential errors, inconsistencies, or missing information; verifying patient eligibility by querying external databases and cross-referencing with policy information; assigning appropriate medical codes using machine learning algorithms trained on historical coding data; calculating the expected reimbursement amount based on the assigned codes, contract terms, and payer policies; predicting the likelihood of claim denial using a machine learning model trained on historical claims data; for claims with high denial probability, initiating additional verification steps and gathering supporting documentation; submitting the processed claim electronically to the appropriate payer system; monitoring the claim status and automatically following up on pending or delayed claims; continuously learning from processed claims to improve accuracy and efficiency of future claim processing.

Implementations can include one or more of:

a. implementing a natural language processing module to extract relevant clinical information from unstructured medical notes; mapping the extracted information to standardized medical terminologies; and using this mapped information to support accurate code assignment and claim validation.

b. analyzing the preprocessed claim data includes comparing the claim against a database of common billing errors and fraud patterns; flagging any suspicious patterns for human review; generating an alert if the claim exceeds predefined thresholds for cost or frequency of services.

c. integrating with electronic health record (EHR) systems to access comprehensive patient medical histories; verifying the medical necessity of claimed treatments based on diagnosis codes and clinical guidelines; identifying potential instances of upcoding or unbundling of medical services.

d. assigning appropriate medical codes by utilizing a deep learning model trained on a vast corpus of medical literature and coding guidelines; considering the patient's full medical context, including comorbidities and past treatments; providing confidence scores for each assigned code to assist human coders in review.

e. implementing a multi-agent system where specialized AI agents handle different aspects of the claim process; using a coordination agent to manage interactions between specialized agents for eligibility verification, coding, pricing, and fraud detection; aggregating outputs from each agent to make a final claim decision.

f. calculating the expected reimbursement amount comprises: applying complex pricing rules based on provider contracts, fee schedules, and bundled payment arrangements; adjusting for factors such as geographic location, place of service, and modifier codes; comparing the calculated amount with historical reimbursements for similar services to identify potential outliers.

g. generating a detailed explanation of benefits (EOB) in natural language, clearly explaining any denials or partial payments; customizing the language and detail level of the EOB based on the recipient (patient, provider, or payer); providing links to relevant policy documents or clinical guidelines to support the claim decision.

h. continuously learning from processed claims by implementing a federated learning system to improve AI models across multiple healthcare organizations; updating the system's decision-making algorithms based on appeal outcomes and human expert feedback; adapting to new medical procedures, coding updates, and policy changes in real-time.

i. integrating with clinical decision support systems to evaluate the appropriateness of treatments; flagging potential instances of overutilization or underutilization of medical services; providing recommendations for alternative, evidence-based treatments when applicable.

In a further aspect, a method for processing financial transactions using an agentic artificial intelligence system includes receiving, by one or more processors, a financial transaction request including user data, transaction details, and account information; preprocessing the transaction data to standardize formats and encrypt sensitive information; analyzing, by the agentic artificial intelligence system, the preprocessed transaction data to identify potential errors, inconsistencies, or suspicious patterns; verifying user identity and account status by querying secure databases and cross-referencing with historical data; assessing transaction risk using machine learning algorithms trained on historical transaction data; calculating the transaction feasibility based on account balances, credit limits, and regulatory requirements; predicting the likelihood of fraud using a machine learning model trained on historical fraud data; for transactions with high fraud probability, initiating additional verification steps and security measures; routing the processed transaction to the appropriate financial networks or internal systems; monitoring the transaction status and automatically handling any issues or discrepancies; continuously learning from processed transactions to improve accuracy and efficiency of future transaction processing.

Implementations can include one or more of:

a. analyzing the preprocessed transaction data by employing natural language processing to extract relevant information from transaction descriptions; categorizing transactions based on merchant information and spending patterns; and identifying anomalies that deviate from the user's typical financial behavior.

b. integrating with external data sources such as credit bureaus, sanctions lists, and market data feeds; and cross-referencing transaction details with these external sources for enhanced due diligence; adjusting risk scores based on real-time market conditions and regulatory updates.

c. assessing transaction risk by utilizing a deep learning model that considers multiple factors including transaction amount, frequency, location, and counterparty information; generating a holistic risk score that combines credit risk, market risk, and operational risk; providing explainable AI outputs to justify risk assessments to regulators and stakeholders.

d. implementing a blockchain-based system for secure, transparent recording of transactions; using smart contracts to automate complex financial agreements and ensure regulatory compliance; maintaining an immutable audit trail for all transactions to facilitate regulatory reporting and dispute resolution.

e. transaction feasibility by simulating the impact of the transaction on the user's financial position using predictive analytics; considering factors such as upcoming scheduled payments, expected income, and historical cash flow patterns; providing personalized recommendations for optimizing the user's financial decisions.

f. generating natural language explanations for transaction decisions, including approvals, denials, or additional verification requirements; customizing the communication style based on user preferences and financial literacy level; providing actionable insights and educational content to improve the user's financial health.

g. continuously learning from processed transactions by implementing a federated learning system to improve AI models across multiple financial institutions; adapting to evolving fraud tactics and financial market conditions in real-time; and periodically retraining models using anonymized data to ensure fairness and reduce bias.

h. implementing a multi-agent system where specialized AI agents handle different aspects of financial services; coordinating agents for tasks such as portfolio management, risk assessment, and customer service; using a master orchestrator agent to optimize the overall financial strategy for each user.

i. integrating with regulatory compliance systems to ensure adherence to financial regulations; automatically generating required regulatory reports based on processed transactions; proactively identifying potential compliance issues and suggesting corrective actions.

Advantages of one implementation may include one or more of the following:

Enhanced processing efficiency and speed by automating data handling and decision-making tasks, thereby reducing manual interventions and processing delays.

Improved accuracy and consistency via standardized data preprocessing and error-checking mechanisms that minimize human error and data inconsistencies.

Robust fraud and risk detection using machine learning models trained on historical data, which enables timely identification of anomalous patterns across insurance claims, financial transactions, and sales leads.

Dynamic and continuous learning that allows the system to adapt and improve processing accuracy over time based on feedback from processed claims, transactions, or leads.

Increased security and privacy protection through the preprocessing step that removes personally identifiable information and encrypts sensitive data before analysis.

Seamless integration with external databases and internal systems to enable real-time cross-verification of data, ensuring that claim eligibility, patient coverage, transaction feasibility, and lead quality are accurately and efficiently validated.

Optimized resource utilization by routing cases to the appropriate internal systems or workflows-whether for human review, further verification, or automatic follow-up-thus ensuring a scalable and responsive processing infrastructure.

Enhanced customer service and business outcomes through personalized outreach in the context of sales lead management and timely claim processing in insurance and medical-related fields, which can lead to higher satisfaction rates and improved operational performance.

These advantages collectively contribute to a more robust, scalable, and intelligent processing environment that can effectively handle the complexities of modern data-intensive industries.

BRIEF DESCRIPTION OF DRAWINGS

FIG. 5 shows an exemplary flowchart showing steps for implementing and coordinating a multi-agent AI system for processing claims.

FIG. 6 shows an exemplary flowchart depicting a process of predicting settlement amounts using machine learning, adjusting for market conditions, and comparing with past claims.

FIG. 7 shows an exemplary flowchart outlining the process of generating a natural language explanation for claim decisions, presenting it to relevant parties, and providing an option for human review.

FIG. 8 shows an exemplary flowchart depicting a feedback loop for retraining machine learning models using anonymized claim data and human adjuster input.

FIG. 9 shows an exemplary flowchart outlining steps for integrating data sources, corroborating claim details, and identifying inconsistencies.

FIG. 10 shows an exemplary flowchart illustrating the process of implementing privacy-preserving federated learning in AI models with focus on data sharing and compliance.

FIG. 15 shows an exemplary flowchart outlining a process for medical coding using a deep learning model.

FIG. 18 shows an exemplary flowchart illustrating steps in generating and customizing an explanation of benefits with supportive links.

FIG. 19 shows an exemplary flowchart illustrating structured process flow for enhancing an AI-driven healthcare system.

FIG. 22 shows an exemplary flowchart illustrating a process for using AI in financial transactions, including information extraction, categorization, and anomaly detection.

FIG. 25 shows an exemplary flowchart depicting a process starting with implementing a blockchain-based system, using smart contracts for automating financial agreements, and maintaining an immutable audit trail, ending with regulatory reporting and dispute resolution.

FIG. 26 shows an exemplary flowchart illustrating the process of financial decision optimization based on predictive analytics and user-specific factors.

FIG. 28 shows a flowchart detailing a process for improving AI models, adapting to fraud, and retraining for fairness in financial systems.

FIG. 29 shows an exemplary flowchart depicting the implementation and coordination of specialized AI agents for various financial services tasks, culminating in an optimized strategy by a master orchestrator agent.

FIG. 31 shows an exemplary flowchart illustrating an agentic artificial intelligence system for processing sales leads including steps for receiving, preprocessing, analyzing, verifying, generating outreach, predicting timings, initiating sequences, monitoring, qualifying, updating CRM, and continuous learning.

FIG. 32 shows an exemplary flowchart illustrating a process for sentiment analysis in customer interactions FIG. 33 shows an exemplary flowchart illustrating a process involving natural language processing, identifying decision-makers, and mapping tech stacks in a prospect's organization.

FIG. 35 shows an exemplary flowchart illustrating steps for optimizing sales communications using deep learning and A/B testing.

FIG. 38 shows an exemplary flowchart outlining an AI system's process for generating reports, providing insights, and offering real-time suggestions for sales representatives.

DETAILED DESCRIPTION OF THE INVENTION

Figure 1:
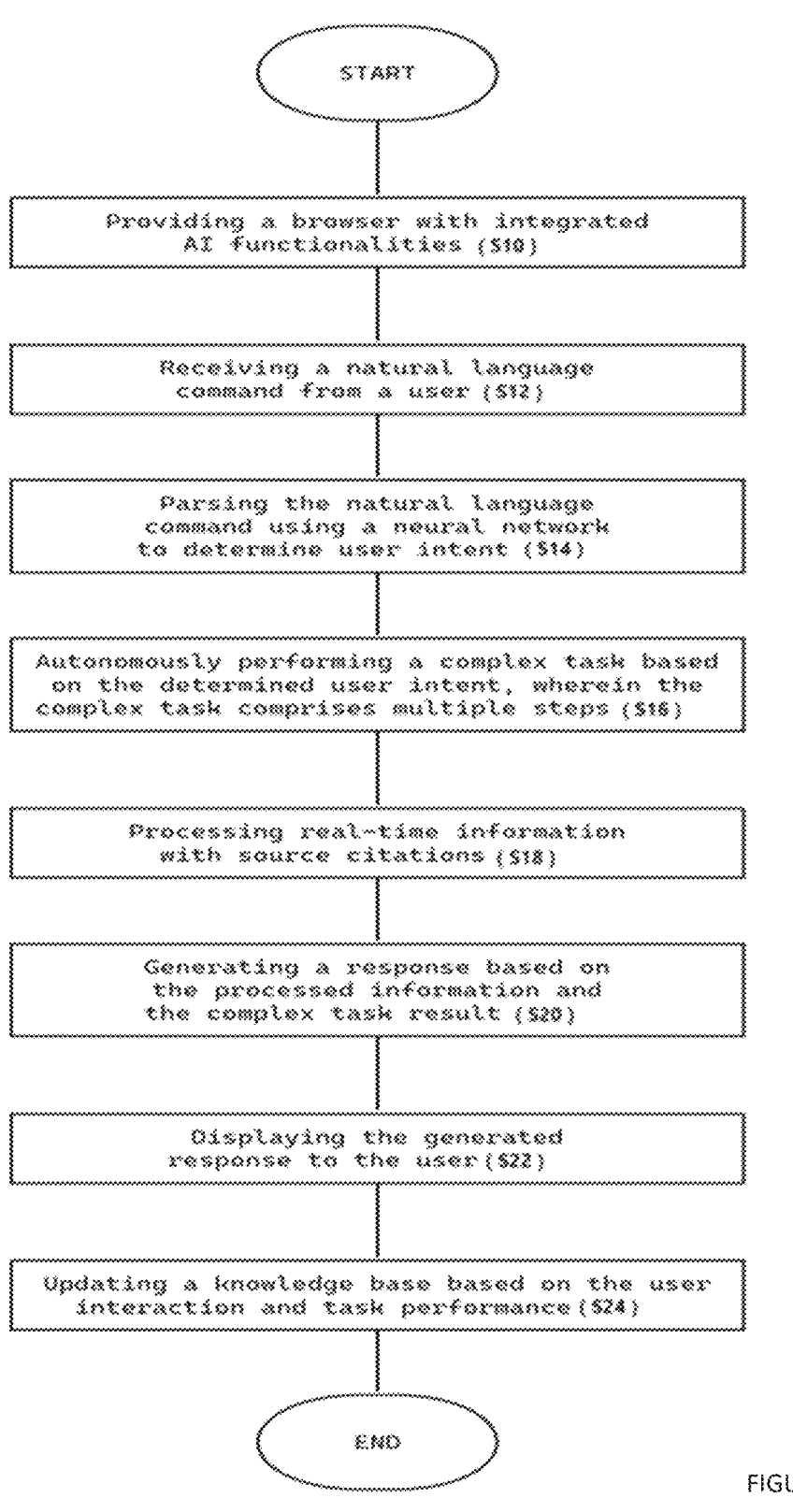
FIG. 1 shows an exemplary flowchart depicting steps for an AI-powered browser performing tasks and updating knowledge base.
Figure 2A:
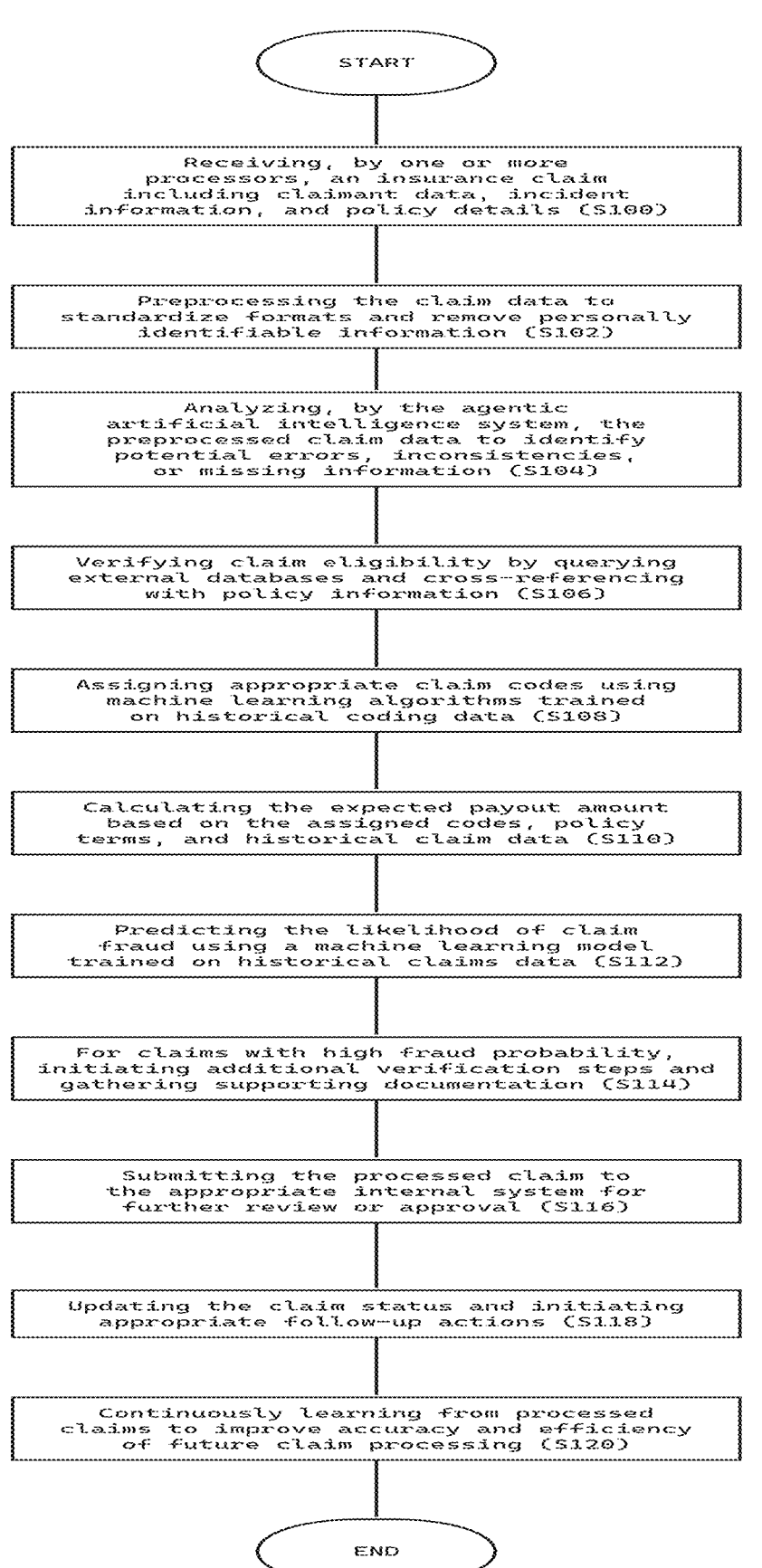
FIG. 2A shows an exemplary flowchart depicting steps in an agentic artificial intelligence system for automated claims processing, including data receiving, preprocessing, analyzing, verifying, coding, calculating payouts, fraud prediction, submission, status updating, and learning.
Figure 2B:
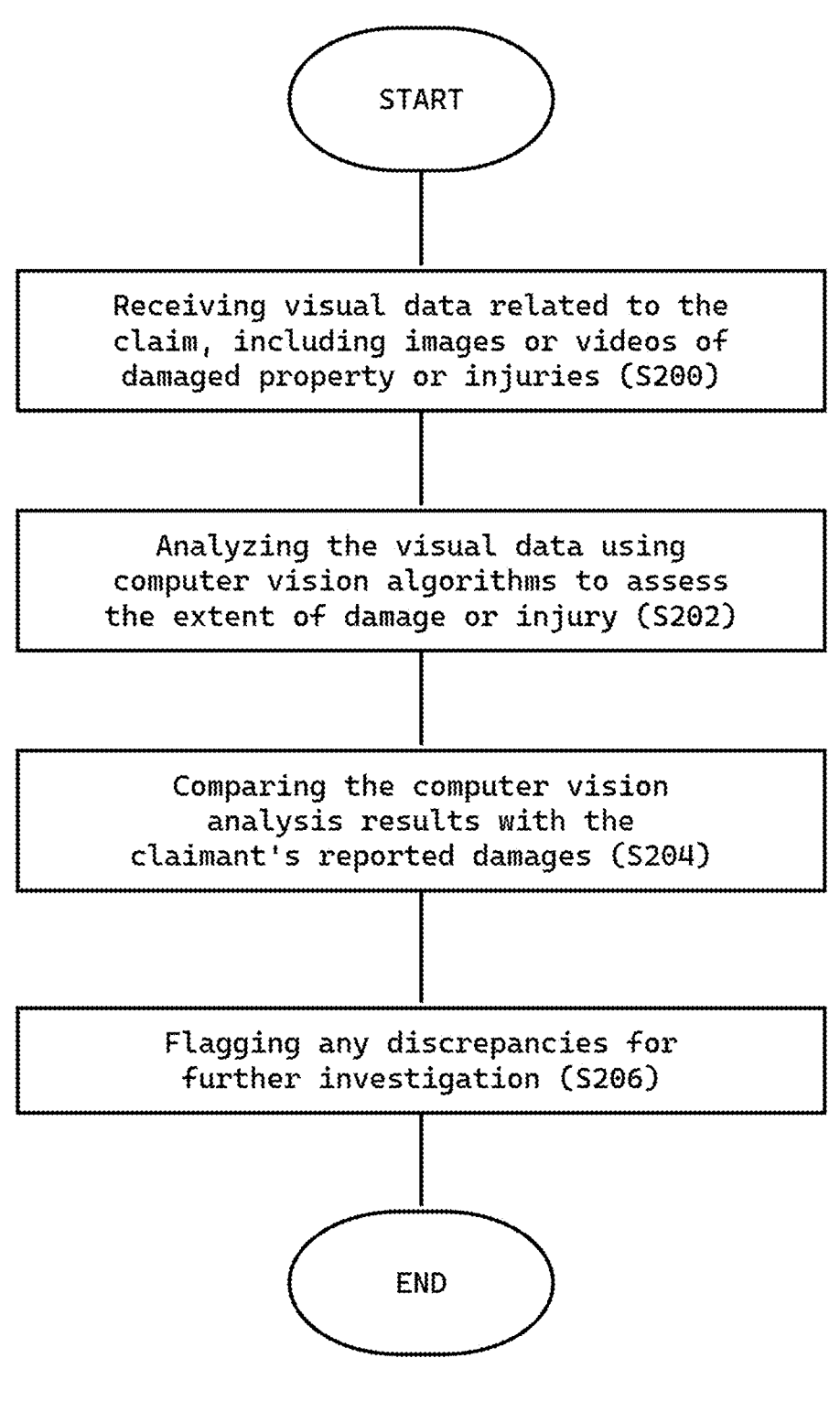
FIG. 2B shows an exemplary flowchart illustrating a process for automated claims assessment using visual data and computer vision algorithms.

One implementation provides an AI-powered browser that incorporates integrated artificial intelligence capabilities, as described in S10. The browser is designed to receive natural language commands from the user. These commands are processed through a neural network, which accurately determines the user's intent by analyzing both syntactic and semantic elements of the input. The system is capable of handling a wide variety of expressions by detecting contextual cues and analyzing linguistic patterns. Based on the parsed intent, the system autonomously executes complex tasks composed of multiple sub-steps. Additionally, the system processes real-time information, complete with source citations, to ensure that all actions are contextually informed and reliable.

Once the complex task is executed, a response is generated that integrates the processed real-time information with the outcomes of the task. This response is displayed to the user in a clear and accessible manner, as referenced in S12. The output is presented on the user interface in a way that reinforces usability, ensures visibility, and allows the user to easily assess the results of the performed tasks. The system dynamically adapts the display based on user preferences and past interactions, ensuring a seamless and intuitive user experience.

Following the presentation of the response, the method updates a knowledge base based on user interaction and task performance, as indicated in S14. This step involves analyzing feedback and performance outcomes to continuously refine and expand the system's existing database. By doing so, the system enhances its overall precision and efficiency in handling future tasks. The knowledge base is periodically audited to ensure data accuracy and relevance, as described in S22.

The system includes a module for S16, which ensures that the user interface dynamically adapts based on the user's preferences and past interactions. This adaptation enhances the browsing experience by personalizing the interface to better meet the user's needs. The system continuously learns from user interactions, improving its recommendations and assistance over time.

During the parsing process, the system incorporates S18, which involves cross-referencing the parsed intent with historical user data. This step further refines the task execution process by leveraging past interactions to improve accuracy and relevance. The system ensures that the extracted intent reliably directs the subsequent execution of tasks, leading to higher performance and user satisfaction.

The system incorporates a feedback loop, as described in S20, where user interactions and task outcomes are continuously analyzed. This feedback loop enables the system to refine its AI performance and update its knowledge base in real-time. By learning from each interaction, the system continuously improves its ability to handle complex tasks and provide accurate responses.

To maintain data accuracy and relevance, the system performs periodic audits of the knowledge base, as referenced in S22. These audits ensure that the information stored in the knowledge base remains up-to-date and reliable. The system also anonymizes user data before storage to ensure privacy and compliance with data protection regulations.

The system includes S24, which involves generating detailed reports on task performance and user satisfaction. These reports provide valuable insights for further system improvements, enabling the system to adapt and optimize its functionalities over time. The reports also help identify areas for enhancement, ensuring that the system continues to meet user needs effectively.

The processes described in flowcharts 2A and 2B provide a comprehensive approach to insurance claim processing. Flowchart 2A focuses on the textual and policy-related aspects of the claim, Flowchart 2B enhances the process by incorporating visual data analysis. The process S100 begins with one or more processors receiving an insurance claim. This claim includes detailed information about the incident, such as the claimant's identification, the nature of the incident, and relevant policy details. The data collected at this stage forms the foundational input for subsequent processing steps. This includes structured data (e.g., policy numbers, claim amounts) and unstructured data (e.g., claimant descriptions of the incident). The system ensures that all essential elements of the claim are accurately captured, including the claimant's personal details, incident specifics, and applicable policy information.

The received claim data is preprocessed to standardize formats and remove personally identifiable information S102. This step involves converting various representations of raw claim data into a unified format to ensure consistency and compatibility with subsequent processing modules. Sensitive information, such as names, addresses, and social security numbers, is systematically eliminated to protect privacy and adhere to data protection standards (e.g., GDPR, HIPAA). The preprocessing step also involves data enrichment, where missing or incomplete data is supplemented with additional information from external sources or internal databases.

The agentic artificial intelligence system analyzes the preprocessed claim data to identify potential errors, inconsistencies, or missing information S104. This analysis includes comparing data entries against expected values, checking for completeness, and identifying discrepancies that could affect downstream processing. The system reviews the structured data to detect any errors that might have occurred during data entry, transmission, or formatting. It also compares different data elements to identify inconsistencies arising from conflicting details within the claim. The system verifies that all required information is present to support further processing, ensuring that the claim data is both accurate and comprehensive.

The system verifies the claim's eligibility by querying external databases and cross-referencing the claim information with policy details S106. This step ensures that the claim meets the necessary conditions stipulated by the insurance policy. External databases, such as government or industry-specific repositories, are accessed to retrieve pertinent information. The retrieved data is compared against the policy information associated with the claim to confirm compliance with eligibility criteria. This process ensures that prerequisite conditions, such as policy validity or the fulfillment of specific coverage requirements, are met before the claim proceeds further in the processing workflow.

The system assigns appropriate claim codes using machine learning algorithms trained on historical coding data S108. These algorithms analyze the available claim data to identify coding patterns that correspond with previously processed claims. The machine learning model leverages historical patterns to systematically assign a claim code that accurately reflects the nature of the presented claim. This approach enhances the consistency and accuracy of claim categorization within the overall claim processing system. The assigned codes are used to categorize the claim for further processing, ensuring that it is routed to the appropriate internal systems for review or approval.

The system calculates the expected payout amount by integrating the assigned claim codes with the applicable policy terms and historical claim data S110. This calculation involves retrieving the relevant policy details to understand the coverage parameters and benefit limits. Historical claim data is used to gauge typical payout amounts and adjust the estimate accordingly. This ensures that the expected payout reflects both the specific circumstances of the current claim and the historical trends that inform the probability of similar claims. The calculated payout amount is used to determine the financial impact of the claim and to ensure that the payout aligns with the policy terms and historical data.

A machine learning model trained on historical claim data predicts the likelihood of fraud S112. The system evaluates the claim data to generate a risk score, which quantifies the probability of fraudulent activity. The algorithm leverages patterns and anomalous features identified in historical claims to generate a risk score. When a claim's risk score exceeds a predetermined threshold, the system triggers additional verification steps. The predictive process serves as a key element in automating the identification of potentially fraudulent claims while enhancing the overall efficiency and reliability of claim processing operations.

For claims with a high probability of fraud, the system flags them for additional verification S114. This step involves gathering supporting documentation and performing targeted verifications to ensure the claim's legitimacy. The system conducts targeted verifications and acquires supplementary data to ensure that the claim is thoroughly validated before proceeding with further processing. This may include requesting additional evidence from the claimant or querying external databases for further validation. The flagged claims are routed to specialized fraud investigation units for further scrutiny, ensuring that potential fraudulent activity is detected and addressed promptly.

Once the claim has been thoroughly analyzed and verified, it is submitted to the appropriate internal system for further review or approval S116. This step ensures that the claim is ready for final adjudication. The processed claim is electronically transmitted to an internal system designated for additional review or approval. This submission facilitates the seamless flow of information, ensuring that the processed claim can be efficiently evaluated by the relevant internal mechanisms before final action is taken. The system ensures that all necessary documentation and verification steps have been completed before the claim is submitted for final approval.

The system updates the claim status to reflect its progress in the workflow and initiates any necessary follow-up actions S118. This includes scheduling further reviews, dispatching notifications to designated personnel, or establishing additional verification measures where necessary. The system automatically revises the claim's current status to reflect its progress in the workflow. This mechanism ensures that claims are continuously monitored and managed until they reach a final resolution. Follow-up actions may include sending notifications to the claimant, updating internal records, or initiating additional verification steps if required.

The system continuously learns from processed claims to improve the accuracy and efficiency of future claim processing S120. Data from each claim is used to retrain machine learning models, ensuring that the system adapts to emerging patterns and improves over time. The system analyzes the outcomes of processed claims to identify trends, refine algorithms, and enhance the overall accuracy and efficiency of the claim processing workflow. This continuous learning mechanism ensures that the system remains responsive and efficient in dynamically changing operational circumstances, improving the overall performance of the claim processing system.

The system receives visual data, such as images or videos, depicting damaged property or injuries S200. This visual data provides additional context and evidence to support the claim. The visual data may include photographs of damaged vehicles, property, or injuries sustained during the incident. This data is essential for assessing the extent of damage or injury and validating the claimant's reported damages.

The visual data is analyzed using computer vision algorithms to assess the extent of damage or injury S202. The algorithms process image attributes, detect structural anomalies, and quantify visible impairments to derive metrics indicative of the damage severity. The computer vision algorithms are trained to identify specific features in the visual data, such as cracks, dents, or other signs of damage. The analysis provides a detailed assessment of the damage, which is used to validate the claimant's reported damages. The system generates a report based on the visual analysis, which includes metrics such as the extent of damage, the estimated cost of repairs, and any anomalies detected in the visual data.

The results of the computer vision analysis are compared with the damages reported by the claimant S204. This comparison helps identify any discrepancies between the visual evidence and the claimant's description of the incident. The system evaluates the consistency between the visual analysis and the claimant's report. Any inconsistencies, such as discrepancies in the extent of damage or the nature of the injuries, are flagged for further investigation. This step ensures that the claim is thoroughly validated and that any potential inaccuracies or inconsistencies are addressed before final adjudication.

Any discrepancies identified during the comparison are flagged for further investigation S206. This step ensures that potential inaccuracies or inconsistencies in the claim are thoroughly examined before final adjudication. The system generates a flag indicator in the claim record or routes the flagged claim to a designated review queue for further scrutiny. The specific patterns or rules that triggered the discrepancy are recorded, enabling human operators to review and assess the validity and significance of the anomaly more efficiently. This step enhances the overall accuracy and integrity of the claim processing workflow by ensuring that all claims are thoroughly vetted before approval.

Figure 3:
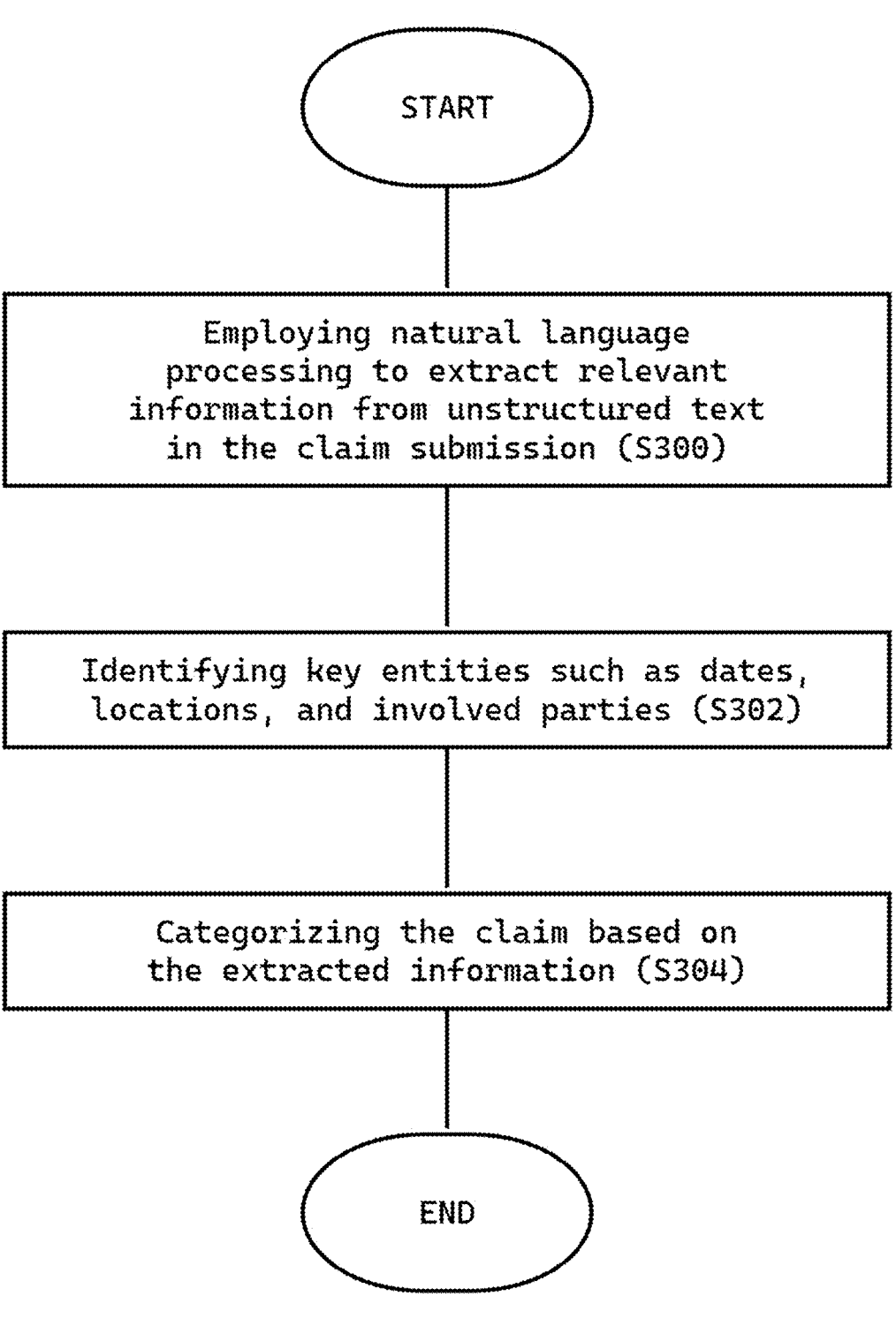
FIG. 3 shows an exemplary flowchart for processing claim submissions using natural language processing to extract information, identify key entities, and categorize claims.

FIG. 3 shows an exemplary flowchart for processing claim submissions using natural language processing to extract information, identify key entities, and categorize claims. The process begins with the system employing natural language processing (NLP) techniques to extract relevant information from unstructured text within the claim submission S300. This step focuses on processing the textual content of the claim to identify valuable data. The NLP module analyzes the unstructured text, such as claimant descriptions, incident reports, or medical notes, to extract key details. This includes identifying entities like dates, locations, involved parties, and specific incident details. The extracted information is transformed into structured data, which can be used to support subsequent claim processing activities. This step ensures that valuable insights hidden in unstructured text are captured and utilized effectively.

The system identifies key entities from the claim submission, such as dates, locations, and involved parties S302. This step is part of a broader method that employs natural language processing to extract relevant information from unstructured claim text. The NLP module uses entity recognition algorithms to pinpoint specific elements within the text. For example, it identifies dates (e.g., the date of the incident), locations (e.g., where the incident occurred), and involved parties (e.g., the claimant, witnesses, or third parties). By identifying these essential components, the system facilitates the efficient categorization and analysis of insurance claims. This step ensures that all critical information is captured and organized for further processing.

The system categorizes the claim based on the information extracted from the unstructured text S304. This categorization process is guided by data obtained from natural language processing, ensuring that identified entities such as dates, locations, and involved parties influence how the claim is classified. The system uses predefined categories or machine learning models to assign the claim to the appropriate category. For example, a claim involving a car accident may be categorized under "Auto Insurance," while a claim involving property damage may be categorized under "Home Insurance." The categorization step ensures that claims are organized systematically, facilitating further processing and decision-making. It also helps in routing the claim to the appropriate internal systems or departments for review and approval.

The steps S300-S304 work together to transform unstructured claim data into structured, actionable information. The process begins with extracting relevant details from unstructured text S300, identifying key entities such as dates, locations, and involved parties S302, and finally categorizing the claim based on the extracted information S304. This workflow ensures that all critical information is captured, organized, and utilized effectively, enhancing the overall efficiency and accuracy of the claim processing system.

For example, if a claimant submits a description of a car accident, the NLP module extracts details such as the date of the accident, the location, and the parties involved S300-S302. The system then categorizes the claim as an "Auto Insurance" claim S304, ensuring that it is routed to the appropriate department for further processing. This integrated approach streamlines the claim handling process, reducing manual effort and improving the overall accuracy of claim categorization and processing.

Figure 4:
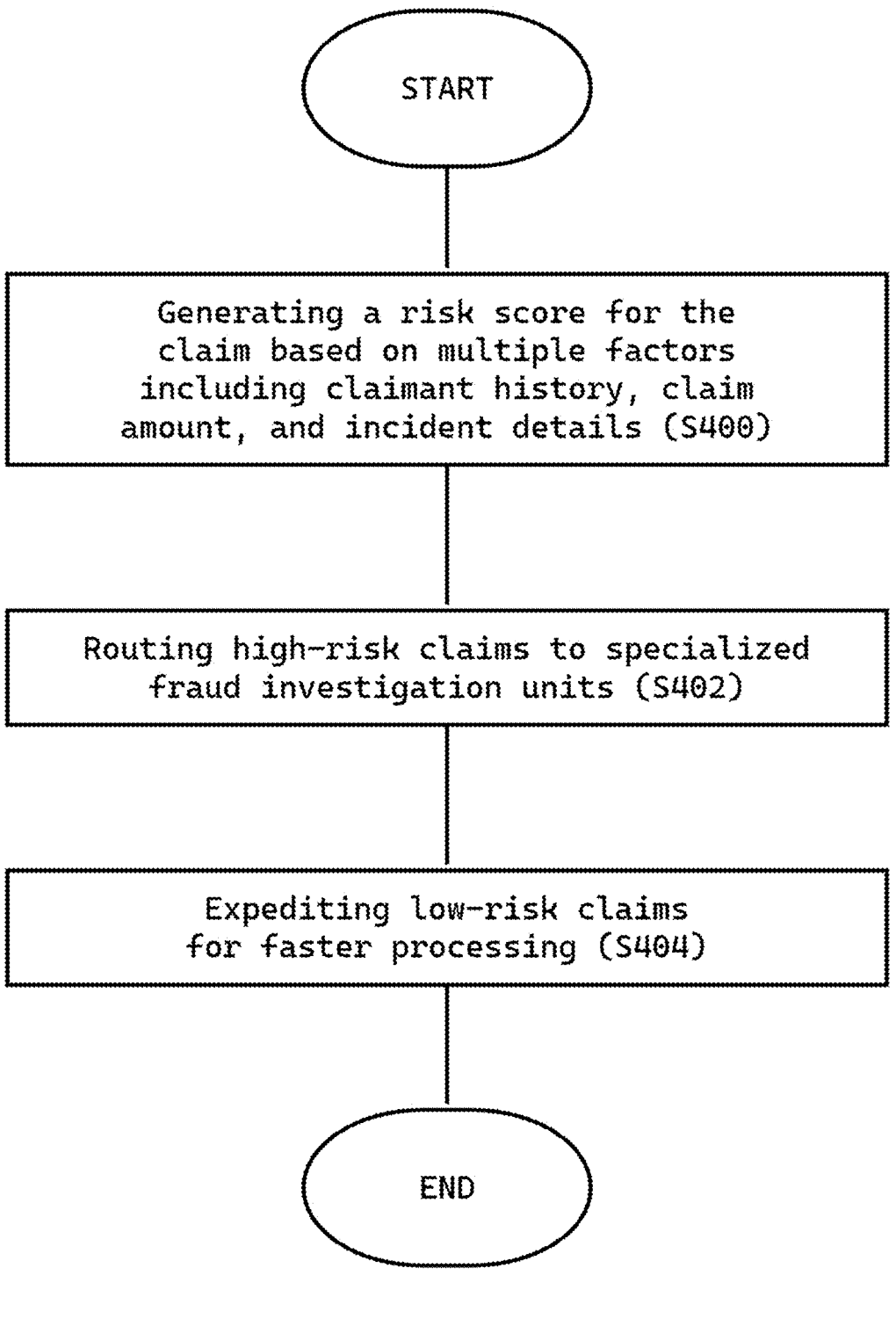
FIG. 4 shows an exemplary flowchart illustrating an AI system process for claims, including generating a risk score, routing high-risk claims to fraud units, and expediting low-risk claims.

FIG. 4 shows an exemplary flowchart illustrating an AI system process for claims, including generating a risk score, routing high-risk claims to fraud units, and expediting low-risk claims. The steps S400-S404 work together to optimize the claim processing workflow by assessing the risk associated with each claim and directing it to the appropriate processing pathway. The process begins with generating a risk score for each claim (S400), which quantifies the likelihood of fraud or risk. High-risk claims are then directed to specialized fraud investigation units for additional scrutiny (S402), while low-risk claims are expedited for faster processing (S404).

The process begins with the system generating a risk score for each insurance claim S400. This score is calculated based on various factors such as the claimant's history, the amount of the claim, and details of the incident involved. The system aggregates historical data on claimant behavior, evaluates the monetary value of the claim, and analyzes specifics of the reported incident using an array of machine learning models and statistical algorithms. The risk score quantifies the likelihood of fraud or the potential risk associated with processing the claim. This assessment helps to determine the appropriate claim processing pathway, ensuring that high-risk claims receive additional scrutiny while low-risk claims are expedited.

For claims that display an elevated level of risk, the system directs them to specialized fraud investigation units S402. This step involves routing the claim to a dedicated team or system designed to handle complex or suspicious cases. The fraud investigation units perform additional verification steps, such as gathering supporting documentation, cross-referencing external databases, and conducting targeted investigations to confirm the legitimacy of the claim. This process ensures that potential fraudulent activity is detected and addressed promptly, reducing the risk of fraudulent payouts and maintaining the integrity of the claim processing system.

The system expedites the handling of claims with reduced risk to ensure more efficient processing S404. Claims that exhibit a decreased likelihood of fraud or errors are prioritized for quicker resolution within the system. The system identifies minimal-risk claims through the generated risk score and bypasses additional fraud verification steps, initiating rapid settlement procedures. This approach minimizes delays associated with claims that are straightforward and unlikely to involve fraudulent activity. By expediting low-risk claims, the system enhances overall operational productivity and customer satisfaction, reducing the time taken to process straightforward claims and improving the overall efficiency of the claim processing workflow.

For example, if a claim is flagged as high-risk due to inconsistencies in the claimant's history or the nature of the incident, it is routed to a fraud investigation unit for further verification S402. Conversely, if a claim is deemed low-risk based on the claimant's clean history and straightforward incident details, it is expedited through the system for rapid settlement S404. This integrated approach ensures that resources are allocated efficiently, with high-risk claims receiving the necessary scrutiny and low-risk claims being processed quickly to enhance customer satisfaction.

FIG. 5 shows an exemplary flowchart showing steps for implementing and coordinating a multi-agent AI system for processing claims. The system implements a multi-agent system where specialized AI agents handle different aspects of the claim process S500. Each agent is designed to perform distinct functions, such as eligibility verification, coding, pricing, and fraud detection. These specialized agents operate collaboratively, ensuring that each aspect of the claim is handled by an expert system. This distributed approach enhances efficiency and accuracy in claim processing.

A master orchestrator agent coordinates the actions of the specialized agents S502. This orchestrator ensures seamless communication and integration among the various agents, facilitating effective collaboration and task management. The orchestrator dynamically adjusts task priorities and sequences, ensuring that the overall claim processing workflow is optimized and that each agent's output is harmonized into a cohesive decision-making process.

The outputs generated by each specialized agent are combined to form a comprehensive decision regarding the insurance claim S504. This aggregation process ensures that information from all aspects of the claim process is considered, leading to a well-rounded and informed final decision. The final decision is based on the aggregated data, ensuring that all relevant factors, such as eligibility, coding accuracy, pricing, and fraud risk, are taken into account.

FIG. 6 shows an exemplary flowchart depicting a process of predicting settlement amounts using machine learning, adjusting for market conditions, and comparing with past claims. The system employs a machine learning model trained on historical claim data to predict the likely settlement amount S600. This model leverages past claim information to provide an estimate of the expected financial compensation for a new claim. The prediction considers relevant historical patterns and data points, ensuring that the settlement amount is consistent with previous claims of a similar nature.

The predicted settlement amount is refined by considering current market conditions and specific regional characteristics S602. This adjustment accounts for factors such as regional cost differentials, local economic conditions, and regulatory requirements. The system uses algorithms to incorporate these factors, ensuring that the settlement amount reflects real-world scenarios and enhances the reliability and fairness of the calculated claim amount.

The system compares the calculated settlement amount with historical data for similar claims to identify potential outliers S604. This comparison ensures that the settlement estimate is consistent with established benchmarks. If the calculated value diverges significantly from historical data, the system flags the result for further review, triggering additional verification steps or manual intervention.

FIG. 7 shows an exemplary flowchart outlining the process of generating a natural language explanation for claim decisions, presenting it to relevant parties, and providing an option for human review. The system generates a natural language explanation for the claim decision, detailing the key factors that influenced the outcome S700. This explanation includes information such as the claimant's history, policy conditions, and any indicators of potential anomalies. The natural language output is designed to be clear and comprehensive, ensuring that both the claimant and the claims adjuster understand the basis of the decision.

The detailed reasoning behind the decision is conveyed to both the claimant and the claims adjuster S702. This step ensures transparency by communicating the key factors that influenced the outcome. The explanation is presented in a user-friendly format, making it accessible to all relevant parties and enhancing trust in the decision-making process.

The system provides a mechanism for human evaluation whenever the decision made by the artificial intelligence is contested S704. This process ensures that any disputes or concerns raised by stakeholders can be addressed through manual intervention. The explanation and relevant claim data are routed to a designated human review module, where a claims adjuster can re-evaluate the decision and, if necessary, override the AI system's decision based on a comprehensive assessment of the claim details.

FIG. 8 shows an exemplary flowchart depicting a feedback loop for retraining machine learning models using anonymized claim data and human adjuster input. The system periodically retrains machine learning models using anonymized data from recent claims S800. This ongoing retraining aims to enhance the models' capabilities by incorporating fresh data, ensuring their continual improvement and adaptation to new patterns. The use of anonymized data maintains user privacy while allowing the models to learn effectively from recent experiences.

A feedback loop is implemented whereby human adjusters can correct or approve decisions made by the AI system S802. This interaction permits real-time adjustments, ensuring that the AI's outputs align with human expertise and judgment. Incorporating human insights refines the decision-making process, resulting in heightened accuracy and reliability in claim assessments.

The step S804 refers to the process of updating the system's decision-making algorithms based on appeal outcomes and human expert feedback. This step is part of a broader feedback loop designed to continuously improve the accuracy, fairness, and efficiency of the AI-driven claim processing system. The system monitors the outcomes of appeals made by claimants who contest the initial decisions rendered by the AI system. These appeals are typically reviewed by human experts or adjusters, who provide a final adjudication based on a comprehensive assessment of the claim details. The appeal outcomes are analyzed to identify discrepancies between the AI system's decisions and the human expert's final rulings. This analysis helps the system understand where its decision-making process may have fallen short or where additional refinement is needed.

Human experts, such as claims adjusters or fraud investigators, provide feedback on the AI system's decisions. This feedback is invaluable for identifying areas where the AI system's algorithms may need improvement. Based on the appeal outcomes and human expert feedback, the system retrains its machine learning models to incorporate the new insights.

The system uses the feedback and appeal outcomes to identify and mitigate potential biases in its decision-making algorithms. For example, if certain types of claims are consistently being appealed and overturned, the system examines whether bias (e.g., demographic, geographic, or policy-related) is influencing the decisions. The system operates in a continuous learning loop, where it regularly updates its algorithms based on new appeal outcomes and feedback. This ensures that the AI system remains adaptive and responsive to evolving claim patterns, regulatory changes, and emerging fraud tactics.

FIG. 9 shows an exemplary flowchart outlining steps for integrating data sources, corroborating claim details, and identifying inconsistencies. The system integrates with various external data sources, such as weather reports, police records, and medical databases S900. This integration involves incorporating information from these sources into the system to enhance the accuracy and reliability of the claim details. The purpose of this step is to utilize comprehensive external datasets to validate and enrich the claim information.

The system corroborates claim details with information from external sources S902. This process involves cross-referencing data from weather reports, police records, or medical databases to verify the accuracy and validity of claims submitted. This comprehensive verification helps ensure that the details provided by the claimant align with independent records, aiding in the detection of inconsistencies that could signal potential fraud.

Any inconsistencies identified during the corroboration process are flagged for further investigation S904. This step ensures that potential inaccuracies or fraudulent activities are thoroughly examined before final adjudication. The system records the specific patterns or rules that triggered the inconsistency, enabling human operators to review and assess the validity and significance of the anomaly more efficiently.

FIG. 10 shows an exemplary flowchart illustrating the process of implementing privacy-preserving federated learning in AI models with focus on data sharing and compliance. The system implements a privacy-preserving federated learning framework to refine AI models S1000. This framework enables multiple insurance entities to collaboratively update machine learning models without exchanging sensitive or proprietary raw data. Each participating entity locally trains the AI models using its own anonymized claim data and shares only the computed model updates, such as gradient information or weight adjustments, with a central federated learning coordinator.

The system facilitates the sharing of model updates instead of raw data between various insurance entities S1002. This approach enhances collaboration and ensures that improvements and insights are disseminated across the network while maintaining data privacy and integrity. The central coordinator aggregates these model updates from the various entities and computes an optimized global model, which is subsequently distributed back to each participating entity.

The system ensures compliance with data protection regulations while benefiting from a larger collective dataset S1004. This step emphasizes maintaining privacy and meeting legal standards, enabling insurance entities to leverage extensive data in a compliant manner. Privacy-enhancing techniques, such as data encryption and secure multi-party computation protocols, are incorporated to safeguard any information transmitted during the model update process.

Figure 11:
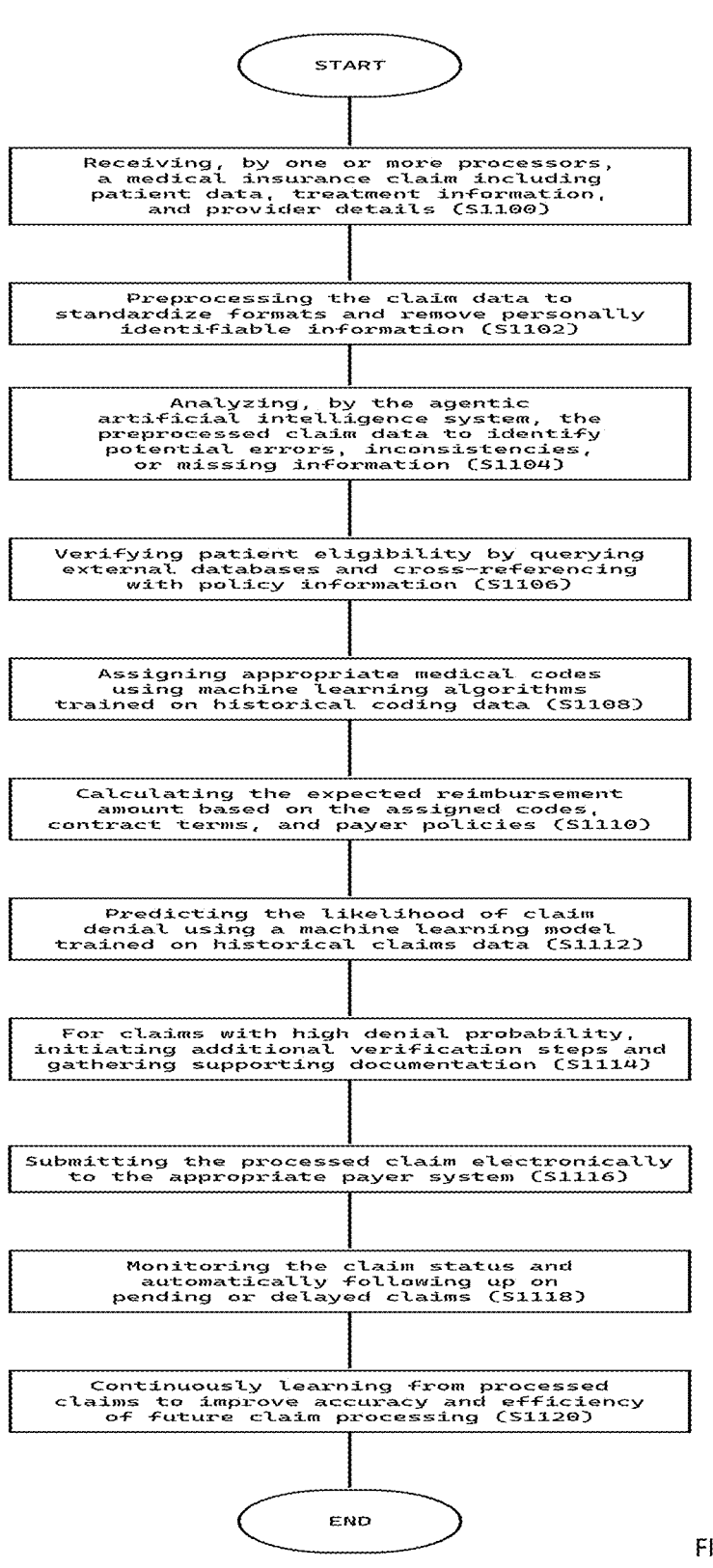
FIG. 11 shows an exemplary flowchart illustrating automated processing of medical insurance claims using an agentic artificial intelligence system.

FIG. 11 shows an exemplary flowchart illustrating automated processing of medical insurance claims using an agentic artificial intelligence system. The process begins with the system receiving an insurance claim. This includes collecting data such as the claimant's identification details, incident information, and applicable policy details. This data forms the foundation for subsequent processing steps S1100.

The system preprocesses the claim data to standardize formats and remove personally identifiable information (PII) S1102. This step ensures data consistency and compatibility with subsequent processing modules while adhering to data protection standards. The system analyzes the preprocessed claim data to identify potential errors, inconsistencies, or missing information S1104. This involves comparing data entries against expected values, checking for completeness, and identifying discrepancies that could affect downstream processing. The system then verifies the eligibility of the patient by querying external databases and cross-referencing the claim information with existing policy data S1106. This ensures that the claim meets the necessary conditions stipulated by the insurance policy.

The system assigns appropriate medical codes using machine learning algorithms trained on historical coding data S1108. This ensures accurate and consistent code assignment, which is crucial for the accurate processing of medical insurance claims. The system then calculates the expected reimbursement amount by evaluating factors such as the assigned medical codes, specific contract terms, and the policies of the payer S1110 to ensure that the reimbursement accurately reflects the agreed-upon terms and historical payout data.

The system predicts the likelihood of claim denial using a machine learning model trained on historical claims data S1112. This allows for proactive measures to be taken if the claim is at risk of being denied like if a claim is predicted to have a high likelihood of denial, the system initiates additional verification steps. This involves gathering all necessary supporting documentation to address potential issues and ensure the claim contains every required detail for accurate reassessment S1114.

The system submits the electronically processed medical insurance claim to the appropriate payer system S1116 to ensure that all relevant claim information, after being thoroughly reviewed and verified, reaches the designated payer for further assessment, approval, or reimbursement actions. The system then monitors the status of the claim S1118 and automatically follows up on any claims that are pending or delayed within the payer's system. This ensures timely processing and resolution of claims. In step S1120 the system continuously learns from the outcome of processed claims through feedback mechanisms. This improves the accuracy and efficiency of future claim processing by refining the AI models based on historical data and outcomes.

The system can receive and analyze visual data (images or videos) related to the claim using computer vision algorithms. This helps in assessing the extent of damage or injury and comparing it with the claimant's reported damages. The system generates a risk score for each claim based on factors such as claimant history, claim amount, and incident details. Claims with high risk scores are routed to specialized fraud investigation units, while low-risk claims are expedited for faster processing.

The system generates a natural language explanation of the claim decision, detailing the factors that influenced the outcome. This explanation is presented to both the claimant and the claims adjuster, ensuring transparency and providing an option for human review if the decision is contested. It then integrates with external data sources such as weather reports, police records, and medical databases to corroborate claim details and detect inconsistencies that may indicate potential fraud.

The system uses a federated learning approach to refine AI models collaboratively across multiple insurance entities without sharing raw data. This enhances model performance while maintaining data privacy and compliance with data protection regulations. It also extracts clinical information from unstructured medical notes and maps it to standardized medical terminologies. This supports accurate code assignment and claim validation, ensuring that clinical details are appropriately reflected in the claim analysis.

The system also compares claims against a database of common billing errors and fraud patterns, flagging suspicious claims for further investigation. It also generates alerts for claims that exceed predefined thresholds for cost or frequency of services. The system integrates with EHR systems to access comprehensive patient medical histories, verify the medical necessity of treatments, and identify potential instances of upcoding or unbundling of medical services. Deep learning model trained on medical literature and coding guidelines is used to assign medical codes. It considers the patient's full medical context, including comorbidities and past treatments, and provides confidence scores for each assigned code to assist human coders. The system generates a detailed explanation of benefits in natural language, customizing the language and detail level based on the recipient (patient, provider, or payer). It also provides links to relevant policy documents or clinical guidelines to support the claim decision.

The system integrates with clinical decision support systems to evaluate the appropriateness of treatments, flag potential instances of overutilization or underutilization of medical services, and provide recommendations for alternative, evidence-based treatments when applicable.

Figure 12:
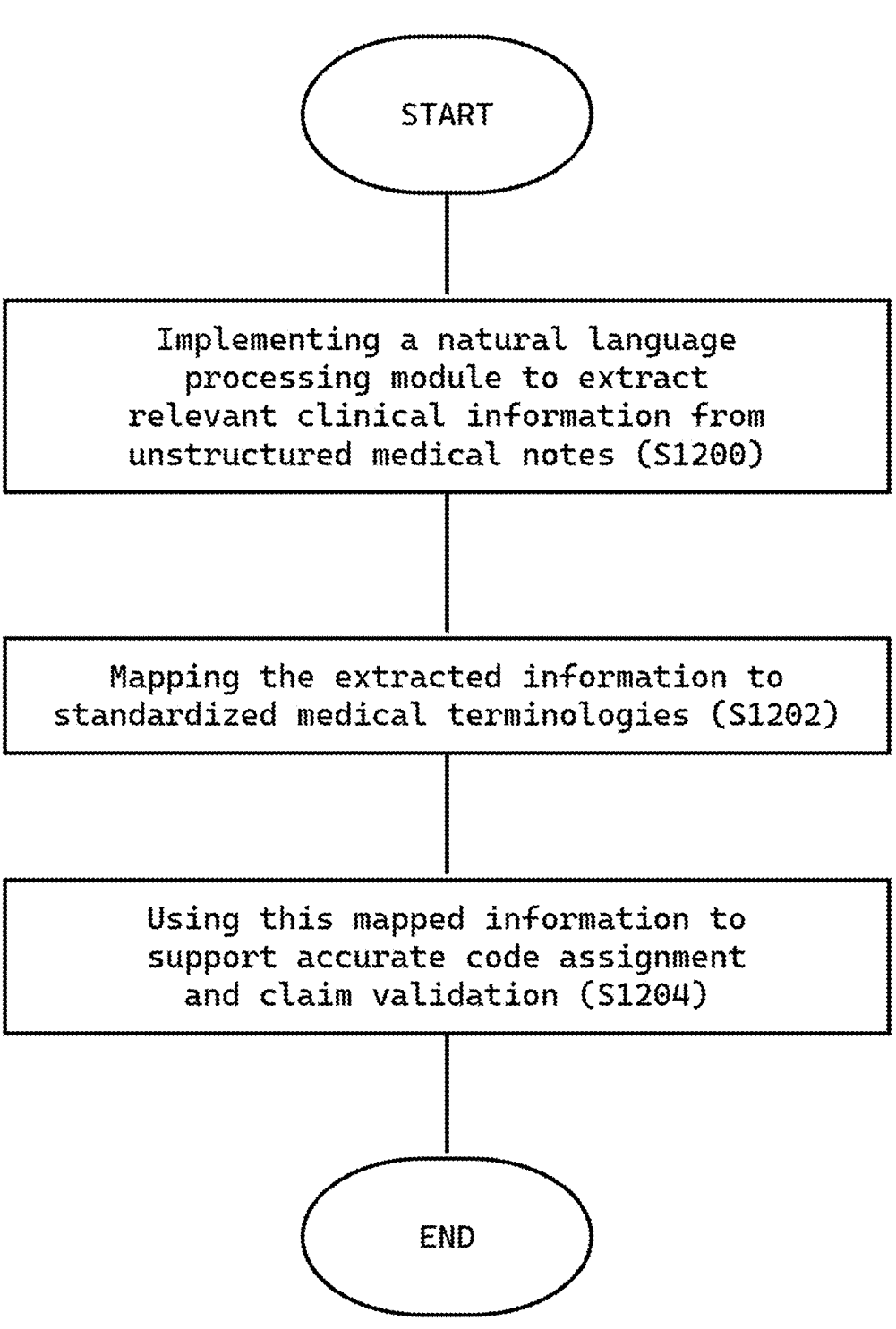
FIG. 12 shows an exemplary flowchart depicting a process for implementing natural language processing to extract clinical information, mapping it to medical terminologies, and supporting accurate code assignment and claim validation.

FIG. 12 shows an exemplary flowchart depicting a process for implementing natural language processing to extract clinical information, mapping it to medical terminologies, and supporting accurate code assignment and claim validation. The system begins by employing natural language processing (NLP) techniques to extract relevant clinical information from unstructured medical notes, such as doctor's notes, patient records, or diagnostic reports S1200. These notes often contain free-text data that is not organized in a standardized format. The NLP algorithms parse the text to identify key medical terms, diagnoses, treatments, and patient history. For example, the system can extract information about a patient's symptoms, prescribed medications, performed procedures, and any relevant medical conditions. This extracted information is then structured into a standardized format, making it easier for downstream processing and analysis. The system ensures that all relevant clinical details are accurately captured and organized, which is critical for accurate claim validation and coding.

Once the clinical information is extracted, the system maps it to standardized medical terminologies such as ICD-10 (International Classification of Diseases), CPT (Current Procedural Terminology), or SNOMED CT (Systematized Nomenclature of Medicine) S1202. This mapping process ensures consistency and interoperability across different medical systems and databases. The system uses machine learning algorithms trained on historical coding data to accurately align clinical terms with the appropriate medical codes. For example, if a doctor's note mentions "myocardial infarction," the system maps this to the corresponding ICD-10 code (e.g., I21.9). This step is critical for ensuring that the claim reflects the actual medical services provided and complies with regulatory and payer requirements. The mapped information is then used to support accurate code assignment and claim validation.

Using the mapped clinical information, the system assigns appropriate medical codes to the claim S1204. This step involves cross-referencing the assigned codes with the patient's medical history, treatment details, and payer policies to ensure accuracy. For example, if a patient underwent a specific surgical procedure, the system assigns the corresponding CPT code and verifies that it aligns with the diagnosis and treatment plan documented in the medical records. The system also validates the claim by checking for inconsistencies or missing information that could lead to claim denials. If any discrepancies are found, the system flags them for further review. This step ensures that the claim is complete and accurate before submission, reducing the likelihood of delays or rejections.

Figure 13:
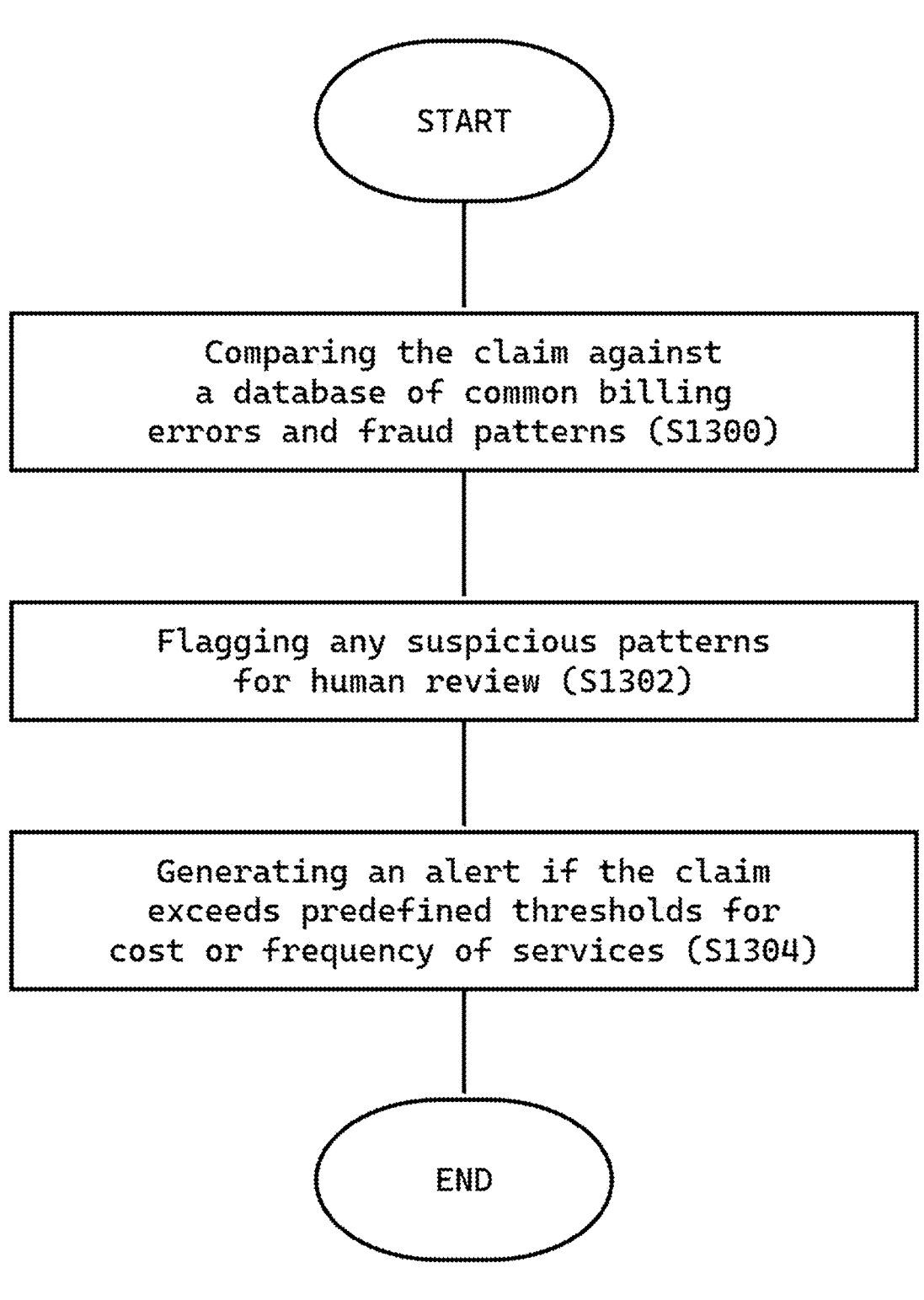
FIG. 13 shows an exemplary flowchart outlining steps for automated claims processing, including comparison with fraud patterns, flagging suspicious cases, and alert generation.

FIG. 13 shows an exemplary flowchart outlining steps for automated claims processing, including comparison with fraud patterns, flagging suspicious cases, and alert generation. The system compares the submitted claim against a database of common billing errors and known fraud patterns S1300. This database includes historical data on fraudulent claims, billing errors, and suspicious patterns identified in past claims. For example, the system checks for duplicate billing, upcoding (billing for a more expensive service than was provided), or unbundling (billing separately for services that should be billed together). The system uses machine learning algorithms to detect anomalies, such as claims that deviate significantly from typical patterns. Any claim that matches a known error or fraud pattern is flagged for further investigation. This step helps identify potential fraud or errors early in the process, reducing the risk of improper payments.

When the system identifies suspicious patterns or anomalies in the claim, it automatically flags the claim for human review S1302. The flagged claims are routed to a designated review queue, where human analysts can investigate the discrepancies. For example, if a claim includes an unusually high number of procedures or exceeds the typical cost for a specific treatment, the system will flag it for further scrutiny. The system provides detailed information about the flagged issues, such as the specific billing error or fraud pattern detected, to assist the reviewer in making an informed decision. This step ensures that potential fraud or errors are addressed before the claim is processed further, enhancing the accuracy and integrity of the claims process.

The system generates alerts for claims that exceed predefined thresholds for cost or frequency of services S1304. These thresholds are based on historical data and payer policies, ensuring that any claim deviating significantly from the norm is flagged. For example, if a claim includes an unusually high number of procedures or exceeds the typical cost for a specific treatment, the system will trigger an alert. The alert prompts further investigation to determine whether the claim is legitimate or requires additional verification. This step helps identify potential anomalies or irregularities that could indicate fraudulent activity, ensuring that claims are processed accurately and efficiently.

Figure 14:
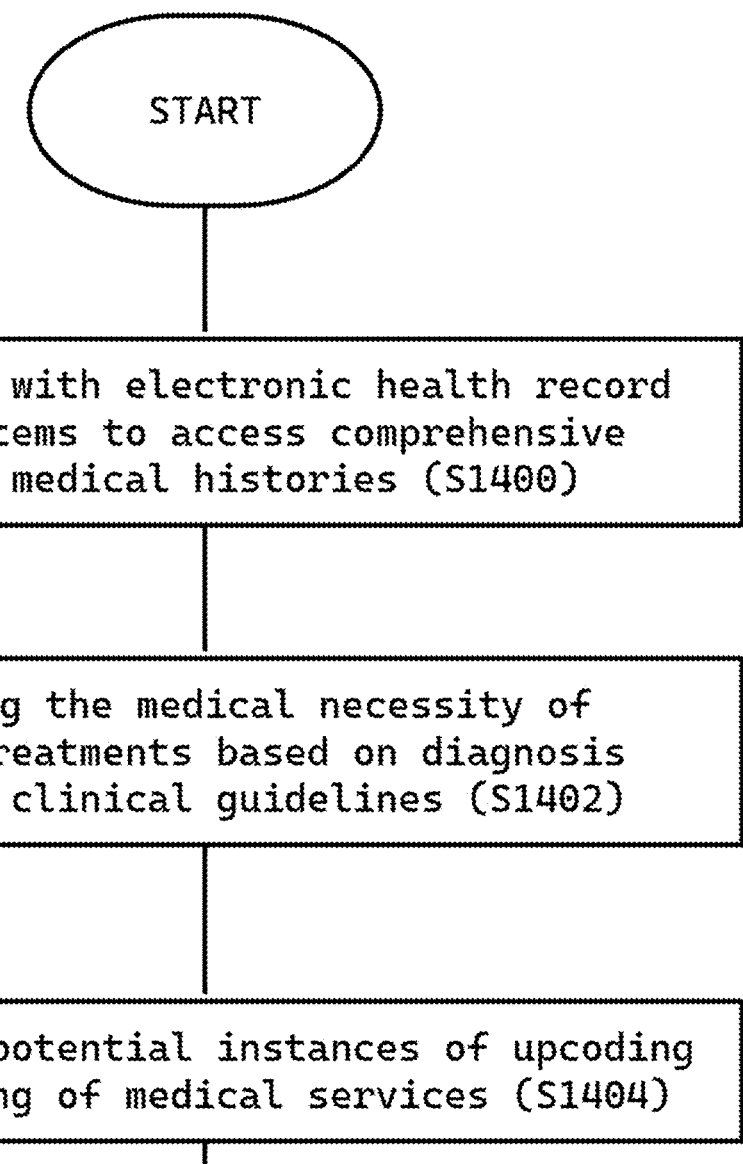
FIG. 14 shows an exemplary flowchart for processing medical claims, including EHR integration and verifying treatment necessity.

FIG. 14 shows an exemplary flowchart for processing medical claims, including EHR integration and verifying treatment necessity. The system integrates with Electronic Health Record (EHR) systems to access comprehensive patient medical histories S1400. This integration allows the system to retrieve detailed information about the patient's past diagnoses, treatments, and outcomes. For example, the system can access data on previous hospitalizations, surgeries, or chronic conditions documented in the EHR. The system uses this data to verify the medical necessity of the claimed treatments and ensure that the services align with the patient's medical history. This step enhances the accuracy of claim validation and reduces the risk of fraudulent or unnecessary claims. By leveraging EHR data, the system provides a more comprehensive and accurate assessment of the claim.

The system verifies the medical necessity of the treatments claimed by cross-referencing the diagnosis codes with established clinical guidelines S1402. This step ensures that the treatments are appropriate for the patient's condition and comply with payer policies. For example, if a patient is diagnosed with diabetes, the system checks whether the claimed treatments (e.g., insulin therapy) align with the recommended guidelines for diabetes management. The system uses machine learning algorithms to analyze the relationship between the diagnosis and the claimed treatments, flagging any services that appear unnecessary or inconsistent with the patient's medical history. This step ensures that the claim reflects the actual medical needs of the patient and reduces the risk of improper payments.

The system identifies potential instances of upcoding S1404 (billing for a more expensive service than was provided) or unbundling (billing separately for services that should be billed together). This is done by analyzing the assigned medical codes and comparing them with the actual services documented in the patient's medical records. For example, if a claim includes separate billing for services that are typically bundled under a single code, the system will flag this as a potential instance of unbundling. Similarly, if a claim includes a code for a more complex procedure than what was documented, the system will flag it as a potential instance of upcoding. The system flags any discrepancies for further review, ensuring that the claim accurately reflects the services provided.

FIG. 15 illustrates a flowchart outlining a process for medical coding using a deep learning model. The system evaluates the patient's complete medical context, including comorbidities, past treatments, and ongoing medical conditions S1500. This comprehensive evaluation ensures that the assigned medical codes accurately reflect the patient's overall clinical condition. For example, if a patient has a history of heart disease and is being treated for a related condition, the system considers this context when assigning codes and validating the claim. The system uses deep learning models trained on medical literature and coding guidelines to analyze the patient's medical history and provide a holistic view of their health status. This step ensures that the claim reflects the patient's full medical context, reducing the risk of errors or omissions.

The system provides confidence scores for each assigned medical code, indicating the likelihood that the code is accurate S1502. These scores are generated using machine learning models trained on historical coding data and medical literature. For example, if the system assigns a code for a specific surgical procedure, it also provides a confidence score (e.g., 95%) to indicate how certain it is that the code is correct. Human coders can use these confidence scores to prioritize their review efforts, focusing on codes with lower confidence scores that may require additional verification. This step enhances the accuracy and reliability of the coding process, ensuring that claims are processed correctly.

Figure 16:
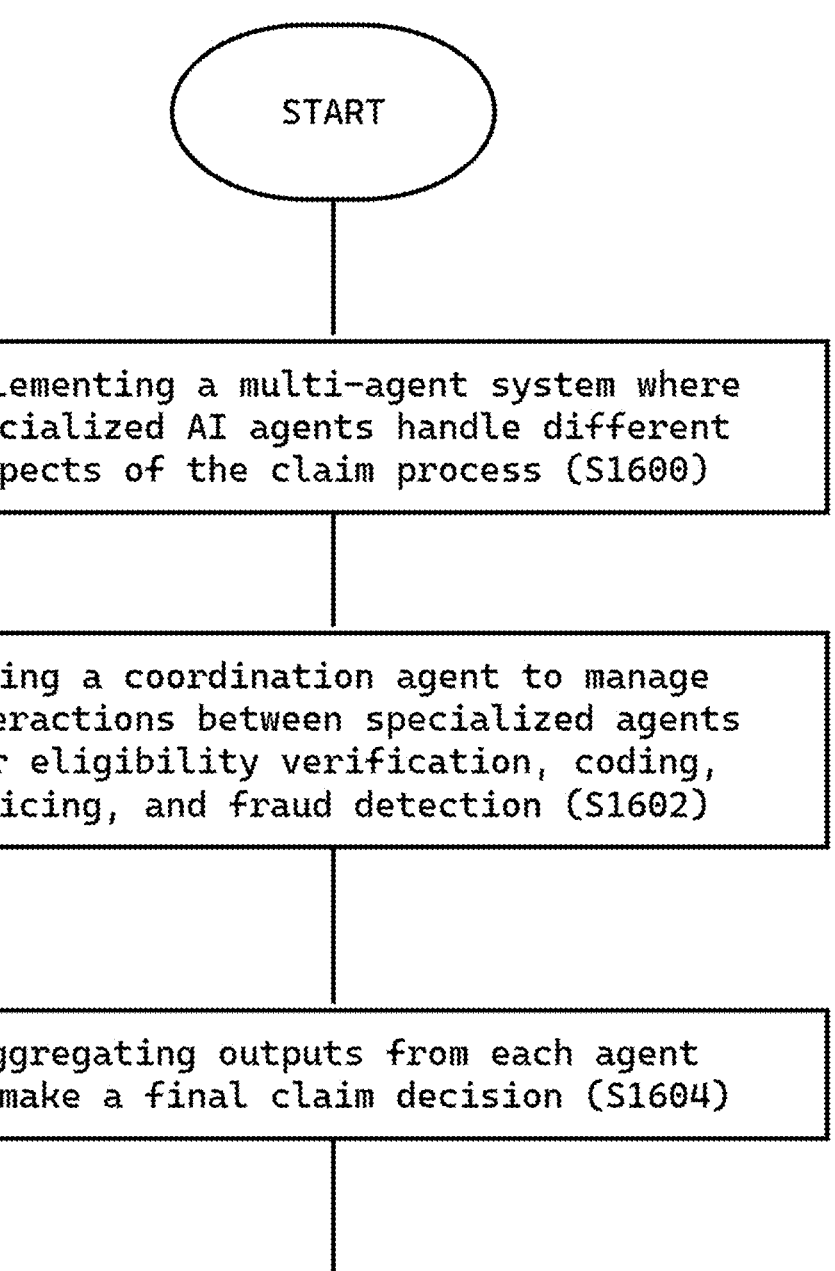
FIG. 16 shows an exemplary flowchart illustrating a multi-agent AI system for processing claims with steps for implementation, coordination, and aggregation.

FIG. 16 shows an exemplary flowchart illustrating a multi-agent AI system for processing claims with steps for implementation, coordination, and aggregation. The system employs a master coordination agent to manage interactions between specialized AI agents responsible for different aspects of claim processing S1600. These specialized agents handle tasks such as eligibility verification, medical coding, pricing, and fraud detection. For example, one agent may verify that the patient is eligible for the claimed services, while another agent assigns the appropriate medical codes. The coordination agent ensures that all agents work together seamlessly, integrating their outputs to provide a comprehensive and accurate claim assessment. This step ensures that the claim is processed efficiently and accurately, reducing the risk of errors or delays.

Using a coordination agent to manage interactions between specialized agents for eligibility verification, coding, pricing, and fraud detection S1602 refers to a step in which a master coordination agent oversees various specialized AI agents. Each of these specialized agents performs distinct functions within the claim processing system, such as verifying eligibility, assigning appropriate codes, determining pricing, and detecting potential fraud. The coordination agent ensures that the processes seamlessly integrate, facilitating effective communication and collaboration among the various agents to optimize the overall claim processing workflow.

The process also involves aggregating outputs from specialized AI agents, such as those handling eligibility verification, coding, pricing, and fraud detection, to make a final claim decision S1604. This step integrates the agents' results, resolves any conflicts using predefined rules or coordination mechanisms, and produces a unified decision-whether to approve, deny, or flag the claim for further review.

Figure 17:
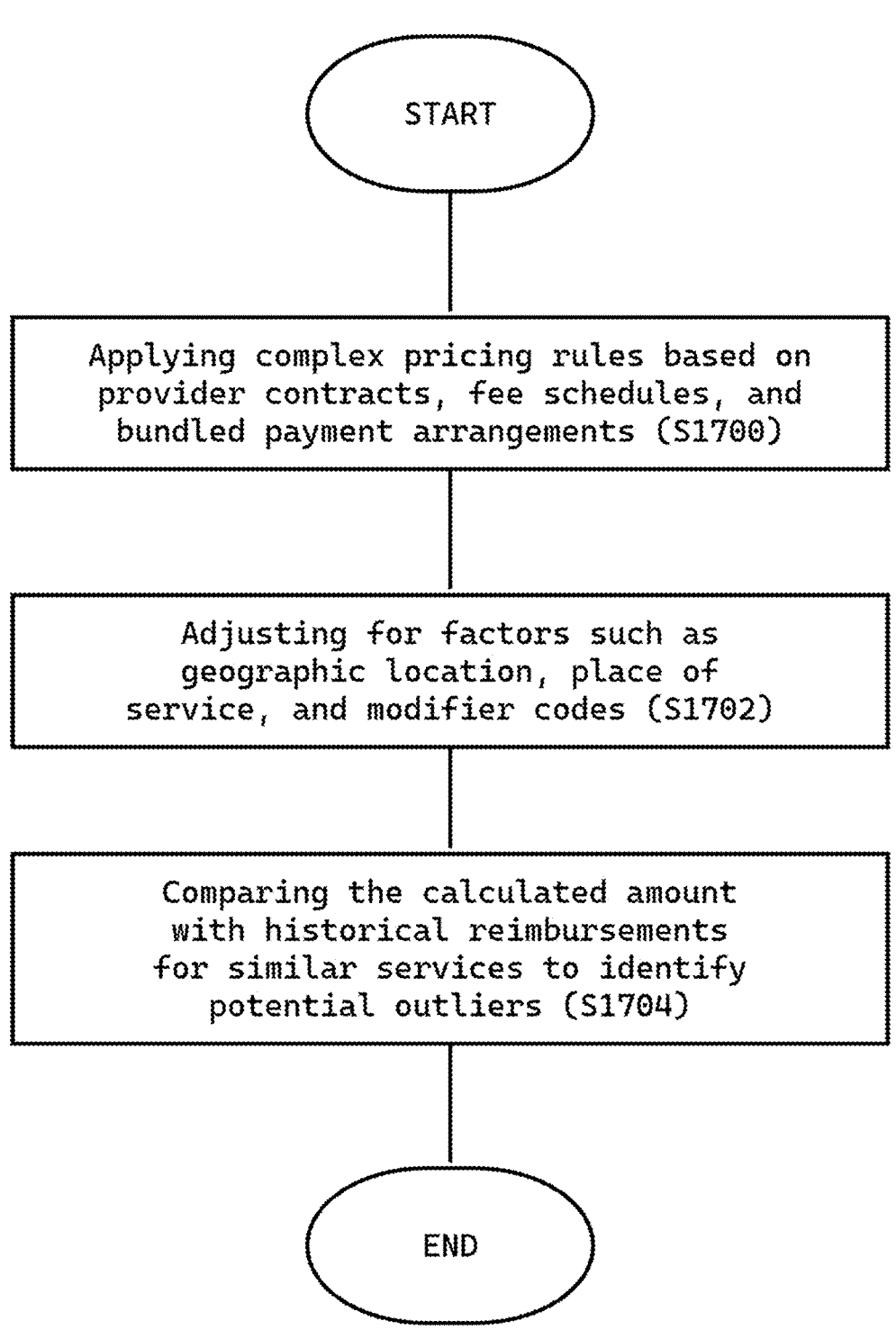
FIG. 17 shows an exemplary flowchart illustrating a process flow for calculating and validating reimbursements in a healthcare payment system.

FIG. 17 represents a process flow for calculating and validating reimbursements in a healthcare payment system. The system applies complex pricing rules based on provider contracts, fee schedules, and bundled payment arrangements S1700. This step ensures that the reimbursement amount is calculated accurately and complies with the terms of the provider's contract with the payer. For example, if a provider has a negotiated rate for a specific procedure, the system applies this rate when calculating the reimbursement amount. The system uses machine learning algorithms to analyze historical pricing data and adjust the reimbursement amount based on current market conditions. This step ensures that the claim is priced accurately and fairly, reducing the risk of overpayment or underpayment.

The system adjusts the reimbursement amount based on factors such as geographic location, place of service, and modifier codes S1702. Geographic location adjustments account for regional cost differences, while place of service adjustments reflect the setting in which the service was provided (e.g., hospital vs. outpatient clinic). Modifier codes capture additional details about the service, such as whether it was performed under unusual circumstances or involved additional complexity. For example, if a procedure was performed in a high-cost urban area, the system adjusts the reimbursement amount accordingly. This step ensures that the reimbursement amount reflects the actual cost of the service, enhancing the accuracy and fairness of the claims process.

The system compares the calculated reimbursement amount with historical reimbursements for similar services S1704. This comparison helps identify potential outliers or discrepancies in the reimbursement amount. For example, if the calculated amount for a specific procedure is significantly higher than the historical average, the system flags the claim for further review. This step ensures that the reimbursement amount is consistent with historical data and reflects the actual cost of the service. By identifying potential outliers, the system reduces the risk of overpayment or underpayment, ensuring that claims are processed accurately and fairly.

FIG. 18 shows an exemplary flowchart illustrating steps in generating and customizing an explanation of benefits with supportive links. The system generates a detailed Explanation of Benefits (EOB) in natural language, outlining any denials or partial payments S1800. The EOB includes a clear explanation of the factors that influenced the claim decision, such as policy terms, medical necessity, and coding accuracy. For example, if a claim is denied due to a lack of medical necessity, the EOB explains this decision in simple, easy-to-understand language. This step ensures transparency and helps the claimant understand the rationale behind the decision. The EOB is customized based on the recipient (patient, provider, or payer), ensuring that the information is accessible and informative for all stakeholders.

The system then customizes the language and detail level of the EOB based on the recipient (patient, provider, or payer) S1802. For patients, the EOB is written in simple, easy-to-understand language, while providers receive more technical details. For example, a patient may receive an EOB that explains the claim decision in plain language, while a provider may receive a more detailed explanation that includes coding and billing information. This customization ensures that the EOB is accessible and informative for all stakeholders, enhancing transparency and understanding.

The system provides links to relevant policy documents or clinical guidelines to support the claim decision S1804. These links allow the recipient to access additional information about the policies or guidelines that influenced the claim outcome. For example, if a claim is denied due to a lack of medical necessity, the EOB may include a link to the clinical guidelines that support this decision. This step enhances transparency and helps the recipient understand the basis for the decision. By providing access to supporting documents, the system ensures that the claim decision is well-documented and defensible.

FIG. 19 illustrates a structured process flow for enhancing an AI-driven healthcare system. The system implements a federated learning system to improve AI models across multiple healthcare organizations S1900. This approach allows organizations to collaboratively update AI models without sharing raw data, ensuring data privacy and security. For example, each organization trains the AI model using its own data, and only the model updates (not the raw data) are shared with a central coordinator. The coordinator aggregates these updates to create an improved global model, which is then distributed back to the organizations. This step ensures that the AI models are continuously refined based on the latest data, enhancing their accuracy and performance over time.

The system updates its decision-making algorithms based on appeal outcomes and human expert feedback S1902. This step ensures that the AI models learn from past mistakes and improve their decision-making accuracy. For example, if a claim is overturned on appeal, the system analyzes the reasons for the reversal and updates its algorithms to avoid similar errors in the future. The system also incorporates feedback from claims adjusters and other human experts to refine its algorithms and enhance its performance. This step ensures that the AI models are continuously improved, reducing the risk of errors and enhancing the accuracy of claim processing.

The system adapts to new medical procedures, coding updates, and policy changes in real-time S1904. This ensures that the AI models remain up-to-date with the latest medical standards and regulatory requirements. For example, if a new medical procedure is introduced, the system updates its coding algorithms to include the corresponding codes. Similarly, if there are changes to payer policies, the system adjusts its decision-making algorithms to reflect these changes. This step ensures that the AI models are always aligned with the latest medical and regulatory standards, enhancing the accuracy and reliability of claim processing.

Figure 20:
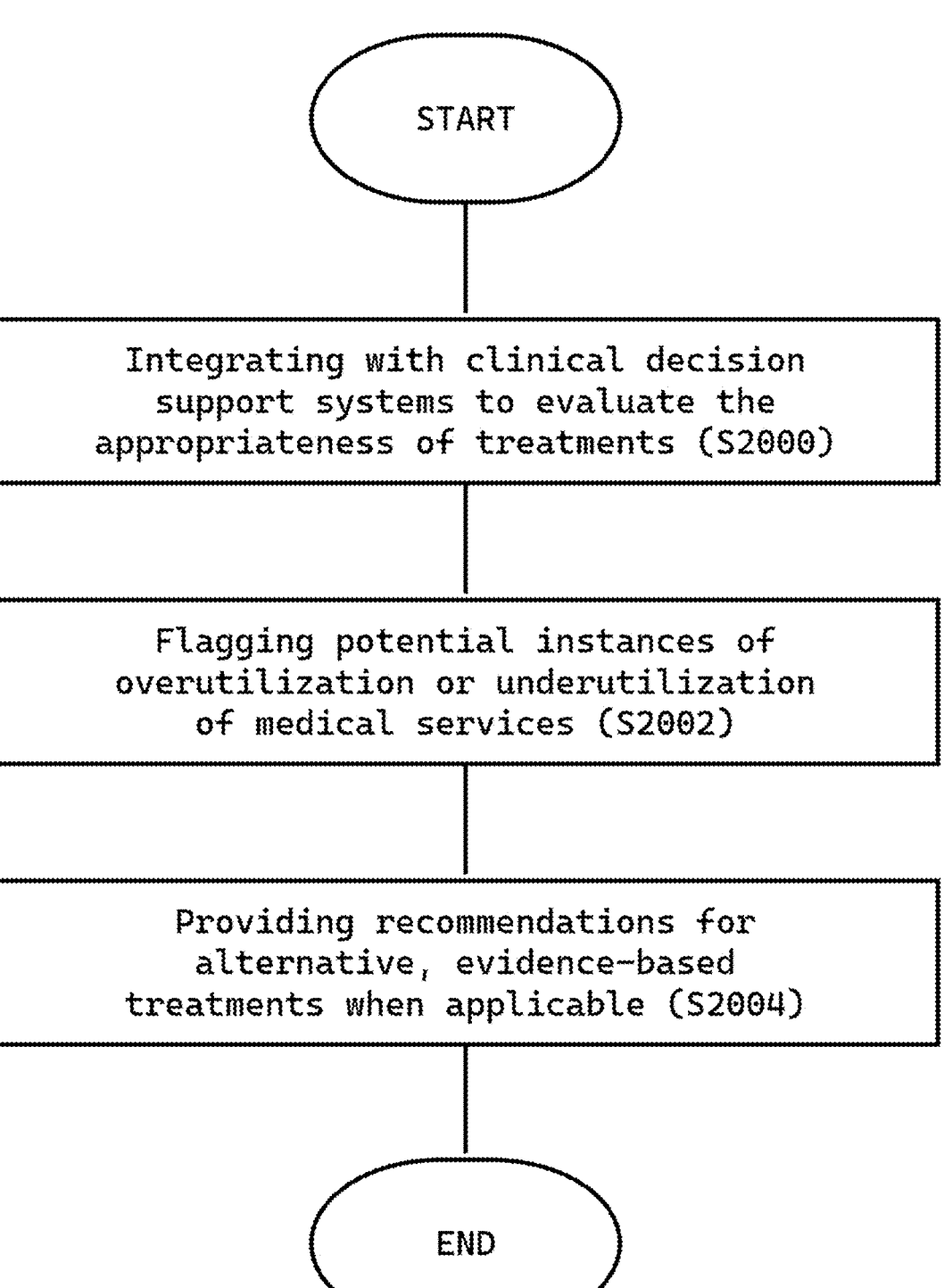
FIG. 20 shows an exemplary flowchart illustrating a process designed to optimize the evaluation and recommendation of medical treatments.

FIG. 20 shows an exemplary flowchart illustrating a process designed to optimize the evaluation and recommendation of medical treatments. The system integrates with clinical decision support systems to evaluate the appropriateness of treatments S2000. This integration ensures that the claimed treatments align with established clinical guidelines and best practices. For example, if a patient is diagnosed with a specific condition, the system checks whether the claimed treatments are recommended by clinical guidelines. The system uses the clinical decision support system to verify the medical necessity of treatments and identify potential overutilization or underutilization of services. This step ensures that the claim reflects the actual medical needs of the patient and reduces the risk of improper payments.

The system flags potential instances of overutilization (excessive use of medical services) or underutilization (insufficient use of necessary services) S2002. This step ensures that the patient receives appropriate care and that the claim reflects the actual medical needs of the patient. For example, if a patient is receiving more frequent treatments than recommended by clinical guidelines, the system flags this as potential overutilization. Similarly, if a patient is not receiving necessary treatments, the system flags this as potential underutilization. The system uses machine learning algorithms to analyze treatment patterns and identify deviations from established clinical guidelines. This step ensures that the claim reflects the appropriate level of care, reducing the risk of improper payments.

The system provides recommendations for alternative, evidence-based treatments when applicable S2004. These recommendations are based on the patient's medical history, current condition, and established clinical guidelines. For example, if a patient is receiving a treatment that is not recommended by clinical guidelines, the system suggests an alternative treatment that is more effective or cost-efficient. The system uses machine learning algorithms to analyze treatment options and provide personalized recommendations. This step ensures that the patient receives the best possible care and that the claim reflects the most appropriate treatments.

Figure 21:
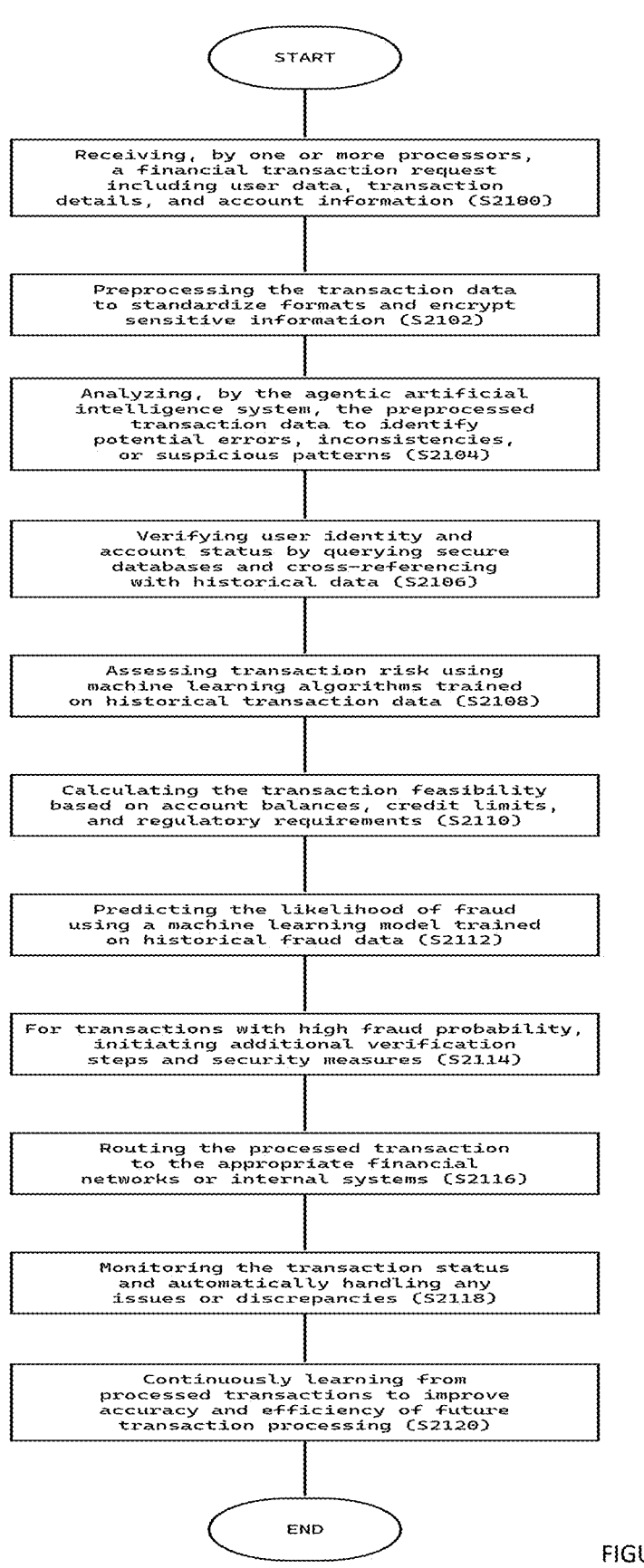
FIG. 21 shows an exemplary flowchart illustrating steps in processing a financial transaction request using an agentic artificial intelligence system.

FIG. 21 shows an exemplary flowchart illustrating steps in processing a financial transaction request using an agentic artificial intelligence system. The system receives a financial transaction request, including user data, transaction details, and account information S2100. This step involves collecting all necessary information to process the transaction, such as the transaction amount, account details, and user identification. For example, if a user initiates a payment, the system collects the payment amount, recipient information, and user account details. This step ensures that the transaction request is complete and ready for processing.

The system preprocesses the transaction data to standardize formats and encrypt sensitive information S2102. This step ensures that the data is consistent and secure before further processing. For example, the system converts transaction amounts into a standardized currency format and encrypts sensitive information such as account numbers. This step enhances data integrity and security, reducing the risk of errors or data breaches.

The system analyzes the preprocessed transaction data to identify potential errors, inconsistencies, or suspicious patterns S2104. This step involves using machine learning algorithms to detect anomalies that may indicate fraud or errors in the transaction. For example, if a transaction amount is significantly higher than the user's typical spending patterns, the system flags it for further review. This step ensures that the transaction is legitimate and free from errors or fraudulent activity.

The system verifies the user's identity and account status by querying secure databases and cross-referencing historical data S2106. This step ensures that the transaction request is legitimate and that the user's account is in good standing. For example, the system checks the user's account balance, credit limit, and transaction history to ensure that the transaction can be completed without issues. This step enhances security and reduces the risk of unauthorized transactions.

The system assesses the risk associated with the transaction using machine learning algorithms trained on historical transaction data S2108. This step evaluates factors such as the transaction amount, frequency, and user behavior to determine the likelihood of fraud or other risks. For example, if a user initiates a large transaction from an unfamiliar location, the system may flag it as high-risk. This step ensures that the transaction is processed securely and reduces the risk of fraudulent activity.

The system calculates the feasibility of the transaction based on account balances, credit limits, and regulatory requirements S2110. This step ensures that the transaction can be completed without exceeding the user's financial limits or violating regulatory guidelines. For example, if a user attempts to make a payment that exceeds their available balance, the system flags it as infeasible. This step ensures that the transaction is processed within the user's financial constraints.

FIG. 22 shows an exemplary flowchart illustrating a process for using AI in financial transactions, including information extraction, categorization, and anomaly detection. The system uses natural language processing (NLP) to extract relevant information from transaction descriptions S2200. This step involves parsing transaction texts to identify key details such as merchant names, transaction amounts, and dates. For example, if a transaction description includes the text "Payment to ABC Store," the system extracts the merchant name (ABC Store) and the transaction amount. The system may also extract additional context, such as the purpose of the transaction or the type of goods or services purchased. This step ensures that the transaction data is accurately captured and organized for further processing.

The system categorizes transactions based on merchant information and spending patterns S2202. This step involves using machine learning algorithms to classify transactions into predefined categories, such as groceries, entertainment, or travel. For example, if a user frequently makes purchases at a grocery store, the system categorizes these transactions as "Groceries." The system may also use historical spending patterns to predict the category of new transactions, even if the merchant information is not explicitly provided. This step helps users understand their spending habits and provides valuable insights for financial planning.

The system identifies anomalies in the user's financial behavior by comparing current transactions to historical spending patterns S2204. This method leverages merchant data and evaluates spending patterns to systematically organize transaction records. It employs sophisticated algorithms that consider multiple attributes, resulting in precise categorization aligned with financial behaviors and merchant specifics. This operation plays an essential role in enhancing the financial data analysis process by providing a structured interpretation of transaction types.

Figure 23:
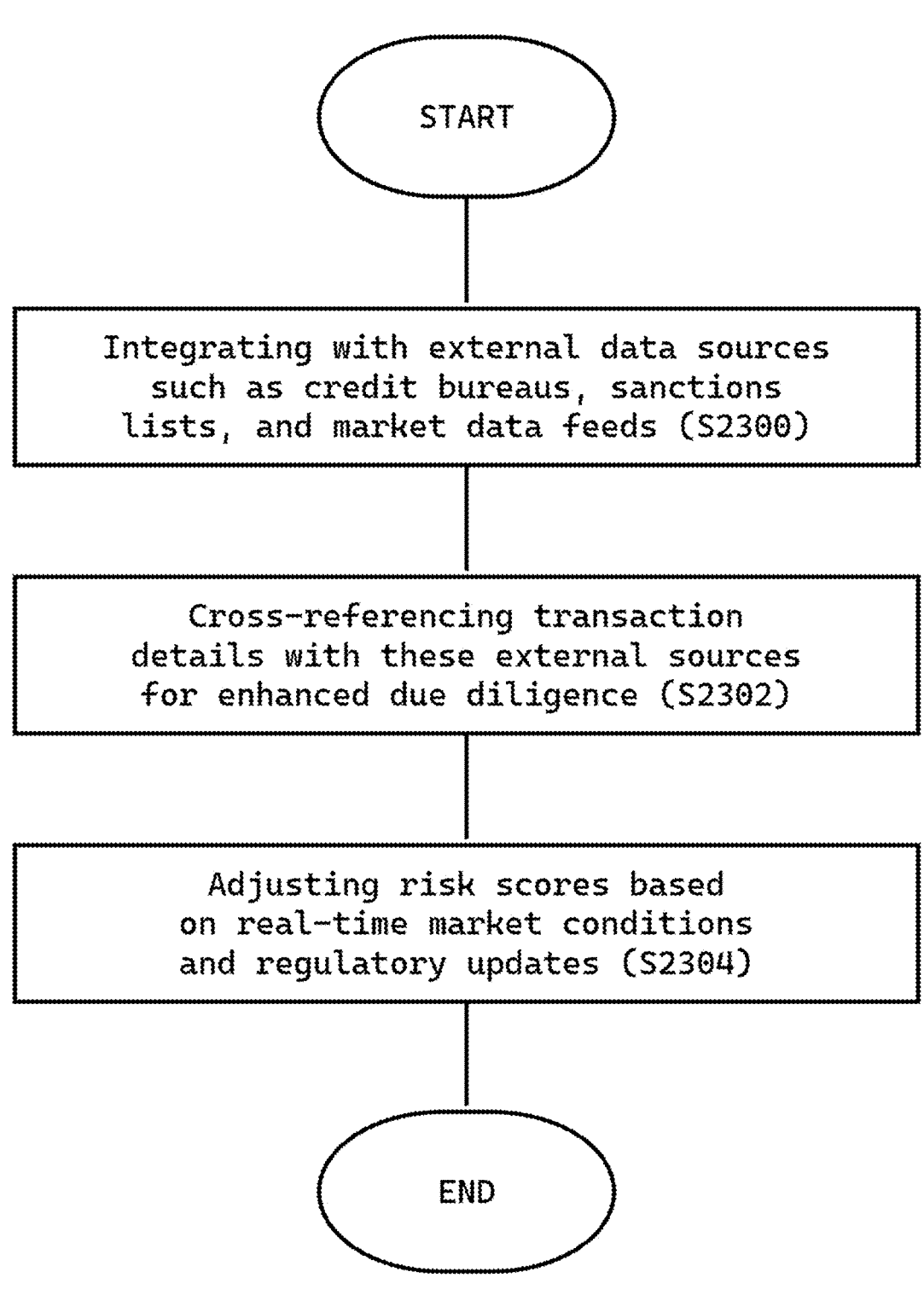
FIG. 23 shows an exemplary flowchart of a process for integrating with external data sources, cross-referencing transaction details, and adjusting risk scores.

FIG. 23 illustrates a flowchart of a process for integrating with external data sources, cross-referencing transaction details, and adjusting risk scores. The system integrates with external data sources, such as credit bureaus, sanctions lists, and market data feeds S2300. This step enhances the due diligence process by cross-referencing transaction details with external information. For example, if a user initiates a transaction with a merchant on a sanctions list, the system flags the transaction for further review. The system may also use external data to verify the legitimacy of the transaction, such as checking the recipient's credit history or verifying the transaction amount against market rates. This step ensures that the transaction complies with regulatory requirements and is free from fraudulent activity.

The system cross-references transaction details with information from external sources to verify the accuracy and legitimacy of the transaction S2302. This process is part of a method designed to enhance due diligence by verifying transaction data against multiple databases such as credit bureaus, sanctions lists, and market data feeds. This step ensures accuracy and reliability in the evaluation of financial transactions.

In the disclosed process, the step S2304 involves adjusting risk scores. This adjustment is performed by taking into account real-time market conditions and updates to regulatory requirements. By doing so, the system ensures that the risk assessments are both timely and compliant with current regulations.

Figure 24:
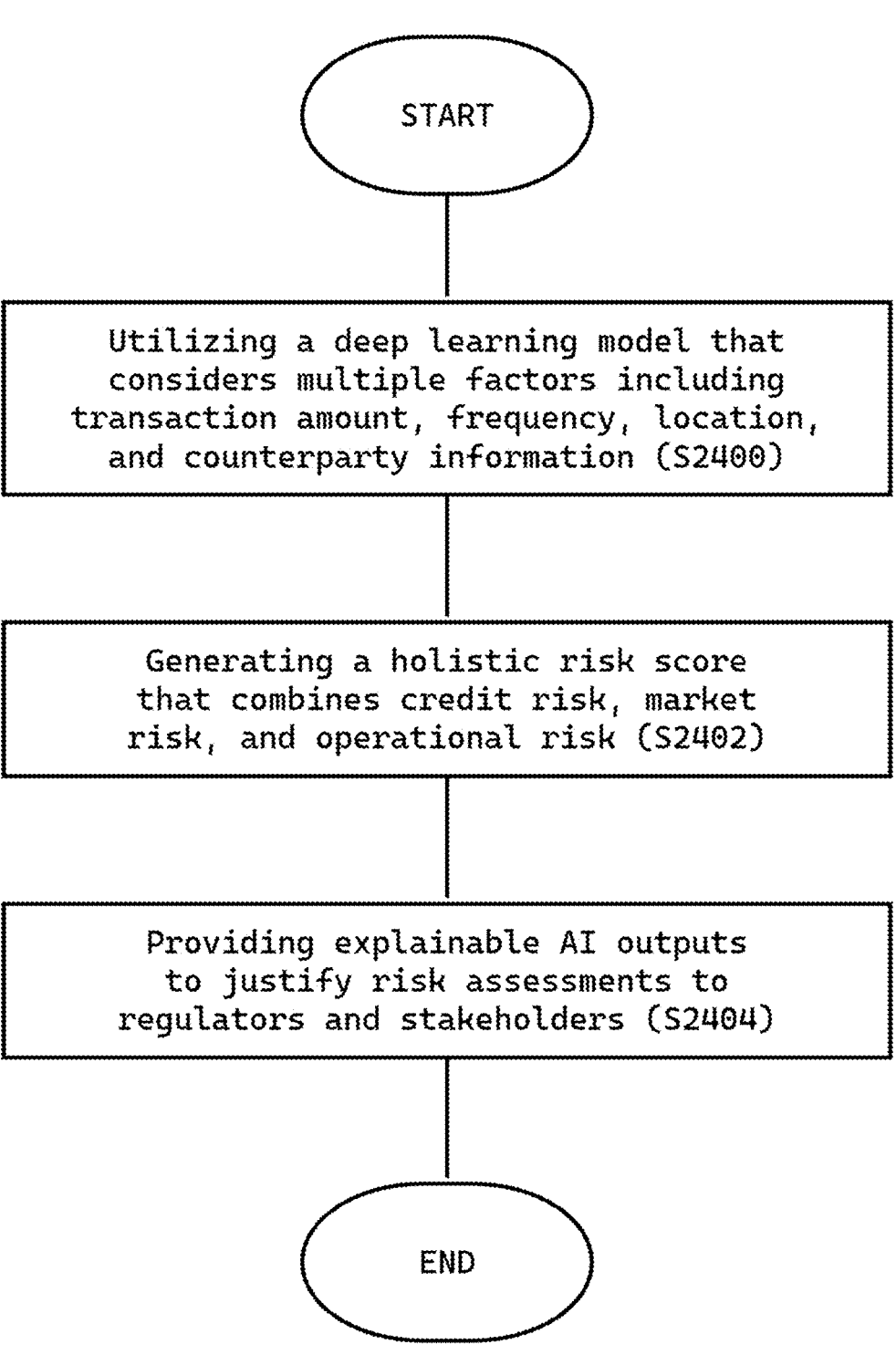
FIG. 24 shows an exemplary flowchart illustrating a risk assessment process using a deep learning model and explainable AI outputs.

FIG. 24 illustrates the following references: a flowchart depicting a risk assessment process. It outlines the use of a deep learning model that evaluates multiple factors such as transaction amount, frequency, location, and counterparty information S2400. The process involves generating a comprehensive risk score by integrating credit, market, and operational risks S2402. Finally, it highlights the provision of explainable AI outputs to justify risk assessments for regulators and stakeholders S2404.

The method initiates by harnessing a deep learning model to assess various factors tied to each transaction S2400. These factors include the transaction amount, frequency, and geographical location, along with details concerning the involved counterparties. Through this comprehensive analysis, the model aims to gauge the risk associated with transactions, thereby establishing a foundation for informed decision-making within the financial process. This step is instrumental in developing a holistic understanding of potential risks.

The reference S2402 pertains to the process of generating a holistic risk score. This score is a comprehensive measure that combines various types of risks, specifically credit risk, market risk, and operational risk. Through the use of advanced analytical techniques, these factors are integrated to deliver a singular risk assessment. This process aims to provide a more complete understanding of the potential financial risks associated with a transaction, offering insights that can guide decision-making and ensure that all relevant risks are considered in a unified manner.

In this system, explainable AI outputs to justify risk assessments to regulators and stakeholders S2404 refers to generating transparent and comprehensible explanations of how risk assessments are determined. It involves using AI-generated insights to effectively articulate the rationale behind risk scores, ensuring that both regulators and stakeholders grasp the factors influencing these assessments. The aim is to enhance trust and compliance by making AI decision-making processes accessible and understandable.

FIG. 25 illustrates the following steps: implementing a blockchain-based system for secure and transparent recording of transactions, using smart contracts to automate complex financial agreements and ensure regulatory compliance, and maintaining an immutable audit trail to facilitate regulatory reporting and dispute resolution.

The system implements a blockchain-based system for secure and transparent recording of transactions S2500. This step ensures that all transactions are recorded in an immutable ledger, enhancing transparency and accountability. The system may also use smart contracts to automate certain aspects of the transaction, such as releasing funds once certain conditions are met. This step enhances security and ensures that all transactions are accurately recorded.

The system uses smart contracts to automate complex financial agreements and ensure regulatory compliance S2502. This step ensures that all financial agreements are executed according to predefined rules and conditions. The system may use smart contracts to automate other types of financial agreements, such as insurance claims or investment contracts. This step enhances efficiency and reduces the risk of errors or disputes.

The system maintains an immutable audit trail for all transactions, facilitating regulatory reporting and dispute resolution S2504. This step ensures that all transactions are recorded accurately and can be audited if necessary. The system may use the audit trail to generate reports for regulatory compliance, such as anti-money laundering (AML) or know your customer (KYC) reports. This step enhances transparency and accountability, ensuring that all transactions are accurately documented.

FIG. 26 illustrates the following references: The process begins with simulating the impact of a transaction on the user's financial position using predictive analytics S2600. It then considers factors such as upcoming scheduled payments, expected income, and historical cash flow patterns S2602. Finally, it provides personalized recommendations for optimizing the user's financial decisions S2604.

The system simulates the impact of a transaction on the user's financial position using predictive analytics S2600. This step helps the user understand the potential consequences of the transaction before proceeding. The system may also provide alternative scenarios, such as the impact of delaying the purchase or making a partial payment. This step ensures that the user makes informed financial decisions.

The system considers financial factors such as upcoming scheduled payments, expected income, and historical cash flow patterns S2602. This step ensures that the transaction is feasible and aligns with the user's financial goals. For example, if a user has a large upcoming payment, the system considers this when evaluating the feasibility of a new transaction. The system may also use predictive analytics to forecast the user's future financial position based on their current spending patterns and income. This step ensures that the user's financial decisions are well-informed and aligned with their financial situation.

In the context of optimizing financial decisions, the process provides personalized guidance tailored to the user. In particular, step S2604 concentrates on generating these recommendations by assessing various financial factors and data specific to the user. This step is designed to support individuals in making thoughtful financial decisions, enabling them to achieve optimal outcomes based on their unique circumstances and historical trends.

Figure 27:
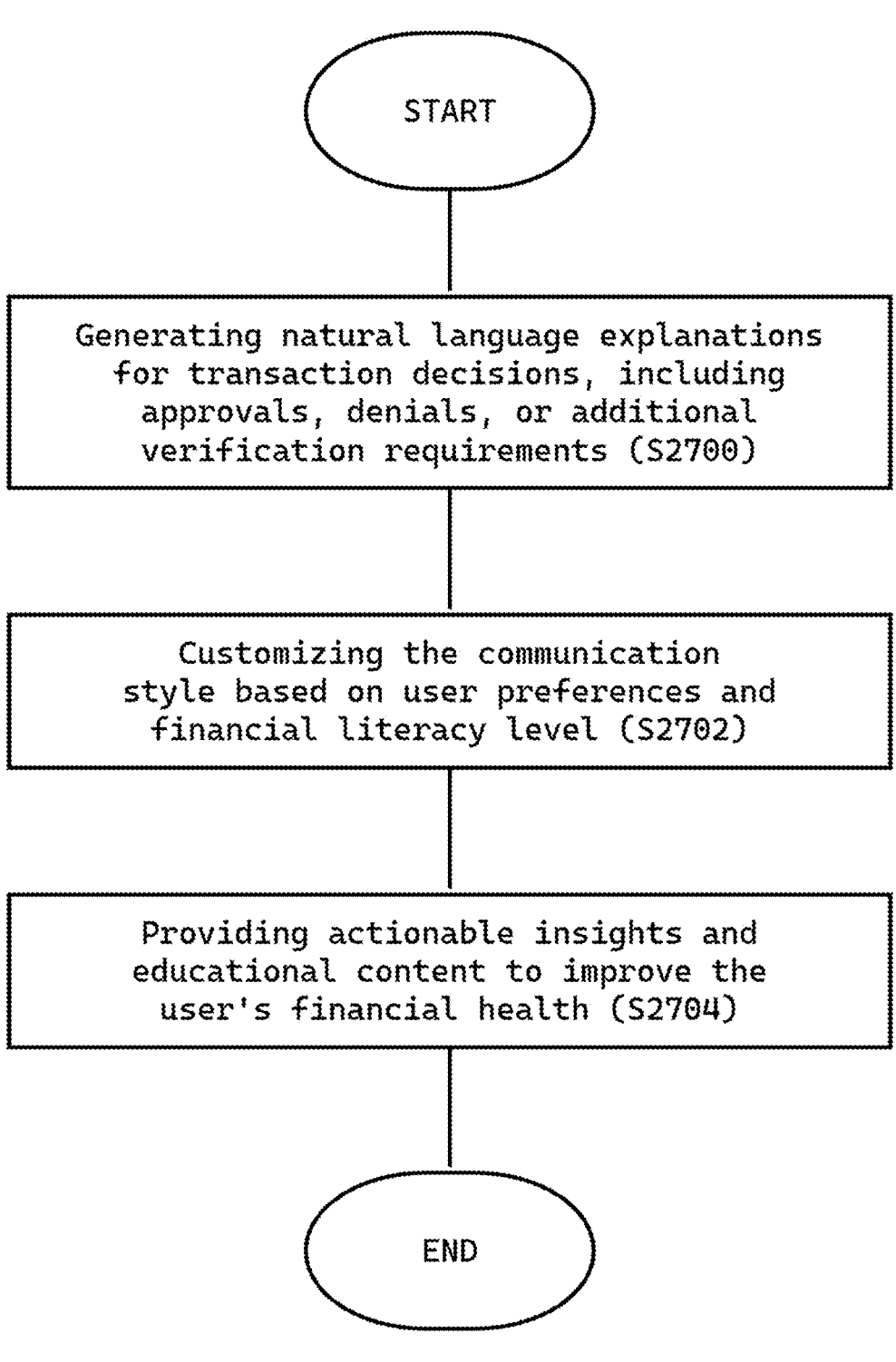
FIG. 27 shows an exemplary flowchart illustrating a process flow aimed at enhancing user communication and financial literacy in a financial decision-making system

FIG. 27 illustrates the following references: generating natural language explanations for transaction decisions, customizing the communication style based on user preferences and financial literacy level, and providing actionable insights to improve the user's financial health. S2700 pertains to generating natural language explanations for transaction decisions. This includes explaining the reasons behind approvals, denials, or any additional verification requirements.

The system customizes the communication style based on user preferences and financial literacy level S2702 which pertains to adapting the way information is delivered to users. This involves tailoring the language and presentation method according to individual user preferences and their level of understanding regarding financial matters. By doing so, it ensures that the information is accessible and comprehensible, enhancing user engagement and satisfaction.

The process also involves providing users with actionable insights and educational content designed to enhance their financial well-being S2704. This includes offering tailored advice and informative resources that help users make informed financial decisions. The aim is to empower users by equipping them with the knowledge and tools needed to improve their overall financial health.

FIG. 28 illustrates a flowchart detailing a process for improving AI models, adapting to fraud, and retraining for fairness in financial systems. The system implements a federated learning system to improve AI models across multiple financial institutions S2800. This step ensures that the AI models are continuously refined based on anonymized data from recent transactions. For example, each financial institution trains the AI model using its own data, and only the model updates (not the raw data) are shared with a central coordinator. The coordinator aggregates these updates to create an improved global model, which is then distributed back to the institutions. This step ensures that the AI models are continuously improved, enhancing their accuracy and performance over time.

The system adapts to evolving fraud tactics and financial market conditions in real-time S2802. This step ensures that the AI models remain effective in detecting fraud and assessing risk. For example, if a new fraud tactic is identified, the system updates its algorithms to detect similar patterns in the future. The system may also use real-time market data to adjust risk assessments based on current market conditions, such as increased volatility or changes in interest rates. This step ensures that the system remains effective in detecting fraud and processing transactions accurately. The system periodically retrains models using anonymized data to ensure fairness and reduce bias S2804. This step ensures that the AI models provide equitable and unbiased decision.

FIG. 29 illustrates the implementation and coordination of specialized AI agents for various financial services tasks, ultimately optimizing strategy through a master orchestrator agent. In the context of this one implementation, a multi-agent system is implemented where specialized AI agents manage various aspects of financial services S2900. This approach involves distributing tasks among dedicated agents, each focusing on specific areas such as portfolio management, risk assessment, and customer service. These specialized agents function collaboratively to enhance efficiency and optimize performance in processing financial transactions.

The system continuously monitors evolving fraud tactics and financial market conditions in real-time to ensure that its AI models remain effective and up-to-date S2902. For example, if a new type of fraud is detected in the financial industry, the system updates its fraud detection algorithms to identify similar patterns in future transactions. This adaptability is achieved through real-time data analysis and machine learning, which allow the system to detect emerging trends and adjust its risk assessment parameters accordingly.

The system periodically retrains its AI models using anonymized data to ensure fairness and reduce bias in decision-making S2904. This step involves collecting and analyzing data from recent transactions, claims, or customer interactions, and using this data to update the AI models. For example, if the system identifies bias in its decision-making process, such as favoring certain demographic groups over others, it retrains the models to eliminate this bias.

The retraining process incorporates fairness metrics, such as demographic parity or equalized odds, to evaluate the performance of the models across different user groups. For instance, the system may analyze whether its risk assessment algorithms produce similar outcomes for users of different ages, genders, or income levels. If disparities are detected, the system adjusts the models to ensure that they provide equitable and unbiased decisions.

The system also uses feedback loops to continuously improve its models. For example, if a transaction is flagged as fraudulent but later determined to be legitimate, the system uses this feedback to refine its fraud detection algorithms. Similarly, if a customer disputes a decision made by the system, the feedback is used to improve the accuracy and fairness of future decisions. This step ensures that the system remains fair and unbiased, enhancing trust and compliance with regulatory requirements.

Figure 30:
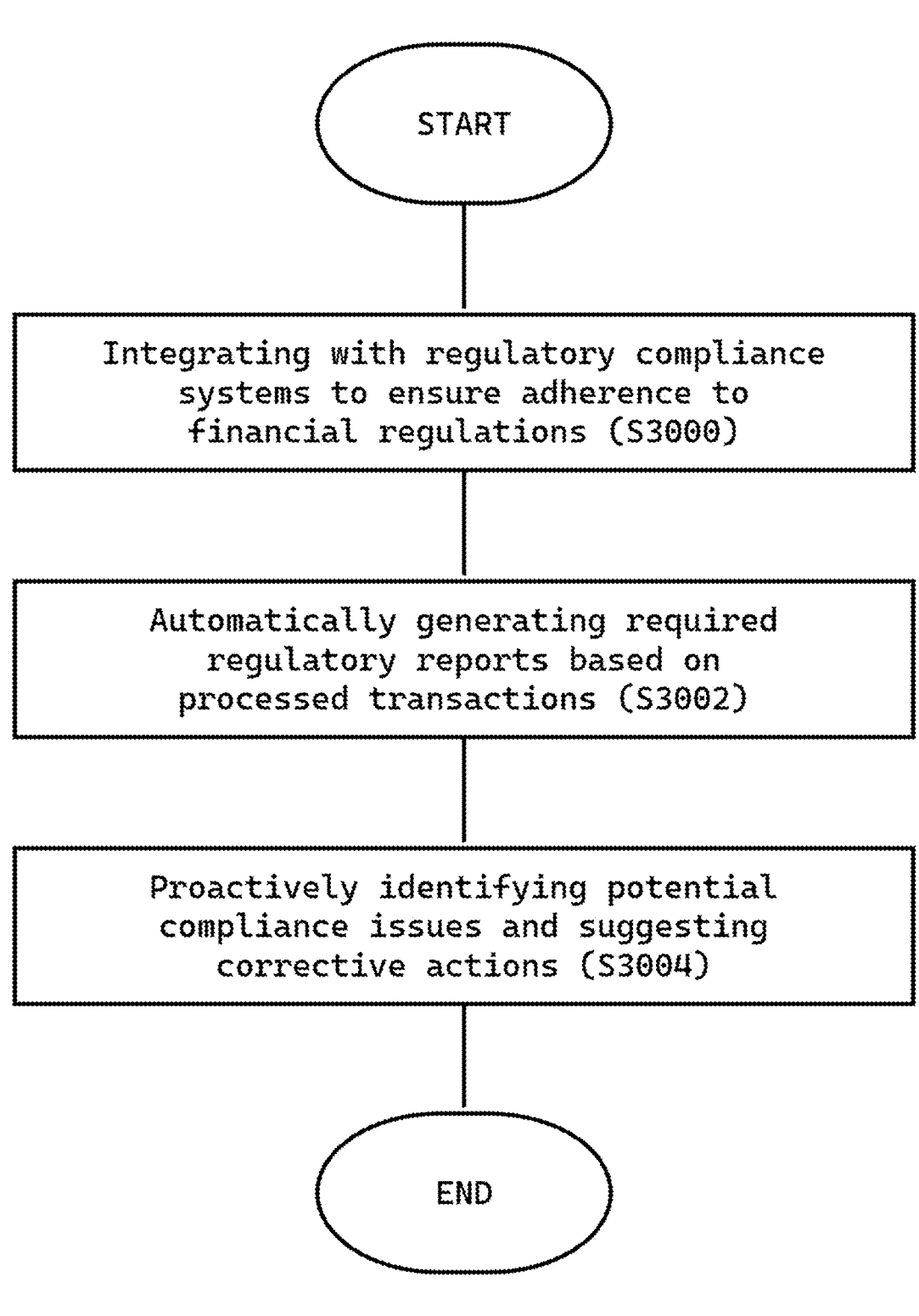
FIG. 30 shows an exemplary flowchart describing a process for regulatory compliance involving integration, report generation, and issue identification.

FIG. 30 shows an exemplary flowchart describing a process for regulatory compliance involving integration, report generation, and issue identification. The system integrates with regulatory compliance systems to ensure adherence to financial regulations S3000. The AI system establishes secure communication channels with regulatory frameworks and compliance databases. It retrieves real-time updates on regulatory changes, ensuring that all financial transactions comply with current laws and standards. The system continuously monitors transactions for compliance, flagging any deviations from regulatory requirements. This step ensures that the organization remains compliant with financial regulations, reducing the risk of legal penalties and enhancing operational transparency.

The system automates the creation of regulatory reports based on processed transactions S3002. The AI system aggregates transaction data and generates reports required by regulatory bodies (e.g., anti-money laundering reports, transaction logs). It ensures that all reports are accurate, complete, and submitted within the required timelines. The system also maintains an audit trail of all transactions, which can be accessed for regulatory audits reducing administrative burden, ensures timely reporting, and maintains a clear record of compliance activities.

The system proactively identifies potential compliance issues and suggests corrective actions S3004. The AI system continuously monitors transactions for anomalies or patterns that may indicate non-compliance (e.g., unusual transaction amounts, suspicious account activity). When potential issues are detected, the system flags them for further investigation and suggests corrective measures (e.g., additional verification steps, transaction blocking). The system also provides recommendations for improving compliance processes based on historical data and regulatory trends. This enhances the organization's ability to detect and address compliance issues early, reducing the risk of regulatory violations.

FIG. 31 shows an exemplary flowchart illustrating an agentic artificial intelligence system for processing sales leads including steps for receiving, preprocessing, analyzing, verifying, generating outreach, predicting timings, initiating sequences, monitoring, qualifying, updating CRM, and continuous learning. The system receives lead data, including contact information, company details, and potential interest indicators S3100. The AI system collects lead data from various sources, such as online forms, third-party databases, and internal CRM systems. It standardizes the data format and enriches it with additional publicly available information (e.g., social media profiles, industry news).

The system then preprocesses lead data to standardize formats and enrich it with additional information S3102. The AI system cleans and normalizes the data, removing duplicates and inconsistencies. It adds relevant details from external sources, such as company size, industry, and recent news making the lead data is ready for analysis and prioritization.

The system analyzes preprocessed lead data to identify potential sales opportunities and prioritize leads S3104. The AI system uses machine learning algorithms to evaluate lead quality based on historical data and engagement patterns. It assigns a priority score to each lead, indicating its likelihood of conversion.

The system verifies lead quality by cross-referencing lead data with ideal customer profiles and historical sales data S3106. The AI system compares lead data with predefined criteria for ideal customers (e.g., company size, industry, budget). It flags leads that do not meet the criteria for further review or exclusion. This ensures that only qualified leads are passed on to sales representatives.

The system generates personalized outreach messages for each lead S3108. The AI system uses natural language processing (NLP) to craft tailored messages based on the lead's profile and interests. It incorporates personalization elements, such as the lead's name, company, and recent activities. It focuses on crafting individualized messages tailored to potential leads by analyzing effective historical interactions. Through this approach, the system ensures each communication is relevant and engaging, enhancing the chance of successful engagement with prospects.

The system predicts the best time and channel for outreach based on historical engagement data S3110. The AI system analyzes past interactions to determine when and how leads are most likely to respond (e.g., email, phone, social media). It schedules outreach activities accordingly, optimizing the chances of success. This improves response rates by ensuring that outreach is timed and delivered effectively. The objective is to enhance communication strategies by leveraging insights from past interactions, ensuring that contact is made at moments when engagement is most likely to be successful.

The reference S3112 pertains to the process of initiating multi-channel outreach sequences. This process involves reaching out to key leads using various communication methods such as email, social media, and phone calls.

In step S3114, the system monitors response rates to assess the effectiveness of outreach efforts. Based on the performance data collected, it automatically adjusts outreach strategies to enhance engagement and success with prospective leads. This adaptive process ensures that communication is optimized for better outcomes.

The step S3116 involves assessing leads against predefined criteria to determine their quality. Leads that meet these criteria are then routed to the appropriate sales representatives for further engagement and potential conversion. This ensures that only qualified prospects receive direct attention from the sales team, optimizing resource allocation and improving efficiency.

The flowchart shows the step of updating the CRM system with interaction details and lead status changes S3118. This stage entails capturing information concerning interactions with leads, such as communication history and any status modifications. The new data is then recorded into the CRM system, ensuring that sales representatives have access to the most current details to assist in decision-making and lead management.

The system continuously learns from outreach results to improve future lead processing S3120. The AI system analyzes the outcomes of outreach campaigns to identify patterns and trends. It updates its models and algorithms based on this data, improving the accuracy and efficiency of future lead processing. This step ensures that the system becomes more effective over time, adapting to changing market conditions and lead behavior.

FIG. 32 shows an exemplary flowchart illustrating a process for sentiment analysis in customer interactions. The system implements sentiment analysis to gauge prospect interest levels from email responses and call transcripts S3200. The AI system uses NLP to analyze the tone and sentiment of prospect communications. It categorizes responses as positive, negative, or neutral based on the detected sentiment. This provides insights into prospect interest levels, helping sales teams tailor their follow-up strategies.

The system adjusts follow-up strategies based on the detected sentiment S3202. This involves analyzing the sentiment of email responses and call transcripts to determine the prospect's interest level. Depending on the sentiment analysis results, the system modifies its follow-up approach to better align with the prospect's mood and receptiveness, ensuring more effective engagement and communication. For positive responses, the system schedules follow-up actions to move the lead further down the sales funnel. For negative responses, the system may delay follow-up or adjust the messaging to address concerns. This ensures that follow-up strategies are aligned with prospect sentiment, improving engagement and conversion rates.

The system flags highly positive or negative responses for immediate human review S3204. The AI system identifies responses with extreme sentiment (e.g., very positive or very negative) and flags them for review by a human sales representative. This allows for timely intervention in cases where the prospect is highly interested or has significant concerns.

FIG. 33 shows an exemplary flowchart illustrating a process involving natural language processing, identifying decision-makers, and mapping tech stacks in a prospect's organization. The system extracts relevant information from company websites and social media profiles S3300. The AI system uses NLP to analyze unstructured text data from online sources. It identifies key details about the prospect's business, such as recent news, product launches, and organizational changes. In doing so, it compiles detailed and contextual information that can guide subsequent steps in sales development and the formulation of related strategies.

The system identifies key decision-makers within the prospect's organization S3302. The AI system analyzes job titles, roles, and responsibilities to identify individuals with purchasing authority. It also considers contextual indicators, such as mentions in press releases or social media activity. It ensures that sales efforts are directed toward the right individuals, improving the chances of success.

The system maps the prospect's technology stack and identifies potential pain points S3304. The AI system analyzes the prospect's tech stack by identifying the software and tools they use. It identifies potential pain points, such as inefficiencies or gaps in their current technology setup.

Figure 34:
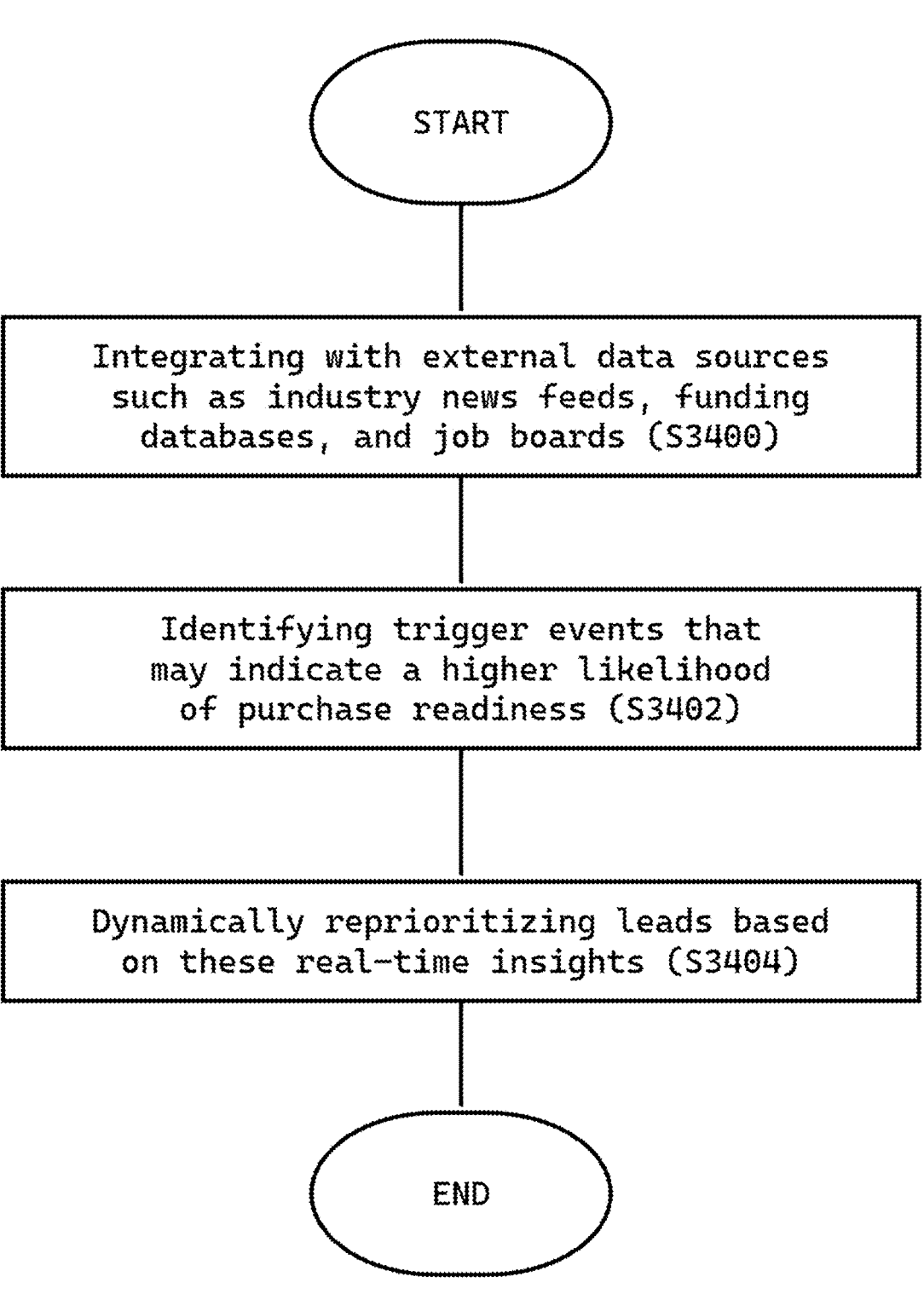
FIG. 34 shows an exemplary flowchart illustrating a process for integrating with external data sources, identifying trigger events, and dynamically reprioritizing leads.

FIG. 34 shows an exemplary flowchart illustrating a process for integrating with external data sources, identifying trigger events, and dynamically reprioritizing leads. The system integrates with external data sources, such as industry news feeds and funding databases S3400. The AI system collects data from external sources to identify trigger events (e.g., funding rounds, mergers, product launches). It uses this data to update lead profiles and prioritize leads based on recent developments. This step ensures that sales teams are aware of relevant events and can adjust their strategies accordingly.

The system identifies trigger events that indicate a higher likelihood of purchase readiness S3402. The AI system analyzes external data to identify events that may signal a need for the prospect's product or service. It flags these events and updates the lead's priority score accordingly. This helps sales teams focus on leads that are most likely to convert based on recent developments.

The system dynamically reprioritizes leads based on trigger events and real-time data S3404. The AI system continuously updates lead priority scores based on new information and trigger events. It adjusts the outreach strategy to focus on high-priority leads. These trigger events are vital as they signal potential opportunities for engagement, allowing the system to dynamically reprioritize leads based on real-time insights. By detecting these indicators, the method enhances the efficiency of lead processing and improves conversion rates.

FIG. 35 shows an exemplary flowchart illustrating steps for optimizing sales communications using deep learning and A/B testing. The system uses deep learning to optimize sales communications S3500. The AI system analyzes a large corpus of successful sales communications to identify patterns and best practices. It uses this data to generate personalized and effective sales messages. This improves the quality and relevance of sales communications, increasing engagement and conversion rates.

Considering factors such as prospect industry, role, company size, and detected pain points S3502 pertains to the step in the sales optimization process where a deep learning model evaluates various characteristics of the potential client. This step involves analyzing the industry in which the prospect operates, identifying the role and authority level within their organization, assessing the size of the company to understand its scope, and detecting any specific issues or challenges they encounter, thereby tailoring communication strategies accordingly.

The reference S3504 corresponds to the process of A/B testing different message variations to continuously optimize engagement rates. This involves experimenting with multiple versions of sales communications to determine which approach yields the best response from prospects. The insights gained from these tests are used to refine messaging strategies, ensuring higher levels of engagement and effectiveness in future interactions.

Figure 36:
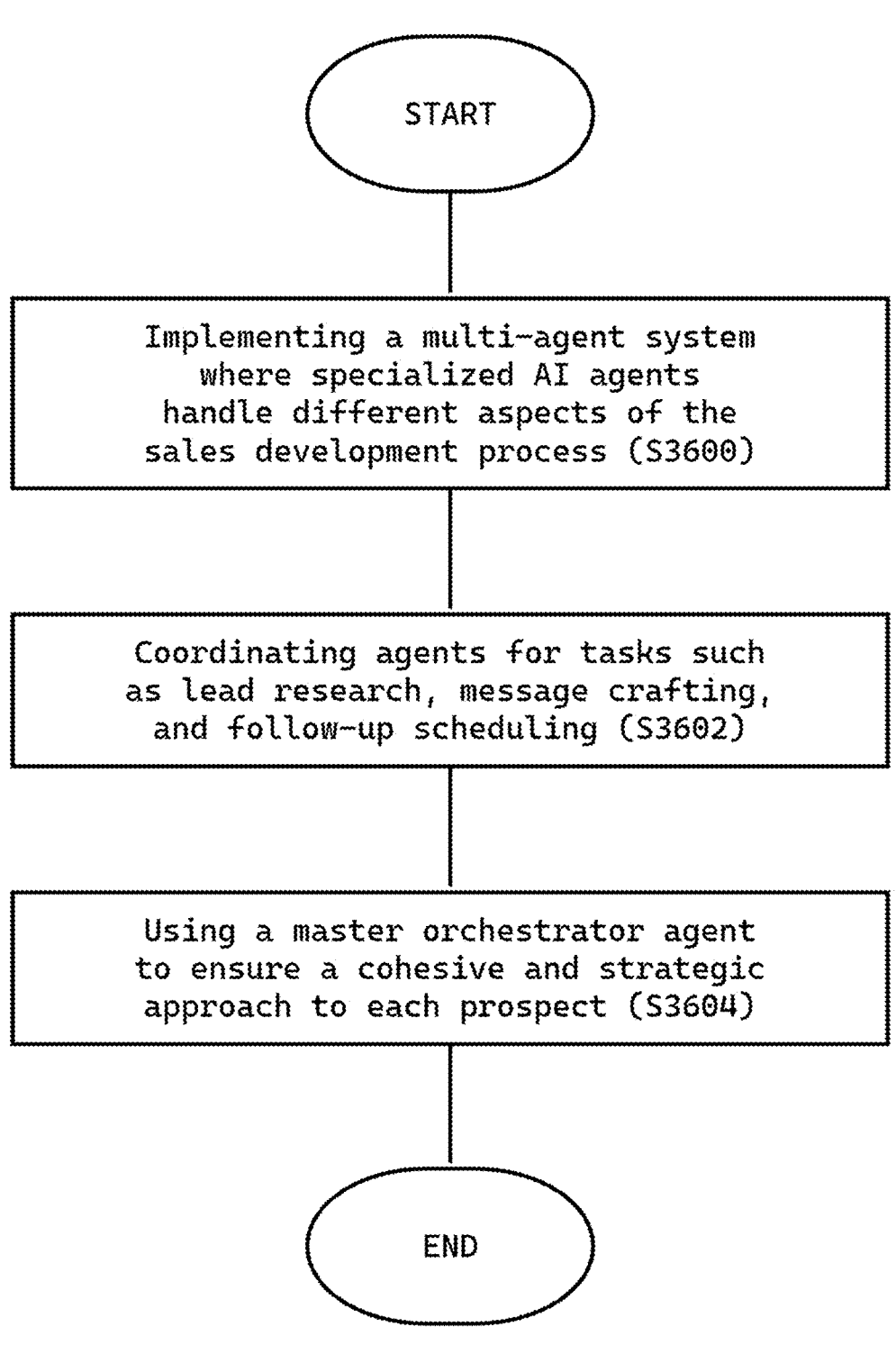
FIG. 36 shows an exemplary flowchart detailing a multi-agent AI system for sales development, coordination, and orchestration.

FIG. 36 shows an exemplary flowchart detailing a multi-agent AI system for sales development, coordination, and orchestration. The system implements a multi-agent AI system to handle different aspects of the sales process S3600. The AI system uses specialized agents for tasks such as lead research, message crafting, and follow-up scheduling. Each agent is optimized for its specific task, ensuring high efficiency and accuracy. This improves the overall efficiency of the sales process by distributing tasks among specialized agents.

The system coordinates the actions of specialized agents to ensure a cohesive sales strategy S3602. A master orchestrator agent manages the workflow and ensures that all agents are working in harmony. It adjusts task priorities based on real-time data and feedback which ensures that the sales process is streamlined and that all tasks are executed in a coordinated manner.

The process suggests the use of a master orchestrator agent to ensure a cohesive and strategic approach to managing prospects S3604. This agent acts as a central coordinator, integrating the efforts of specialized AI agents involved in tasks such as lead research, message crafting, and follow-up scheduling. By overseeing and aligning these activities, the master orchestrator ensures that the sales development process is streamlined and tailored to each prospect's unique needs. This approach enhances efficiency, consistency, and personalization in handling prospects, ultimately improving the overall effectiveness of the sales strategy.

Figure 37:
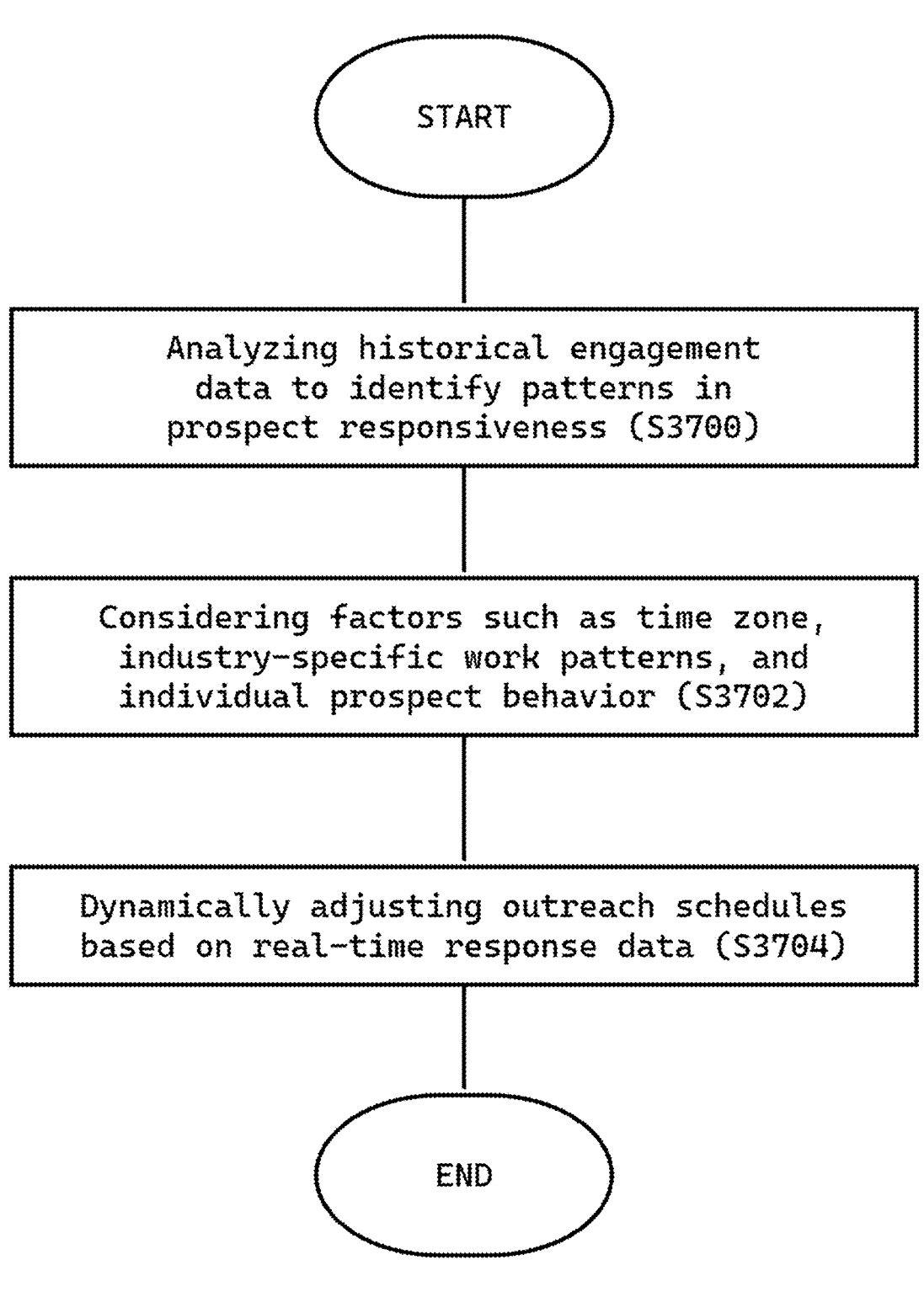
FIG. 37 shows an exemplary flowchart illustrating a process of analyzing engagement data, considering various factors, and dynamically adjusting schedules based on real-time data.

FIG. 37 shows an exemplary flowchart illustrating a process of analyzing engagement data, considering various factors, and dynamically adjusting schedules based on real-time data. The system analyzes engagement data to optimize outreach schedules S3700. The AI system tracks prospect engagement across multiple channels (e.g., email, social media, phone calls). It uses this data to identify patterns in prospect behavior and preferences. This step provides insights into the most effective times and channels for outreach.

The system considers time zones, industry-specific work patterns, and individual prospect behavior when scheduling outreach S3702. It pertains to the method's focus on tailoring outreach strategies. This involves analyzing various contextual elements like geographic location, which influences time zone considerations, ensuring communications are sent at optimal times for recipients. It also includes understanding unique work patterns associated with specific industries, allowing for adjustments that align with typical business hours or peak engagement periods. Moreover, it considers the historical behavior of individual prospects, enabling a personalized approach by leveraging data on how and when these prospects typically engage with communications. Collectively, these analyses facilitate a refined scheduling strategy designed to enhance responsiveness and effectiveness of outreach efforts.

The system dynamically adjusts outreach schedules based on real-time response data S3704. The AI system continuously monitors response rates and adjusts outreach schedules accordingly. It prioritizes leads that are most likely to respond based on real-time data. This adjustment is based on analyzing the latest engagement data, ensuring that communication with prospects is optimized for timing and effectiveness, enhancing the likelihood of successful interactions.

FIG. 38 shows an exemplary flowchart outlining an AI system's process for generating reports, providing insights, and offering real-time suggestions for sales representatives.

The system generates detailed lead intelligence reports for sales representatives S3800. The AI system compiles data from various sources, including CRM systems, social media, and external databases. It generates comprehensive reports that include prospect profiles, interaction history, and key insights. This step provides sales teams with the information they need to make informed decisions and tailor their approach.

The system provides actionable insights and talking points for sales conversations S3802. The AI system analyzes lead data to identify key pain points and opportunities. It generates tailored talking points and recommendations for sales representatives to use during conversations. This step focuses on utilizing gathered data to offer valuable guidance, enabling sales representatives to engage more effectively with prospects. By leveraging these insights, sales teams can tailor their conversations to address specific needs and increase the likelihood of successful interactions. The AI system's process involves offering real-time suggestions during sales calls, leveraging speech analysis and sales playbooks. This facilitates dynamic adjustments and provides immediate, context-aware recommendations to enhance the effectiveness of sales conversations.

The system offers real-time suggestions during sales calls based on speech analysis and playbooks S3804. The AI system analyzes live sales calls using speech recognition and NLP. It provides real-time suggestions to the sales representative based on the conversation and predefined sales playbooks. This step enhances the effectiveness of sales calls by providing timely and relevant guidance.

Figure 39:
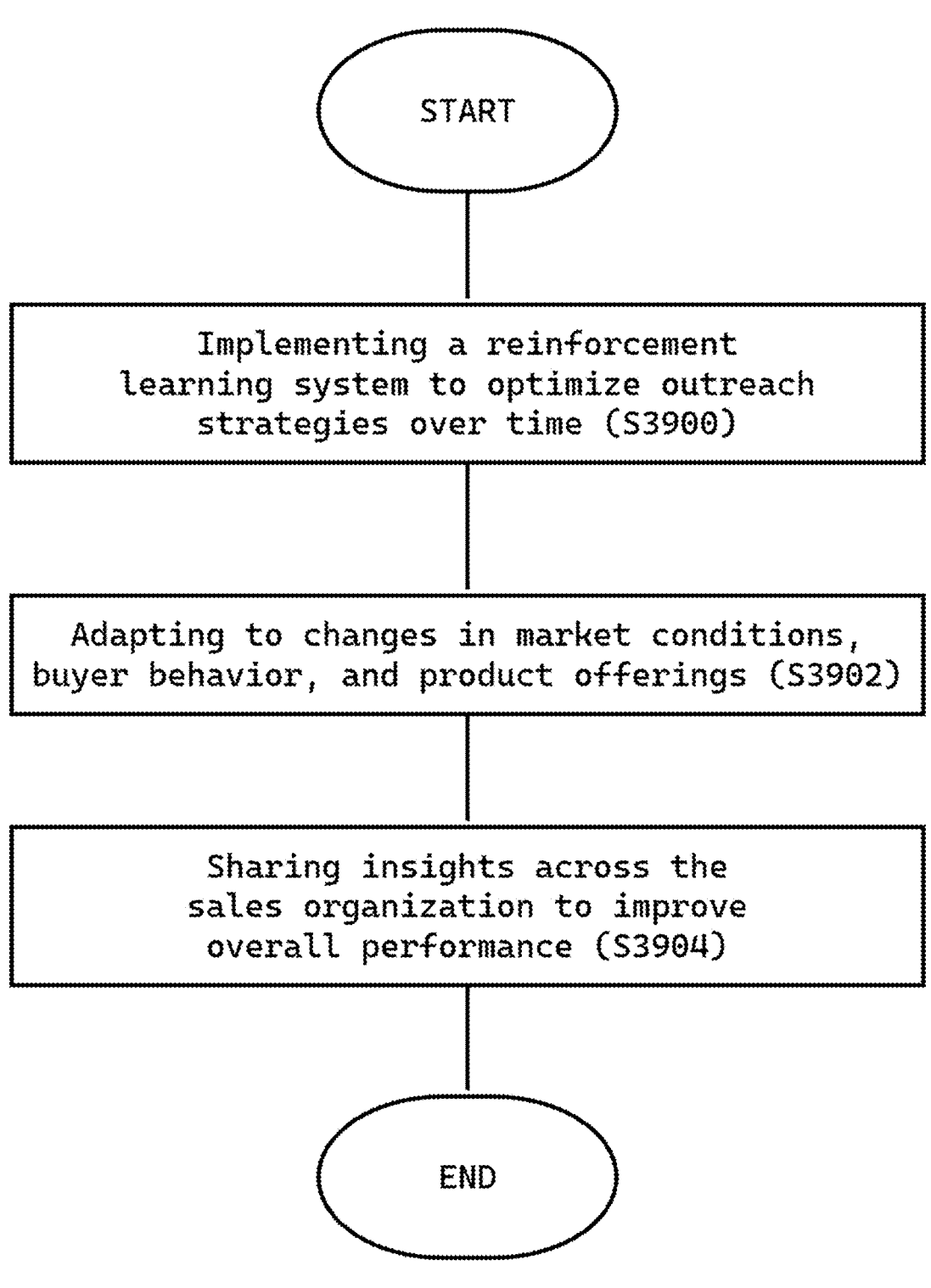
FIG. 39 shows an exemplary flowchart illustrating a process from start to end with steps for implementing a reinforcement learning system, adapting to market changes, and sharing insights to improve sales performance.

FIG. 39 illustrates the following references: implementing a reinforcement learning system to optimize outreach strategies over time, adapting to changes in market conditions, buyer behavior, and product offerings, and sharing insights across the sales organization to improve overall performance.

The reference label S3900 pertains to the process of implementing a reinforcement learning system designed to optimize outreach strategies over time. This system continuously refines and enhances engagement approaches by learning from previous interactions and outcomes. By adapting to evolving patterns in prospect behavior and market conditions, it aims to improve the overall effectiveness of sales outreach initiatives. The system implements a reinforcement learning framework to optimize outreach strategies over time. This framework adapts to changes in market conditions, buyer behavior, and product offerings S3902.

The reference label "sharing insights across the sales organization to improve overall performance S3904 indicates a step in the process where insights are distributed within a sales team to enhance overall effectiveness. This involves disseminating valuable findings and knowledge gained from data analysis and market feedback to inform and optimize decision-making processes, ultimately aiming to boost the sales team's collective performance.

Figure 40:
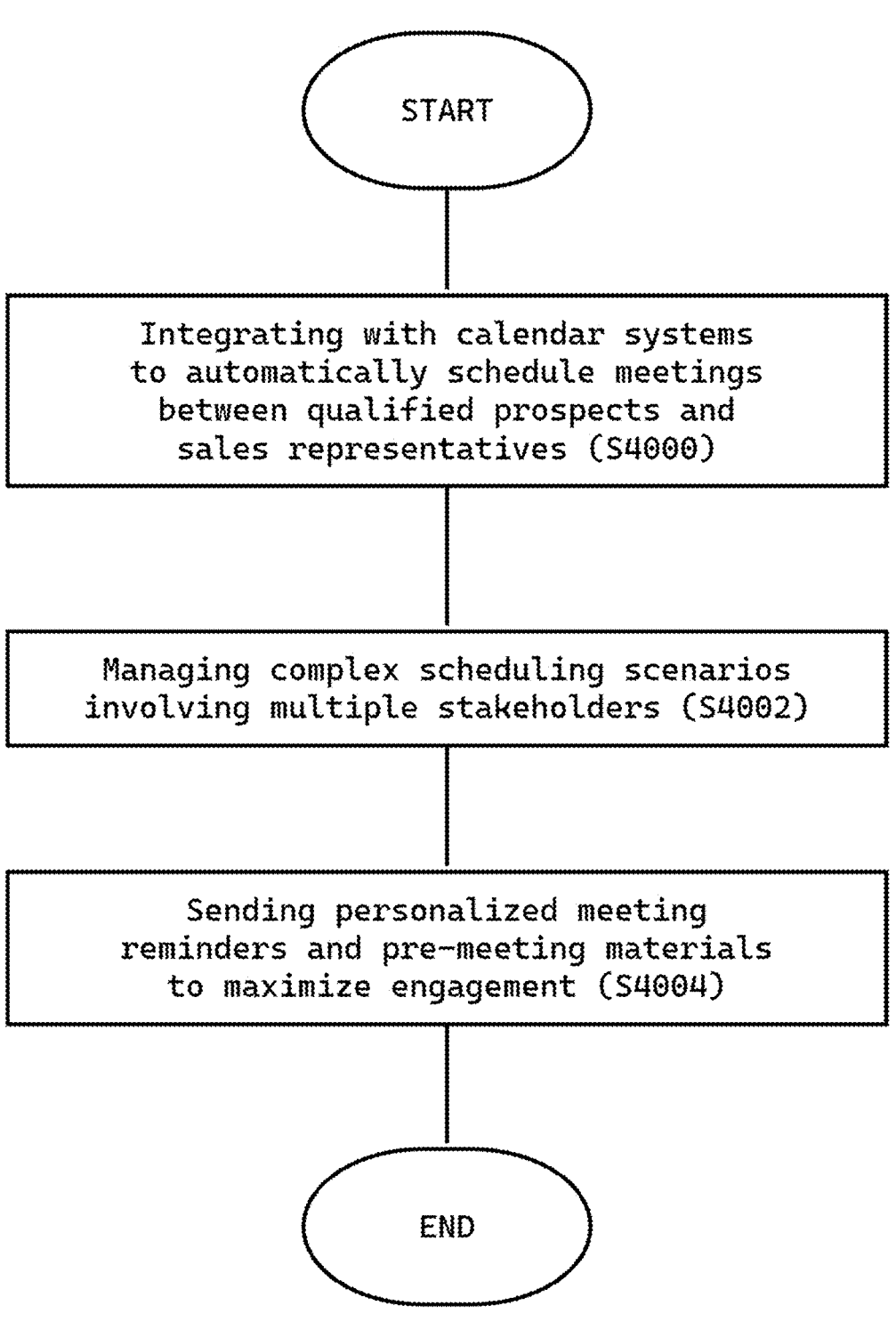
FIG. 40 shows an exemplary flowchart illustrating an automated meeting scheduling and management process with start and end points.

FIG. 40 shows an exemplary flowchart illustrating an automated meeting scheduling and management process with start and end points.

The process labeled "managing complex scheduling scenarios involving multiple stakeholders" designated as S4002, pertains to coordinating schedules efficiently when multiple parties are involved in setting up a meeting. This entails balancing the availability of all participants to ensure the meeting can occur at a mutually convenient time, thereby addressing potential conflicts and overlapping schedules.

The system enhances engagement and preparedness by sending personalized reminders and pre-meeting materials to participants S4004. The AI system generates and sends personalized reminders to all participants ahead of the scheduled meeting. These reminders include the meeting time, agenda, and any relevant links (e.g., video conferencing URLs).

It tailors the communication style and content based on the recipient's preferences and role (e.g., a technical expert might receive detailed technical documents, while an executive might receive a high-level summary). The system also provides pre-meeting materials, such as case studies, product brochures, or agenda outlines, to ensure participants are well-prepared for the discussion. The reminders and materials are sent through the recipient's preferred communication channel (e.g., email, SMS, or in-app notifications).

The one embodiment provides an automated, adaptive, and efficient approach to processing insurance claims, thereby enhancing overall claim adjudication and risk management while ensuring compliance with regulatory and data privacy requirements.

In one embodiment, the system comprises a visual processing module configured to enhance the claim assessment process. The system is arranged to receive visual data associated with the claim, wherein the visual data includes one or more images or videos depicting damaged property or injuries sustained during the insured incident. Upon receipt, the visual data is analyzed using computer vision algorithms specifically trained to assess the extent of damage or injury.

The analysis entails processing image attributes, detecting structural anomalies, and quantifying visible impairments in order to derive one or more metrics indicative of the damage severity. The outputs of the computer vision analysis are subsequently compared with the claimant's reported damages provided as part of the claim. In this comparison, discrepancies between the visual analysis results and the reported information are identified using a discrepancy flagging mechanism. Any detected discrepancies trigger additional investigation procedures, thereby enabling further verification of claim accuracy and enhancing overall claim validation efforts.

After performing the initial receiving, preprocessing, and analysis steps, the system further comprises generating a risk score for the claim based on multiple factors including claimant history, claim amount, and incident details. The risk score is generated by aggregating historical data on claimant behavior, evaluating the monetary value of the claim, and analyzing specifics of the reported incident using an array of machine learning models and statistical algorithms. Based on this risk score, the system determines an appropriate claim processing pathway. In cases where the risk score indicates an elevated level of risk, the claim is automatically routed to specialized fraud investigation units for additional verification and investigation. Conversely, when the risk score identifies a reduced risk claim, the system expedites processing by bypassing extra fraud verification steps and initiating rapid settlement procedures, thereby decreasing administrative overhead and improving claim resolution times. This integrated functionality ensures that resources are optimally allocated to claims with elevated risk while maintaining efficiency in the overall claim processing workflow.

After completing the automated analysis and decision-making steps, the system further comprises a natural language generation module configured to generate a detailed explanation of the claim decision. The natural language explanation is generated by considering a plurality of factors which influenced the outcome of the decision, such as the claimant's historical claim data, policy conditions, and any indicators of potential anomalies identified during processing. This explanation details the rationales for assigning specific claim codes, the determination of payout amounts, and the incorporation of risk scores derived from both internal and external data sources. The generated explanation is subsequently presented simultaneously to the claimant and to the claims adjuster, thereby ensuring that both parties receive a clear and comprehensive articulation of the factors that contributed to the final decision. Moreover, the system is configured to provide an option for human review in cases where the decision rendered by the agentic artificial intelligence system is challenged. In such cases, the explanation and relevant claim data are routed to a designated human review module, where a claims adjuster can re-evaluate the decision and, if necessary, override the AI system's decision based on a comprehensive assessment of the claim details. This approach not only enhances transparency in the claim decision process but also facilitates a mechanism for recourse when discrepancies between automated assessment and human judgment arise, thereby ensuring both accountability and flexibility in claim adjudication.

In one embodiment, the system comprises a module configured to integrate with external data sources that include weather reports, police records, and medical databases. The integration module establishes communication with one or more external providers and retrieves data pertinent to the specifics of an insurance claim. The system uses the externally sourced information to corroborate claim details by comparing data elements provided by the claimant with corresponding external records. For instance, weather reports validate the occurrence of adverse meteorological conditions at the time of an incident, while police records confirm the reported events and associated circumstances. Similarly, medical databases provide independent verification of injuries or treatments reported in a claim. The system analyzes and cross-references these additional data points with internal claim information to detect inconsistencies. When discrepancies between the claimant's report and the external data are identified, the system flags the claim for further investigation, as such inconsistencies indicate potential fraud. The fraud detection module applies predefined criteria and machine learning algorithms to assess the degree of inconsistency and determine whether additional verification steps, such as manual review or further automated cross-checks, are necessary. By continuously comparing and integrating external data with internal claim records, the system enhances its ability to accurately detect anomalies and mitigate the risk of fraudulent claims while maintaining compliance with applicable data protection regulations.

In one embodiment, the system further comprises a privacy-preserving federated learning system configured to refine the AI models by enabling multiple insurance entities to collaboratively update the machine learning models without exchanging sensitive or proprietary raw data. In this embodiment, each participating insurance entity locally trains the AI models using its own anonymized claim data and then shares only the computed model updates, such as gradient information or weight adjustments, with a central federated learning coordinator. The central coordinator aggregates these model updates from the various entities and computes an optimized global model, which is subsequently distributed back to each participating entity. This process facilitates continuous evolution of the AI models based on a larger collective dataset while ensuring that no raw claim data is shared between insurance entities. Furthermore, the federated learning system is designed to comply with applicable data protection regulations by incorporating privacy-enhancing techniques, such as data encryption and secure multi-party computation protocols, to safeguard any information transmitted during the model update process. Consequently, the system benefits from a more expansive and diverse dataset, which augments the performance and robustness of the AI models while preserving data confidentiality and integrity.

Once the necessary verifications and validations have been completed, the processed claim is submitted electronically to the appropriate payer system. The method further includes monitoring the status of the claim and automatically following up on any claims that are pending or delayed within the payer's system. Finally, the system continuously learns from the outcome of processed claims through feedback mechanisms that improve the accuracy and efficiency of future claim processing.

In one embodiment, the system further comprises a natural language processing module configured to extract pertinent clinical information from unstructured medical notes. The extracted clinical information is then mapped to standardized medical terminologies, thereby facilitating enhanced interoperability and consistency in data interpretation. This mapped information is subsequently employed to support accurate code assignment and claim validation, ensuring that the clinical details extracted from medical notes are appropriately reflected in the agentic artificial intelligence system's analysis. In such embodiments, the natural language processing module works in conjunction with the previously described modules to analyze diverse claim data, including structured data received from claim submissions and unstructured data from accompanying clinical documentation. The mapping of clinical information to standardized terminologies not only streamlines the code assignment process but also improves the accuracy of claim validation procedures by corroborating the extracted clinical information with existing policy and contractual guidelines. As a result, the system is capable of more effectively detecting data gaps or inconsistencies that arise from the input of unstructured notes and generating a more reliable determination regarding the claim outcome, thereby enhancing both the precision and efficiency of the overall claim processing workflow.

If one or more matching patterns are detected, the system is configured to flag those instances as suspicious. The flagging process involves marking the corresponding claim data for subsequent human review by either automatically generating a flag indicator in the claim record or routing the flagged claim to a designated review queue. Additionally, the system records the specific patterns or rules that were triggered during the comparison process, enabling human operators to review and assess the validity and significance of the anomaly more efficiently.

Additionally, the system incorporates a feedback mechanism wherein the outcomes from human reviews and subsequent investigations serve to update and refine the reference database and threshold criteria. This continual learning process enhances the system's capability over time to accurately identify emerging patterns of billing errors and fraudulent activity, ensuring that the analysis of the preprocessed claim data remains robust and current. Integrating these comparative, flagging, and alert-generating processes within a single analytical module provides an efficient mechanism for early fraud detection and risk mitigation in claim In this detailed example of how an agentic AI system handles a car accident insurance claim, we follow policyholder Sarah as she initiates a claim through her insurance company's mobile app. The AI-powered process begins with Sarah providing accident details and uploading photos through an intelligent chatbot interface. The system then springs into action, employing natural language processing to analyze Sarah's description and computer vision algorithms to assess the uploaded images. This initial data processing stage involves verifying policy coverage, cross-referencing accident details, and performing a rapid risk assessment to detect any potential fraud. The AI proceeds to estimate repair costs based on the damage assessment, historical data, and local pricing factors. It then determines the claim can be processed automatically due to its straightforward nature and low fraud probability, though it flags for human review before final approval due to the claim amount. Throughout the process, the AI manages communication with Sarah, updating her on the claim status and recommending approved repair shops. It coordinates with the chosen repair shop, sending damage assessments and authorizing repairs up to the estimated amount. As the claim progresses, the AI calculates the payout amount, considering policy terms, deductibles, and coverage limits. A human claims adjuster reviews the AI's work, verifying all assessments and recommendations before approving the settlement. The AI then generates a settlement offer for Sarah's approval and, upon acceptance, initiates electronic payments to both Sarah and the repair shop. Post-settlement, the system updates Sarah's policy record, adjusts her risk profile, and sends a follow-up survey. Importantly, the AI continuously learns from each claim, refining its models and improving its processes for future claims. This AI-driven approach significantly reduces processing time and resources while enhancing the policyholder's experience, allowing human adjusters to focus on more complex cases that truly require their expertise.

The system further comprises integrating with electronic health record (EHR) systems to access comprehensive patient medical histories. The system establishes secure communications with the EHR systems to retrieve historical and current patient data, including prior diagnoses, treatment plans, and outcomes. This detailed medical history is used to provide an enriched dataset for subsequent analysis. The system then verifies the medical necessity of claimed treatments by evaluating extracted diagnosis codes against established clinical guidelines. This verification process involves comparing the patient's reported treatment information with standardized criteria derived from clinical practice and current medical knowledge to ensure that the treatments are both appropriate and necessary. Additionally, the system is configured to identify potential instances of upcoding or unbundling of medical services. It performs a thorough analysis by cross-referencing the assigned treatment codes with the detailed patient medical histories and clinical guidelines, thus detecting anomalies or patterns that suggest services were either improperly upgraded to higher reimbursement categories or separated into individual billable components that would normally be bundled. This integration and analysis process enhances the accuracy of claim adjudication by reducing errors and potential fraudulent billing practices while ensuring compliance with clinical and regulatory standards.

In one embodiment, assigning appropriate medical codes comprises receiving preprocessed claim data associated with a patient and then subjecting the data to a deep learning model that has been trained on a vast corpus of medical literature and coding guidelines. The deep learning model processes the input data to extract relevant clinical features and correlates the extracted information with standardized coding frameworks. In this approach, the system considers the patient's full medical context, wherein historical treatment data, existing comorbidities, and relevant past treatments are integrated into the analysis to ensure that the medical codes accurately reflect the patient's overall clinical condition. The deep learning model generates one or more candidate codes along with corresponding confidence scores that represent the likelihood that each assigned code is correct. These confidence scores are provided to assist human coders during review; by evaluating the confidence metrics, human experts can prioritize cases for further assessment or manual verification, ensuring that any ambiguities in code assignment are addressed. The described embodiment enhances coding accuracy and consistency by leveraging extensive training data, while simultaneously incorporating clinical context and enabling human oversight through confidence score outputs.

The system then adjusts the baseline reimbursement amount by incorporating factors such as geographic location, place of service, and modifier codes. These adjustments are performed using one or more algorithms that consider regional cost differentials, the specific setting in which the service was provided, and additional modifiers that indicate variations in service complexity or patient condition. In one embodiment, a machine learning model trained on historical claim data is employed to refine these adjustments, thereby enhancing the accuracy of the expected reimbursement amount.

Following these adjustments, the system compares the calculated reimbursement amount to historical data for similar services to identify potential outliers. The process aggregates historical transaction data, normalizes the data to account for variations in service delivery and market conditions, and applies statistical analysis to detect deviations from expected reimbursement ranges. In cases where the calculated value diverges significantly from established benchmarks, the system flags the result for further review, triggering additional verification steps or manual intervention.

By combining the application of complex pricing rules, targeted adjustments based on situational factors, and a comparative review against historical data, the described process provides a robust method for accurately calculating an expected reimbursement amount that aligns with contractual, regulatory, and market-based standards.

In one embodiment, the system further comprises a processing module configured to generate a detailed explanation of benefits (EOB) in natural language. The natural language output is generated by analyzing the outputs of earlier claim processing steps and, where applicable, aggregating factors that influenced the final claim decision. This output explains any denials or partial payments associated with the claim. The system further customizes the language and detail level of the EOB based on the identity of the recipient, such as the patient, provider, or payer, thereby ensuring that the explanation is appropriately tailored to the recipient's specific informational needs. Additionally, the system provides links to relevant policy documents or clinical guidelines to support the claim decision, thereby facilitating easy access to supporting resources and ensuring that users can verify and further understand the basis of the decision. These functions are implemented in accordance with reference sign S1800 for generating the detailed natural language EOB, S1802 for customizing the language and level of detail for different recipients, and S1804 for providing links to supplementary policy documents or clinical guidelines. The processing modules that perform these tasks retrieve decision factors from prior analyses and dynamically integrate the appropriate policy support based on contextual parameters defined within the system's decision logic. Furthermore, output provided by this system can be integrated into existing electronic systems for claim management, thereby ensuring that both automated claims adjudicators and human reviewers have access to a comprehensive, transparent, and easily navigable explanation of the benefits as well as any deviations from a full payment.

The system further comprises a module for integrating with clinical decision support systems to evaluate the appropriateness of treatments. In this configuration, the system receives clinical data and interfaces with external clinical decision support systems that assess whether the treatment approaches indicated by the claim align with current clinical guidelines and evidence-based standards. The integration module evaluates the clinical recommendations provided by these systems and compares them against the treatments proposed in the claim, thereby flagging any instances of overutilization or underutilization of medical services. When the assessment indicates a deviation from optimal treatment practices, the system is configured to provide recommendations for alternative, evidence-based treatments. These recommendations are generated by analyzing historical claim data and treatment outcomes in conjunction with current clinical guidelines, so as to suggest modifications that yield superior patient outcomes and cost efficiencies.

In a detailed example of how AI handles a medical coverage claim request and referrals to doctors, we can envision a sophisticated system that integrates multiple data sources and employs advanced algorithms to streamline the process. Let's consider a scenario where a patient, John, is experiencing persistent back pain and decides to seek medical attention. John initiates the process by logging into his health insurance provider's AI-powered app. He inputs his symptoms, describing the location and intensity of his back pain, how long he's been experiencing it, and any relevant medical history. The AI system's natural language processing algorithms analyze John's input, extracting key information and categorizing the complaint. Based on this initial assessment, the AI determines that John's condition likely requires evaluation by a specialist, specifically an orthopedist or a neurologist. The AI then accesses John's insurance policy details, confirming his coverage and any specific requirements or limitations. It cross-references this information with a database of in-network healthcare providers, considering factors such as their specialties, patient ratings, availability, and proximity to John's location. The system also takes into account any pre-existing relationships John might have with certain doctors, as well as his preferences for appointment times and communication methods. Next, the AI generates a list of recommended specialists, prioritizing those who best match John's needs and insurance coverage. It presents this list to John through the app, providing detailed information about each doctor, including their qualifications, patient reviews, and the next available appointment slots. John selects a highly-rated orthopedist from the list and chooses an appointment time that suits his schedule. Once the appointment is confirmed, the AI system initiates the pre-authorization process for the visit. It analyzes John's symptoms, medical history, and the selected specialist's typical treatment patterns to predict the likely course of care. Based on this analysis, the AI generates a preliminary authorization for the initial consultation and potential diagnostic tests such as an MRI or X-ray. This proactive approach helps streamline the approval process, reducing delays in John's treatment. The AI also prepares a comprehensive summary of John's case, including his reported symptoms, relevant medical history, and insurance details. This information is securely transmitted to the orthopedist's office, ensuring they have all necessary data before John's visit. Additionally, the system sends John reminders about his appointment, along with instructions on any preparations he needs to make and what documents to bring. After John's appointment, the orthopedist's office submits a claim for the consultation and any procedures performed. The AI system receives this claim and immediately begins processing it. It verifies that the services provided align with the pre-authorization and John's policy coverage. The system uses machine learning algorithms to detect any anomalies or potential errors in the claim, such as incorrect coding or duplicate charges. If the claim is straightforward and falls within pre-defined parameters, the AI can approve it automatically, initiating payment to the healthcare provider and updating John's records. For more complex cases or those that fall outside typical patterns, the system flags the claim for review by a human claims specialist, providing a detailed analysis of its findings to assist in the decision-making process. Throughout this process, the AI continuously learns and adapts. It analyzes the outcomes of John's treatment, including any follow-up appointments or additional procedures, to refine its referral and pre-authorization algorithms. The system also monitors overall patterns in claims and treatments, identifying trends that could inform policy updates or highlight areas where patient care could be improved. By leveraging AI in this manner, the health insurance provider can significantly enhance the efficiency of claim processing and doctor referrals. This not only reduces administrative costs but also improves the patient experience by providing faster access to appropriate care and minimizing delays in claim approvals. The AI's ability to analyze vast amounts of data and identify patterns also contributes to better overall healthcare outcomes by ensuring patients are directed to the most suitable providers and receive timely, appropriate treatment.

In one embodiment, the transaction data analysis module comprises an algorithm configured to perform multiple operations on the preprocessed transaction data. The algorithm first employs natural language processing to extract relevant information from transaction descriptions. In this regard, the system parses transaction texts to identify and isolate key data elements such as merchant names, transaction amounts, dates, and contextual cues that indicate the nature of the transaction. The extracted information is then utilized by the categorization module, which classifies each transaction based on merchant information, spending patterns, and historical transaction profiles. Such categorization involves correlating identifiers provided within the transaction descriptions with known merchant categories and analyzing frequency distributions of expenditures that align with predetermined spending patterns. Furthermore, the system implements an anomaly detection process that identifies any deviations from a user's typical financial behavior. In this process, historical transaction data is analyzed to establish a baseline profile of spending habits, and individual transactions are compared against these baselines to determine whether they exhibit anomalies. The anomaly detection employs statistical methods and machine learning models trained to discern patterns indicative of atypical spending, thereby flagging those transactions for additional review. Each of these operations is executed in sequence or in parallel by one or more processors, and the results are used to inform subsequent risk assessments and decision-making processes related to financial transaction processing.

In one exemplary embodiment, one implementation further comprises generating natural language explanations for transaction decisions, including approvals, denials, or additional verification requirements. In this embodiment, a dedicated module is configured to analyze the outcome of a transaction decision along with associated contextual data and risk assessments. Based on this analysis, the module produces a natural language output that articulates the reasoning behind the decision, enabling both users and financial institutions to understand the factors influencing the outcome. The system additionally includes a communication customization module that tailors the style and complexity of the generated explanation according to individual user preferences and their assessed financial literacy level. This personalization ensures the content remains accessible and informative to a diverse range of users by adjusting terminology, tone, and the depth of provided details. Furthermore, the system incorporates a module for providing actionable insights and educational content designed to improve the user's financial health. This module processes information from transaction outcomes, historical spending patterns, and current market conditions to furnish users with recommendations and educational materials that support informed financial decision-making. The actionable insights include personalized strategies for optimizing spending, managing risks, and understanding regulatory changes, thereby contributing to a comprehensive framework that not only explains transaction decisions but also empowers users to enhance their overall financial wellbeing.

Additionally, the system adapts in real-time to evolving fraud tactics and changing financial market conditions. AI models continuously monitor transaction patterns and detect emerging anomalies that indicate shifts in fraudulent behavior or market dynamics. Through this real-time monitoring, the system recalibrates risk assessment parameters when triggered by detected anomalies or significant updates from external market data feeds. This adaptive process ensures that the transaction processing system remains responsive to the latest fraud strategies and fluctuations in financial market conditions, thereby enhancing overall system resilience.

Furthermore, the system periodically retrains models using anonymized data from recent transactions to ensure fairness and reduce bias. This retraining process involves the systematic collection of anonymized transaction data that is used to update the AI models, ensuring that the models are not only current with the latest transactional information but are also reevaluated for potential biases across different customer segments or transaction types. By incorporating periodic retraining cycles, the system maintains balanced performance and equitable decision-making, upholding both technical efficiency and compliance with fairness standards.

Calculating transaction feasibility involves simulating, by one or more processors, the impact of a proposed transaction on the user's overall financial position using predictive analytics. In one embodiment, this simulation involves acquiring current financial data for the user-including account balances, historical cash flow patterns, and records of past transactions-followed by applying a predictive model that factors in anticipated income and scheduled payments. The model produces a forecast of the user's financial status over a predetermined period following the transaction's execution. This simulation step is designed to offer a dynamic assessment that accounts for variability in individual income streams, payment obligations, and other pertinent financial activities.

In one exemplary embodiment, one implementation further comprises generating natural language explanations for transaction decisions, including approvals, denials, or additional verification requirements. In this embodiment, a dedicated module is configured to analyze the outcome of a transaction decision along with associated contextual data and risk assessments. Based on this analysis, the module produces a natural language output that articulates the reasoning behind the decision, enabling both users and financial institutions to understand the factors influencing the outcome. The system additionally includes a communication customization module that tailors the style and complexity of the generated explanation according to individual user preferences and their assessed financial literacy level. This personalization ensures the content remains accessible and informative to a diverse range of users by adjusting terminology, tone, and the depth of provided details. Furthermore, the system incorporates a module for providing actionable insights and educational content designed to improve the user's financial health. This module processes information from transaction outcomes, historical spending patterns, and current market conditions to furnish users with recommendations and educational materials that support informed financial decision-making. The actionable insights include personalized strategies for optimizing spending, managing risks, and understanding regulatory changes, thereby contributing to a comprehensive framework that not only explains transaction decisions but also empowers users to enhance their overall financial wellbeing.

Additionally, the system adapts in real-time to evolving fraud tactics and changing financial market conditions. AI models continuously monitor transaction patterns and detect emerging anomalies that indicate shifts in fraudulent behavior or market dynamics. Through this real-time monitoring, the system recalibrates risk assessment parameters when triggered by detected anomalies or significant updates from external market data feeds. This adaptive process ensures that the transaction processing system remains responsive to the latest fraud strategies and fluctuations in financial market conditions, thereby enhancing overall system resilience.

Furthermore, the system periodically retrains models using anonymized data from recent transactions to ensure fairness and reduce bias. This retraining process involves the systematic collection of anonymized transaction data that is used to update the AI models, ensuring that the models are not only current with the latest transactional information but are also reevaluated for potential biases across different customer segments or transaction types. By incorporating periodic retraining cycles, the system maintains balanced performance and equitable decision-making, upholding both technical efficiency and compliance with fairness standards.

The system also incorporates advanced analytics within the compliance integration module to continuously monitor processed transactions for deviations or inconsistencies that indicate potential breaches of regulatory protocols. Upon detecting such deviations, the system proactively identifies the compliance issues and suggests corrective actions that include adjustments to transaction processing methods, enhancements to data validation logic, or direct alerts to compliance officers for further human review and intervention. The integration of these functions ensures that the system not only maintains compliance through vigilant monitoring and automated report generation, but also supports proactive risk management by flagging anomalies early and providing actionable recommendations for remediation.

In a detailed example of how AI handles financial transactions and provides recommendations to an investor while preventing fraud and minimizing transaction risk, we can envision a sophisticated system that integrates multiple data sources, employs advanced algorithms, and continuously adapts to market conditions and user behavior. Let's consider a scenario where an investor, Sarah, is using an AI-powered financial platform to manage her investment portfolio and execute trades. Sarah logs into the platform, which immediately authenticates her identity using a combination of biometric data (facial recognition through her device's camera) and behavioral analysis (comparing her login patterns and device information to historical data). Upon successful authentication, the AI system provides Sarah with a personalized dashboard that displays her current portfolio performance, market trends, and potential investment opportunities. The system has been continuously analyzing vast amounts of financial data, including real-time market feeds, company financial reports, economic indicators, and news articles. Using natural language processing and sentiment analysis, the AI interprets this information to identify emerging trends and potential risks. Based on Sarah's investment goals, risk tolerance (which the AI has learned from her past behavior and explicit preferences), and current market conditions, the system generates a list of recommended actions. These might include suggestions to rebalance her portfolio, invest in specific sectors showing promise, or divest from assets facing increased risk. Each recommendation is accompanied by a clear explanation of the reasoning behind it, using data visualization techniques to make complex financial concepts more accessible. As
Sarah reviews these recommendations, she decides to follow
one of the AI's suggestions to invest in a promising tech
startup. When she initiates the transaction, the AI system
springs into action to ensure its legitimacy and minimize
risk. It first cross-references the transaction details with
Sarah's usual investment patterns and predefined rules (such
as investment limits for certain asset classes). Any signifi-
cant deviations would trigger additional verification steps.
The system then performs a real-time risk assessment of the
transaction. It analyzes the startup's financial health, market
position, and potential for growth. It also considers broader
factors such as regulatory changes that might impact the
company's sector. If the AI detects any red flags, such as
unusual trading patterns in the startup's stock or recent
negative news not yet reflected in the stock price, it would
alert Sarah and potentially recommend postponing the
investment pending further analysis. Assuming the transac-
tion passes these checks, the AI initiates a multi-factor fraud
prevention process. It verifies the legitimacy of the receiving
account, checks for any known fraud patterns associated
with similar transactions, and employs machine learning
algorithms to detect any anomalies that might indicate
fraudulent activity. The system also ensures compliance with
all relevant financial regulations, such as anti-money laun-
dering (AML) and know your customer (KYC) require-
ments. Once the transaction is deemed safe and compliant,
the AI executes it through the most efficient channel, con-
sidering factors such as transaction fees, processing time,
and current exchange rates if multiple currencies are
involved. It then updates Sarah's portfolio in real-time,
adjusting her overall risk profile and investment allocations
accordingly. Post-transaction, the AI continues to monitor
the investment's performance and its impact on Sarah's
overall portfolio. It sets up automated alerts for significant
price movements or relevant news that might affect the
investment. The system also learns from this transaction,
using it to refine its understanding of Sarah's investment
preferences and risk tolerance, which will inform future
recommendations. Throughout this process, the AI main-
tains a comprehensive audit trail of all actions taken, deci-
sions made, and the data used to inform those decisions. This
ensures transparency and accountability, allowing for easy
review by compliance officers or regulators if needed. The
AI's role extends beyond individual transactions. It continu-
ously analyzes Sarah's overall financial behavior, including
spending patterns, savings rate, and long-term financial
goals. Based on this holistic view, it might suggest adjust-
ments to Sarah's investment strategy, recommend new
financial products that align with her goals, or provide
personalized financial education content to help her make
more informed decisions. By leveraging AI in this manner,
the financial platform provides Sarah with sophisticated
investment management capabilities while maintaining
robust safeguards against fraud and excessive risk. The
system's ability to process vast amounts of data, identify
complex patterns, and make real-time decisions enables it to
navigate the complexities of financial markets more effec-
tively than a human alone could. At the same time, by
providing clear explanations for its recommendations and
maintaining human oversight for critical decisions, the AI
system ensures that Sarah remains in control of her financial
future, supported by powerful analytical tools and insights.

In one embodiment, an agentic artificial intelligence sys-
tem operating as a Sales Development Representative (SDR)
receives, via one or more processors, lead data that includes
contact details, company information, and potential interest indicators. The system accesses a digital interface that
aggregates this lead data from various sources such as online
submission portals, third-party suppliers, and existing inter-
nal databases. Upon receipt, the system preprocesses the
information by standardizing data formats, normalizing
entries related to contact details and company information,
and eliminating inconsistencies. At the same time, the
method enriches the lead data by incorporating additional
publicly available information retrieved from external
resources like business directories, social media profiles, and
industry databases to gain a comprehensive view of each
potential lead.

After completing the data enrichment phase, the system
analyzes the preprocessed lead data using one or more
agentic artificial intelligence algorithms to identify potential
sales opportunities and prioritize leads based on parameters
defined by historical performance metrics and engagement
patterns. The system then verifies the quality of each lead by
cross-referencing the preprocessed data with ideal customer
profiles and historical sales data stored in centralized reposi-
tories, ensuring that only leads meeting predetermined qual-
ity standards advance for further processing.

As a consequence of ongoing engagement and data analy-
sis, leads are further qualified based on predefined qualifi-
cation criteria, and those meeting the criteria are efficiently
routed to the appropriate sales representatives by updating
the customer relationship management system with interac-
tion details and changes in lead status. Finally, the method
incorporates a continuous learning process whereby the
agentic artificial intelligence system utilizes outreach results
and performance data to update and refine its underlying
models, thereby enhancing the accuracy and efficiency of
processing future sales leads over time.

In one embodiment, the system further comprises a sen-
timent analysis module configured to evaluate communica-
tion content received from prospective customers. The sen-
timent analysis module processes email responses and call
transcripts to determine the underlying sentiment and
thereby gauge prospect interest levels. Based on the results
of the sentiment analysis, the system automatically adjusts
follow-up strategies to optimize engagement by modifying
outreach timing, channel selection, and message content in
accordance with the detected sentiment. When the sentiment
analysis module detects responses that exhibit highly posi-
tive or highly negative sentiment, the system is programmed
to flag such responses for immediate human review. Con-
sequently, human operators can promptly assess the context
of these communications and take necessary corrective
actions or reinforce engagement as appropriate. This addi-
tional functionality is integrated with the existing modules
of the system, ensuring that prospect interactions are con-
tinuously monitored and dynamically managed to enhance
the overall effectiveness of the sales development process
while providing direct human oversight in cases where the
sentiment analysis indicates significant variations from
expected communication patterns.

In one embodiment, analyzing the preprocessed lead data
comprises employing natural language processing tech-
niques to extract relevant information from data sources
including, but not limited to, company websites and social
media profiles. The natural language processing module
processes the unstructured text from these online platforms
to identify pertinent details regarding a prospect's organi-
zation, such as business operations, recent news, and public
communications. The extracted information is then analyzed
to identify key decision-makers within the prospect's orga-
nization by correlating job titles, roles, and contextual indicators that suggest responsibility for purchasing or strategic decision-making. The system evaluates textual data for phrases and nomenclature that denote leadership positions, managerial responsibilities, or areas of influence. Further, the system maps the prospect's technological ecosystem by analyzing disclosed information regarding software, hardware, and digital services in use, thereby forming an understanding of the prospect's tech stack. This mapping process involves identifying common applications, platforms, and technologies mentioned across multiple data sources and then inferring potential pain points based on gaps, redundancies, or misalignments within the technology infrastructure. The resulting profile not only highlights the key contacts and decision-makers but also provides insights into the prospect's current technology setups and possible challenges. Such tailored information enables the sales approach to be customized to address the specific needs and circumstances of the prospect, thereby enhancing engagement efficiency and increasing the likelihood of conversion.

The embodiment further comprises a multi-agent system wherein specialized AI agents are configured to execute distinct functions in the sales development process. In this arrangement, individual agents are designated to perform tasks such as comprehensive lead research, the crafting of personalized outreach messages using natural language processing techniques, and the scheduling of follow-up communications based on historical engagement data and prospect interactions. A master orchestrator agent is employed to coordinate and integrate the efforts of these specialized agents, ensuring that their respective outputs are harmonized into a cohesive sales strategy. The master orchestrator agent manages the sequence and timing of activities, dynamically adjusts task priorities, and aggregates agent outputs to generate a strategic approach tailored to each prospect. This integrated coordination allows the system to respond adaptively to evolving market conditions and individual prospect behaviors while maintaining consistent execution of the overall sales development process.

Predicting the optimal outreach timing and channel involves a method wherein historical engagement data is analyzed to identify patterns in prospect responsiveness. In one embodiment, the system collects and aggregates past engagement metrics, such as open rates, click-through rates, reply times, and other interaction indicators associated with previous outreach attempts. The system then processes the collected data to discern temporal patterns indicative of heightened engagement, associating specific times of day, days of the week, or seasonal periods with increased response likelihood. Consideration is also given to prospect-specific factors, including the prospect's geographical time zone, industry-specific work patterns, and observed individual behavior traits. For example, local business hours, regional cultural practices, or known variations in communication preferences are factored into the analysis. Based on these considerations, the system dynamically adjusts outreach schedules by continuously monitoring real-time response data and updating engagement profiles. As new response data is received, the system recalibrates its recommendations for outreach timing and channel, ensuring that adjustments occur in near real-time to accommodate changes in prospect behavior or external factors that influence responsiveness. The dynamically adjusted schedule incorporates a feedback loop in which updated real-time response data reinforces the predictive models, thereby enhancing the accuracy of subsequent outreach recommendations.

In one embodiment, the system further comprises a lead intelligence module configured to generate detailed lead intelligence reports that include comprehensive prospect research and interaction history. The system analyzes lead data from various sources and compiles the information into reports that provide sales representatives with an in-depth view of potential customers, including historical engagement data and relevant background details. In addition, the system is further configured with a decision support module that provides actionable insights and talking points to guide human-led sales conversations. This module synthesizes information from the lead intelligence reports, historical sales data, and real-time customer interactions to formulate tailored recommendations that assist sales personnel in addressing prospects' needs and concerns effectively. Moreover, the system incorporates real-time processing capabilities to offer suggestions during sales calls based on speech analysis and sales playbooks. By continuously analyzing live communication using speech recognition and natural language processing algorithms, the system detects conversational cues and contextual information, enabling it to generate on-the-fly recommendations and suggestions that align with pre-defined sales strategies and playbooks. The integration of these functions allows the system not only to provide robust lead intelligence and actionable insights but also to enhance the overall effectiveness of sales interactions by supporting real-time decision-making during customer engagements.

The agentic artificial intelligence system continuously learns from outreach results by incorporating several detailed mechanisms. In one embodiment, the system implements a reinforcement learning framework that is designed to optimize outreach strategies over time. In this context, the reinforcement learning system analyzes historical interaction data, including successful and unsuccessful outreach attempts, and adjusts the parameters of outreach scheduling, messaging, and channel selection based on performance outcomes. The system adapts to changes in market conditions by monitoring variations in economic indicators, industry trends, and competitive activities, and accordingly recalibrates its predictive models. Additionally, the system observes shifts in buyer behavior, such as alterations in engagement patterns, response times, and communication preferences, as well as modifications in product offerings that might influence customer interest. Based on these dynamic inputs, the agentic AI adjusts its outreach tactics to enhance relevance and effectiveness in real time. Furthermore, the system shares the computed insights and strategic adjustments across the sales organization by disseminating updated models, analytic reports, and performance metrics. This sharing of insights facilitates coordination among sales teams, enabling them to collectively refine engagement approaches and improve overall organizational performance. By integrating these elements, the system establishes a feedback-driven learning cycle that continuously enhances outreach strategy, ensures alignment with current market realities, and supports informed decision-making across the enterprise.

In a detailed example of how AI acts as a sales SDR (Sales Development Representative) agent to handle prospects, we can envision a sophisticated system that combines natural language processing, machine learning, and data analytics to automate and optimize the early stages of the sales process. Let's consider a scenario where an AI SDR agent, which we'll call "Algent," is deployed by a software company selling cloud-based project management tools. Algent's primary role is to identify, engage, and qualify potential leads, setting the stage for human sales representatives to close deals. Algent begins its day by analyzing the company's ideal customer profile (ICP) and buyer personas. It then scans various data sources, including social media platforms, industry news, and company databases, to identify potential prospects that match these criteria. Using natural language processing and sentiment analysis, Algent can interpret recent posts, articles, or announcements to gauge a company's potential interest in project management solutions. Once a list of potential prospects is compiled, Algent prioritizes them based on factors such as company size, industry, recent funding rounds, or indications of growth that might necessitate better project management tools. It then begins the outreach process, crafting personalized messages for each prospect. For example, Algent might identify a mid-sized marketing agency that recently announced an expansion into new markets. It crafts an initial outreach email that references this expansion, congratulates the company, and suggests how the project management tool could help manage their growing team and client base across multiple locations. The language and tone of this message are tailored based on analysis of the prospect's previous communications and industry norms. Algent uses advanced email tracking tools to monitor the prospect's engagement with the message. If the email is opened multiple times or links are clicked, Algent flags this as a sign of interest and plans a follow-up strategy. If there's no response after a set period, Algent automatically sends a carefully timed follow-up message, perhaps offering additional value such as a relevant case study or industry report. When a prospect responds, Algent uses natural language processing to analyze the content of the reply. It can interpret the sentiment of the message, identify key pain points or objections, and determine the level of interest. Based on this analysis, Algent selects the most appropriate response from its database of templates, customizing it to address the specific points raised by the prospect. Throughout these interactions, Algent is constantly learning and refining its approach. It analyzes which messages receive the highest open and response rates, which pain points resonate most with different types of prospects, and which follow-up strategies are most effective. This continuous learning allows it to optimize its outreach strategies over time. If a prospect shows significant interest, Algent initiates a qualification process. It might send a series of targeted questions to gather more information about the prospect's current project management processes, team size, budget, and decision-making timeline. Algent can even schedule an initial discovery call, finding a suitable time slot that aligns with both the prospect's calendar and the availability of the human sales team. During this process, Algent maintains detailed records of all interactions, building a comprehensive profile of each prospect. It notes key information such as pain points discussed, features of interest, and any objections raised. This data is organized and summarized in a format that's easily digestible for the human sales representatives who will take over the later stages of the sales process.

Algent also integrates with the company's CRM system, automatically updating prospect records and triggering appropriate workflows. For instance, if a prospect mentions they're not ready to purchase for another six months, Algent can set a reminder to re-engage at the appropriate time. Moreover, Algent can handle basic objections and frequently asked questions. If a prospect expresses concern about the tool's integration capabilities, Algent can immediately provide detailed information about supported integrations and even offer to set up a demo with a technical specialist.

Throughout all these interactions, Algent maintains a professional, helpful demeanor. It's programmed to be persistent without being pushy, to provide value in every interaction, and to respect the prospect's time and preferences. If a prospect asks to be removed from the contact list, Algent complies immediately and updates the CRM accordingly. By leveraging AI in this manner, the company can significantly scale its outreach efforts, ensure consistent follow-up, and provide a personalized experience for each prospect. The AI SDR agent can handle a volume of initial interactions that would be impossible for a human team, allowing the human sales representatives to focus their efforts on qualified, interested prospects who are ready for more in-depth discussions. This not only improves efficiency but also enhances the overall customer experience from the very first touchpoint.

Algent also integrates with the company's CRM system, automatically updating prospect records and triggering appropriate workflows. For instance, if a prospect mentions they're not ready to purchase for another six months, Algent can set a reminder to re-engage at the appropriate time. Moreover, Algent can handle basic objections and frequently asked questions. If a prospect expresses concern about the tool's integration capabilities, Algent can immediately provide detailed information about supported integrations and even offer to set up a demo with a technical specialist. Throughout all these interactions, Algent maintains a professional, helpful demeanor. It's programmed to be persistent without being pushy, to provide value in every interaction, and to respect the prospect's time and preferences. If a prospect asks to be removed from the contact list, Algent complies immediately and updates the CRM accordingly. By leveraging AI in this manner, the company can significantly scale its outreach efforts, ensure consistent follow-up, and provide a personalized experience for each prospect. The AI SDR agent can handle a volume of initial interactions that would be impossible for a human team, allowing the human sales representatives to focus their efforts on qualified, interested prospects who are ready for more in-depth discussions. This not only improves efficiency but also enhances the overall customer experience from the very first touchpoint.

The invention claimed is:

1. A computer-implemented method for processing a data object using an agentic artificial intelligence (AI) system, the method comprising:

providing a plurality of specialized AI agents in a parallel processing pipeline to perform the following:

preprocessing the data object by enriching the data object with information from internal or external sources, and removing or pseudonymizing personally identifiable information;

analyzing, by at least one specialized AI agent, the preprocessed data object based on predefined or learned criteria;

verifying, by at least one specialized AI agent, the data object with reference profiles, historical data, or external databases;

assigning, by at least one specialized AI agent, one or more classifications, codes, or scores to the data object using machine learning algorithms trained on historical or domain-specific data;

calculating, by at least one specialized AI agent, an expected outcome, recommendation, or action for the data object based on the assigned classifications, codes, or scores;

predicting, by at least one specialized AI agent, a likelihood metric, for data objects exceeding a threshold for the likelihood metric, initiating one or more verification steps or follow-up actions;

initiating, by the agentic AI system, one or more automated workflows or communications based on the analysis and predicted outcomes, including updating internal systems, generating personalized messages, or routing the data object to a reviewer; and continuously learning, by the agentic AI system, from the processed data object, user feedback, or outcome data.

2. The method of claim 1, comprising:

receiving a claim including claimant data, incident information, and coverage details;

analyzing, by a first AI agent, claim data to identify potential errors, inconsistencies, or missing information;

verifying, by a second AI agent, claim eligibility by querying external databases and cross-referencing with policy information;

assigning, by a third AI agent, one or more claim codes using machine learning algorithms trained on historical coding data;

calculating, by a fourth AI agent, the expected payout amount based on the assigned codes, policy terms, and historical claim data;

predicting a likelihood of claim fraud by a fifth AI agent trained on historical claims data and for claims with high fraud probability, initiating additional verification steps and gathering supporting documentation.

3. The method of claim 1, comprising:

generating a context object comprising data about a current webpage, a browsing history, and user preferences;

transmitting a user query and the context object to the agentic AI agent;

receiving a response from the agentic AI agent, wherein the response is selected from the group consisting of a textual response, a webpage element suggestion, and a navigation instruction and when the response type is a textual response, displaying a text overlay on the current webpage with the textual response;

when the response type is a webpage element suggestion, visually highlighting a specified element on the current webpage; and when the response type is a navigation instruction, automatically navigating to a uniform resource locator (URL) specified in the navigation instruction.

4. The method of claim 1, comprising routing data to the plurality of specialized AI agents, including: a data validation agent configured to identify missing, inconsistent, or erroneous information; a vision agent configured to analyze images or video for assessment using neural networks; a rule-based expert system agent; a verification agent for verifying claim eligibility by querying internal and external data sources.

5. The method of claim 3, comprising processing data with a browser or an application embedded with an AI neural network.

6. The method of claim 1, comprising:

generating a risk score for a claim based on claimant history, claim amount, and incident detail;

routing first risk claims for fraud investigation; and expediting second risk claims for processing.

7. The method of claim 1, wherein specialized AI agents handle different aspects of the claim process, comprising coordinating the actions of the agents using a master orchestrator agent and aggregating the outputs from each agent to make a final claim decision.

8. The method of claim 1, comprising:

utilizing a machine learning model trained on historical claim data to predict a settlement amount;

adjusting the settlement amount based on current market conditions and regional factors;

comparing the settlement amount with similar past claims for consistency.

9. The method of claim 1, comprising:

assigning claim codes via a reinforcement learning model that optimizes code selection through iterative reward signals derived from prior claim adjudication outcomes;

calculating an expected payout amount using a federated learning framework that aggregates historical claim data across partitioned datasets while maintaining data locality compliance;

predicting fraud likelihood via an adversarial neural network trained to detect synthetic claim patterns, wherein the network ingests real-time IoT data streams and applies temporal convolution to identify anomalous sequences;

updating claim status via a state machine that triggers context-aware follow-up actions using robotic process automation (RPA) bots interfaced with legacy insurance systems.

10. The method of claim 1, comprising:

assigning, by a master orchestrator agent, the plurality of specialized artificial intelligence (AI) agents to process respective components of the claim data in parallel;

coordinating, by the master orchestrator agent, inter-agent communication, including routing intermediate outputs between agents using data channels and resolving conflicts between agent conclusions using attention-based preference weighting; and aggregating, by the master orchestrator agent, outputs from the specialized AI agents by:

computing confidence-weighted embeddings of each agent's finding;

applying domain-specific alignment layers to normalize semantic representations;

generating a final claim decision through fused multimodal reasoning.

11. The method of claim 3, comprising:

coordinating, by a master orchestrator agent, inter-agent communication, including routing intermediate outputs between agents and resolving conflicts between agent conclusion; and aggregating, by the master orchestrator agent, outputs from the specialized AI agents.

* * * * *